US010811008B2

(12) United States Patent
Woo et al.

(10) Patent No.: US 10,811,008 B2
(45) Date of Patent: Oct. 20, 2020

(54) ELECTRONIC APPARATUS FOR PROCESSING USER UTTERANCE AND SERVER

(71) Applicant: Samsung Electronics Co., Ltd., Gyeonggi-do (KR)

(72) Inventors: Kyoung Gu Woo, Seoul (KR); Woo Up Kwon, Seoul (KR); Jin Woo Park, Gyeonggi-do (KR); Eun Taek Lim, Gyeonggi-do (KR); Joo Hyuk Jeon, Seoul (KR); Ji Hyun Kim, Gyeonggi-do (KR); Dong Ho Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 114 days.

(21) Appl. No.: 16/014,725

(22) Filed: Jun. 21, 2018

(65) Prior Publication Data

US 2018/0374482 A1    Dec. 27, 2018

(30) Foreign Application Priority Data

Jun. 21, 2017 (KR) .................. 10-2017-0078829
Jul. 18, 2017 (KR) .................. 10-2017-0091217
Aug. 22, 2017 (KR) .................. 10-2017-0106326

(51) Int. Cl.
*G10L 15/22* (2006.01)
*G06F 3/16* (2006.01)
*G10L 15/26* (2006.01)

(52) U.S. Cl.
CPC .............. *G10L 15/22* (2013.01); *G06F 3/167* (2013.01); *G10L 15/265* (2013.01); *G10L 2015/223* (2013.01); *G10L 2015/228* (2013.01)

(58) Field of Classification Search
CPC ..................................................... G10L 15/22
See application file for complete search history.

(56) References Cited

U.S. PATENT DOCUMENTS

| 5,748,974 | A | 5/1998 | Johnson |
| 7,254,543 | B2 | 8/2007 | Ibaraki et al. |
| 9,171,066 | B2 | 10/2015 | Hebert et al. |
| 9,361,084 | B1* | 6/2016 | Costa ................. G06F 8/61 |
| 9,472,196 | B1* | 10/2016 | Wang ................. G06F 3/167 |

(Continued)

FOREIGN PATENT DOCUMENTS

| KR | 10-2003-0051368 | 6/2003 |
| KR | 10-2013-0035983 | 4/2013 |

*Primary Examiner* — Douglas Godbold
(74) *Attorney, Agent, or Firm* — The Farrell Law Firm, P.C.

(57) ABSTRACT

A system for processing a user utterance is provided. The system includes at least one network interface; at least one processor operatively connected to the at least one network interface; and at least one memory operatively connected to the at least one processor, wherein the at least one memory stores a plurality of specified sequences of states of at least one external electronic device, wherein each of the specified sequences is associated with a respective one of domains, wherein the at least one memory further stores instructions that, when executed, cause the at least one processor to receive first data associated with the user utterance provided via a first of the at least one external electronic device, wherein the user utterance includes a request for performing a task using the first of the at least one external device.

16 Claims, 38 Drawing Sheets

(56) References Cited

U.S. PATENT DOCUMENTS

| | | | |
|---|---|---|---|
| 9,548,066 B2 | 1/2017 | Jain et al. | |
| 10,089,983 B1* | 10/2018 | Gella | G10L 15/183 |
| 10,229,680 B1* | 3/2019 | Gillespie | G10L 15/22 |
| 10,332,513 B1* | 6/2019 | D'Souza | G10L 15/063 |
| 2003/0115067 A1 | 6/2003 | Ibaraki et al. | |
| 2014/0095172 A1* | 4/2014 | Cabaco | G10L 21/06 |
| | | | 704/275 |
| 2014/0136183 A1 | 5/2014 | Hebert et al. | |
| 2016/0035353 A1* | 2/2016 | Chen | G10L 17/22 |
| | | | 704/235 |
| 2016/0042748 A1* | 2/2016 | Jain | G10L 25/48 |
| | | | 704/9 |
| 2017/0243576 A1* | 8/2017 | Millington | G10L 15/1822 |
| 2017/0358303 A1* | 12/2017 | Walker, II | G10L 15/1815 |
| 2018/0247654 A1* | 8/2018 | Bhaya | G10L 15/265 |
| 2018/0366114 A1* | 12/2018 | Anbazhagan | G06F 40/30 |

\* cited by examiner

|  | Domain 1 | Domain 2 | Domain 3 |
|---|---|---|---|
| Global rule | App1_PathRule_01 | App2_PathRule_01 | App n_PathRule_01 |
|  | App1_PathRule_02 | App2_PathRule_02 | App n_PathRule_02 |
|  | App1_PathRule_03 | App2_PathRule_03 | App n_PathRule_03 |
|  | App1_PathRule_04 | App2_PathRule_04 | App n_PathRule_04 |
|  | App1_PathRule_05 | App2_PathRule_05 | App n_PathRule_05 |
| Non-Global rule | App1_PathRule_06 | App2_PathRule_06 | App n_PathRule_06 |
|  | App1_PathRule_07 | App2_PathRule_07 | App n_PathRule_07 |
|  | App1_PathRule_08 | App2_PathRule_08 | App n_PathRule_08 |
|  | App1_PathRule_09 | App2_PathRule_09 | App n_PathRule_09 |
|  | App1_PathRule_10 | App2_PathRule_10 | App n_PathRule_10 |
|  | App1_PathRule_11 | App2_PathRule_11 | App n_PathRule_11 |
|  | App1_PathRule_12 | App2_PathRule_12 | App n_PathRule_12 |
|  | App1_PathRule_13 | App2_PathRule_13 | App n_PathRule_13 |
|  | App1_PathRule_14 | App2_PathRule_14 | App n_PathRule_14 |

FIG.7

ELECTRONIC APPARATUS FOR PROCESSING USER UTTERANCE AND SERVER

CROSS-REFERENCE TO RELATED APPLICATION(S)

This application is based on and claims priority under 35 U.S.C. § 119 to Korean Patent Application Nos. 10-2017-0078829, 10-2017-0091217, and 10-2017-0106326, filed on Jun. 21, 2017, Jul. 18, 2017, and Aug. 22, 2017 in the Korean Intellectual Property Office, respectively, the disclosure of each of which is incorporated by reference herein in its entirety.

BACKGROUND

1. Field

The present disclosure relates generally to processing a user's utterance and, more particularly, to a method of processing a user input to request a service associated with a third party application provided by a third party.

2. Description of Related Art

In addition to a conventional input scheme using a keyboard or a mouse, electronic apparatuses have recently supported various input schemes such as a voice input and the like. For example, electronic apparatuses such as a smartphone or a tablet personal computer (PC) may recognize a voice of a user input in a state where a speech recognition service is executed and execute an action corresponding to a voice input or provide the result found depending on the voice input.

Currently, speech recognition service is being developed based on a technology processing a natural language. A technology processing a natural language refers to a technology that grasps an intent of a user utterance and provides the user with a result suitable to the intent.

The above information is presented as background information only to assist with an understanding of the present disclosure. No determination has been made, and no assertion is made, as to whether any of the above might be applicable as prior art with regard to the present disclosure.

SUMMARY

Since a speech recognition service displays only a result according to a user input when processing a user voice, the speech recognition service may process only a simple user voice input such as executing an application program but may not process a user voice input required to execute and process a plurality of applications (apps).

Even though a speech recognition service is capable of controlling a plurality of apps corresponding to a user input, the speech recognition service may be very limited, and thus the speech recognition service may not control operations of a plurality of application programs organically. In particular, for processing a user input, it is difficult for a speech recognition service to determine whether to execute a new app when an app is already executed in an electronic device. In addition, in the case where an app that must be newly executed is an app provided by a third party, it is difficult for the speech recognition service to control an app so as to correspond to a user input.

An aspect of the present disclosure provides a method of processing a user input to request a service associated with a third party app provided by a third party.

Another aspect of the present disclosure, for processing a user input to request a service associated with a third party app, provides a user terminal that may grasp an intent of a user through a cloud server, receive, from the cloud server, information associated with the service depending on the intent of the user and provide the user with the information, and thus execute the third party app provided by a third party so as to be matched with the intent of the user.

In accordance with an aspect of the present disclosure, a system for processing a user utterance is provided. The system includes at least one network interface, at least one processor operatively connected to the at least one network interface, and at least one memory operatively connected to the at least one processor, wherein the at least one memory stores a plurality of specified sequences of states of at least one external electronic device, wherein each of the specified sequences is associated with a respective one of domains, wherein the at least one memory further stores instructions that, when executed, cause the at least one processor to receive first data associated with the user utterance provided via a first of the at least one external electronic device, wherein the user utterance includes a request for performing a task using the first of the at least one external device, wherein the first of the at least one external device is configured to execute a plurality of application programs; when the user utterance includes a name of at least one of the plurality of application programs, determine a domain, using the name of the at least one of the plurality of application programs, when the user utterance does not include the name of the at least one of the plurality of application programs, determine a domain associated with the user utterance, based on the first data; and determine a first sequence of states for the first of the at least one external device to perform the task, based at least partly on the determined domain, and provide the first sequence of states to the first of the at least one external device.

In accordance with another aspect of the present disclosure, a system for processing a user utterance is provided. The system includes at least one network interface, at least one processor operatively connected to the at least one network interface, and at least one memory operatively connected to the at least one processor, wherein the at least one memory stores instructions that, when executed, cause the at least one processor to receive a status of a first of the at least one external electronic device, wherein the first of the at least one external device is configured to execute a plurality of application programs, and wherein the status is associated with at least one of the plurality of application programs, receive first data associated with a user utterance provided via the first of the at least one external electronic device, wherein the user utterance includes a request for performing a task using the first of the at least one external device, determine an intent associated with the user utterance, based at least partly on the first data and the status, determine a first sequence of states for the first of the at least one external device to perform the task, based partly on the at least one of the plurality of application programs, and provide the first sequence of states to the first of the at least one external device.

In accordance with another aspect of the present disclosure, a system is provided. The system includes at least one network interface, at least one processor operatively connected to the at least one network interface, and at least one memory operatively connected to the at least one processor, wherein the at least one memory stores a first natural language understanding (NLU) unit configured to interact with at least one client device, and a second NLU unit configured to interact with at least one external server, wherein the at least one memory further stores instructions that, when executed, cause the at least one processor to receive a status of a first client device configured to execute a plurality of application programs, wherein the status is associated with at least one of the plurality application programs, receive first voice data associated with a user utterance provided from the first of the at least one client device, wherein the user utterance includes a first request for performing a task using the first of the at least one client device, process the first voice data with an automatic speech recognition (ASR) unit to generate first text data, provide the first text data via the first NLU unit to the second NLU unit, determine an intent associated with the user utterance, based at least partly on the first text data, using the second NLU unit, and provide the determined intent via the first NLU unit to the first of the at least one client device.

In accordance with another aspect of the present disclosure, a system is provided. The system includes at least one network interface, at least one processor operatively connected to the at least one network interface, and at least one memory operatively connected to the at least one processor, wherein the at least one memory stores a first NLU unit configured to interact with at least one client device, and a second NLU unit configured to interact with at least one external server, wherein the at least one memory further stores instructions that, when executed, cause the at least one processor to receive a status of a first of the at least one client device configured to execute a plurality of application programs, wherein the status is associated with at least one of the plurality of application programs, receive first voice data associated with a user utterance provided from the first of the at least one client device, wherein the user utterance includes a first request for performing a task using the first of the at least one client device, process the first voice data with an ASR unit to generate first text data, provide the first text data via the first NLU unit to the second NLU unit, determine an intent of the user utterance based on the first text data by using the second NLU unit, and provide the determined intent via the second NLU unit to the first of the at least one client device.

BRIEF DESCRIPTION OF THE DRAWINGS

The above and other aspects, features, and advantages of the present disclosure will be more apparent from the following detailed description, taken in conjunction with the accompanying drawings, in which:

FIG. 7 is an illustration of a plurality of path rules stored for each domain, according to an embodiment;

DETAILED DESCRIPTION

Hereinafter, various embodiments of the present disclosure are described below with reference to the accompanying drawings. However, those of ordinary skill in the art will recognize that a modification, an equivalent, and/or an alternative on the present disclosure described herein may be made without departing from the scope and spirit of the present disclosure.

Prior to describing an embodiment of the present disclosure, an integrated intelligent system to which the present disclosure is capable of being applied is described below.

Figure 1:
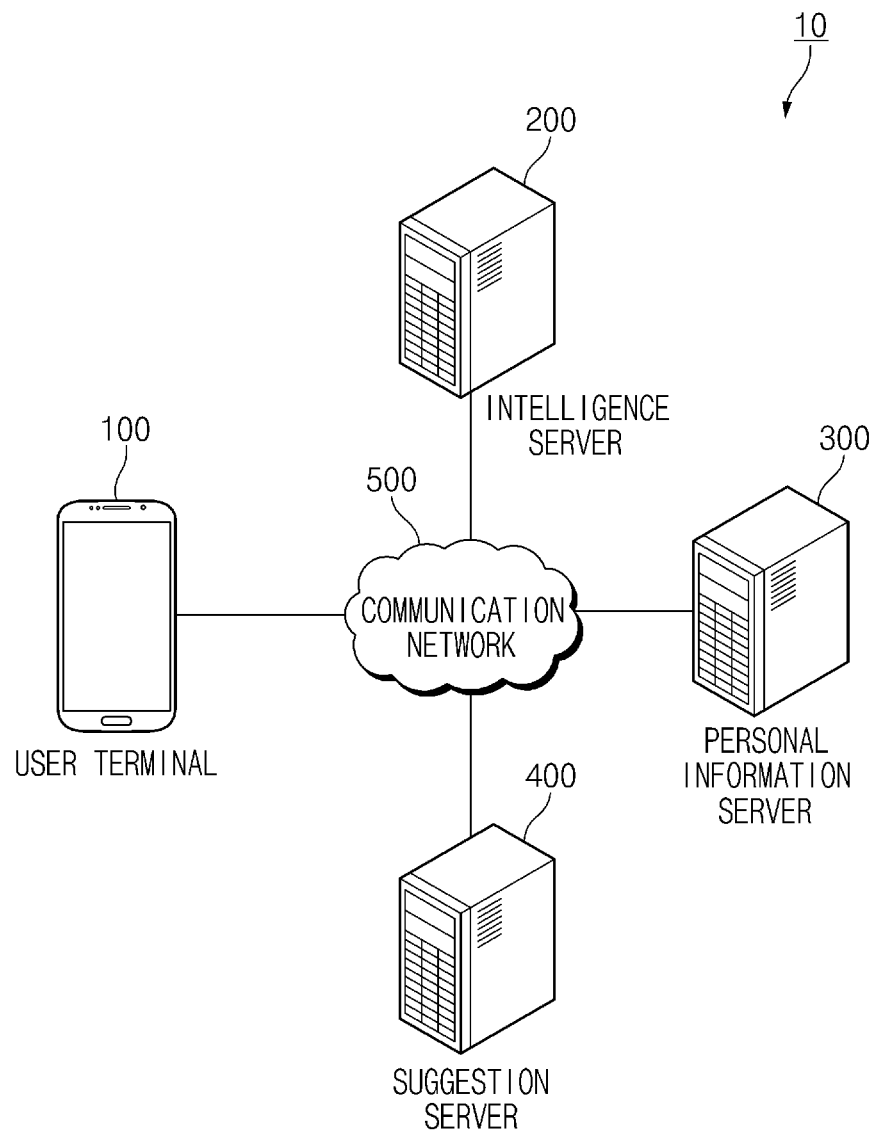
FIG. 1 is an illustration of an integrated intelligent system, according to an embodiment.

FIG. 1 is an illustration of an integrated intelligent system, according to an embodiment.

Referring to FIG. 1, an integrated intelligent system 10 may include a user terminal 100, an intelligence server (or intelligence system) 200, a personal information server 300, or a suggestion server 400.

The user terminal 100 may provide a service necessary for a user through an app (e.g., an alarm app, a message app, a picture (gallery) app, or the like) stored in the user terminal 100. For example, the user terminal 100 may execute and operate another app through an intelligence app (or a speech recognition app) stored in the user terminal 100. The other app may be executed through the intelligence app of the user terminal 100 and a user input for executing an action may be received. For example, the user input may be received through a physical button, a touch pad, a voice input, a remote input, or the like. According to an embodiment, various types of terminal devices (or an electronic device), which are connected with the Internet, such as a mobile phone, a smartphone, a personal digital assistant (PDA), a notebook computer, and the like may correspond to the user terminal 100.

According to an embodiment, the user terminal 100 may receive a user utterance as a user input. The user terminal 100 may receive the user utterance and generate a command for operating an app based on the user utterance. As such, the user terminal 100 may operate the app by using the command.

The intelligence server 200 may receive a voice input of a user from the user terminal 100 over a communication network and convert the voice input to text data. In an embodiment, the intelligence server 200 may generate (or select) a path rule based on the text data. The path rule may include information about an action (or an operation) for performing a function of an app or information about a parameter necessary to perform the action. In addition, the path rule may include an order of the action of the app. The user terminal 100 may receive the path rule, select an app depending on the path rule, and execute the action included in the path rule in the selected app.

Generally, the term "path rule" of the present disclosure may indicate, but is not limited to, a sequence of states in which an electronic device performs a task requested by a user. In other words, a path rule may include information about a sequence of states. For example, a task may be a certain action that an intelligence app is capable of providing. A task may include the generation of a schedule, the transmission of a picture to a desired component, or providing weather information. The user terminal 100 may perform a task by sequentially having at least one or more states (e.g., an operating state of the user terminal 100).

According to an embodiment, a path rule may be provided or generated by an artificial intelligent (AI) system. An AI system may be a rule-based system or a neural network-based system (e.g., a feedforward neural network (FNN) or a recurrent neural network (RNN)). Alternatively, an AI system may be a combination of the above-described systems or an AI system that is different from the above-described systems. A path rule may be selected from a set of predefined path rules or generated in real time in response to a user request. For example, an AI system may select at least a path rule of a predefined plurality of path rules or generate a path rule dynamically (or in real time). Furthermore, the user terminal 100 may use a hybrid system to provide a path rule.

According to an embodiment, the user terminal 100 may execute an action and display a screen corresponding to a status of the user terminal 100, which executes the action, in a display. The user terminal 100 may execute the action and not display the result obtained by executing the action in the display. For example, the user terminal 100 may execute a plurality of actions and display only the result of a part of the plurality of actions in the display. For example, the user terminal 100 may display only the result, which is obtained by executing the last action, in the display. For example, the user terminal 100 may receive the user input to display the result obtained by executing the action in the display.

The personal information server 300 may include a database in which user information is stored. For example, the personal information server 300 may receive user information (e.g., context information, information about execution of an app, or the like) from the user terminal 100 and store the user information in the database. The intelligence server 200 may receive the user information from the personal information server 300 over the communication network and generate a path rule associated with the user input. According to an embodiment, the user terminal 100 may receive the user information from the personal information server 300 over a communication network 500 and use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network 500 and provide the information to the user.

Figure 2:
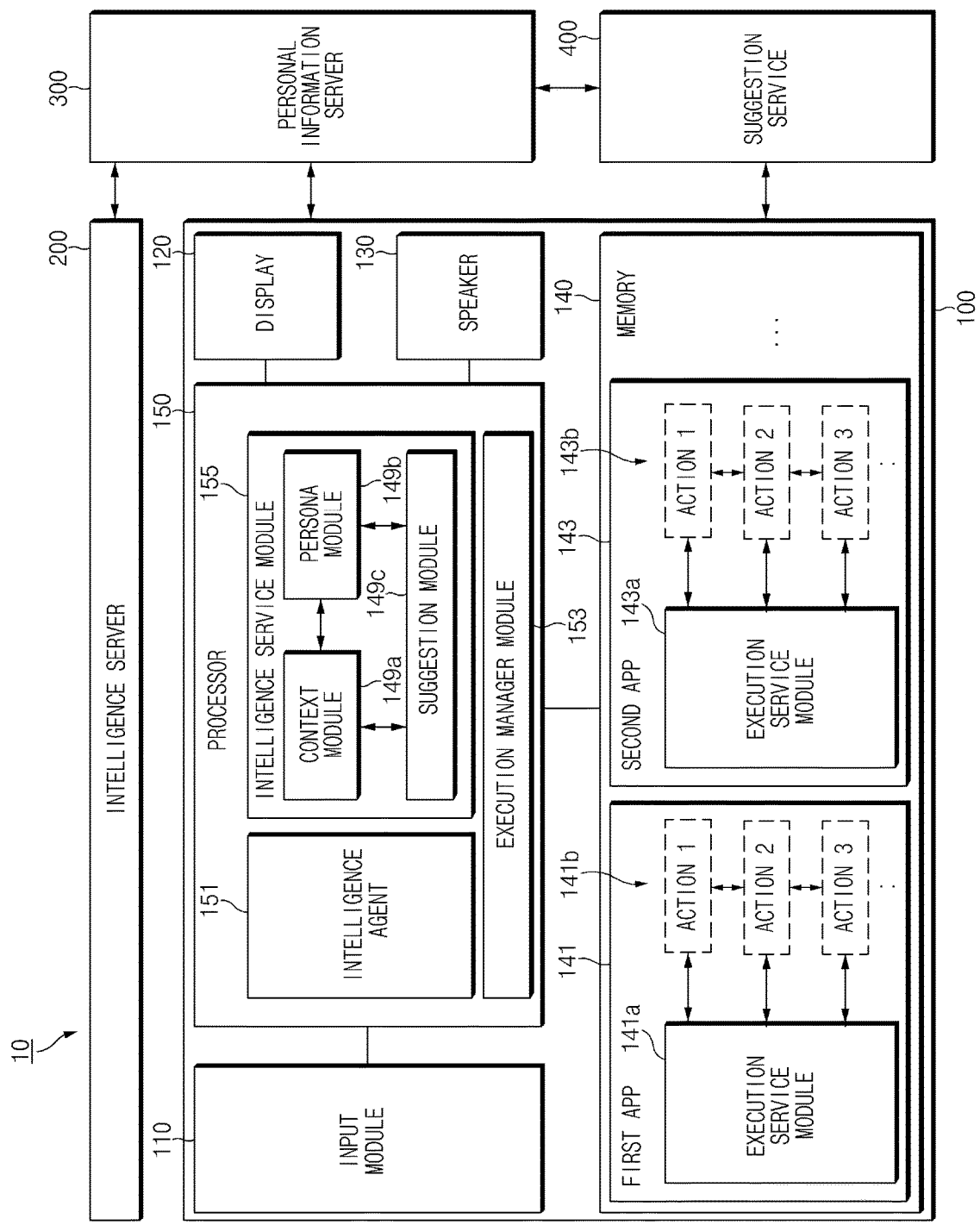
FIG. 2 is a block diagram of a user terminal of an integrated intelligent system, according to an embodiment.

FIG. 2 is a block diagram of a user terminal 100 of an integrated intelligent system, according to an embodiment.

Referring to FIG. 2, the user terminal 100 may include an input module 110, a display 120, a speaker 130, a memory 140, or a processor 150. The user terminal 100 may further include a housing, where elements of the user terminal 100 may be seated in the housing or positioned on the housing.

According to an embodiment, the input module 110 may receive a user input from a user. For example, the input module 110 may receive a user input from a connected external device (e.g., a keyboard or a headset). For example, the input module 110 may include a touch screen (e.g., a touch screen display) coupled to the display 120. For example, the input module 110 may include a hardware key (or a physical key) positioned in the user terminal 100 (or the housing of the user terminal 100). The user terminal 100 may transmit or receive data (or information) to or from an external server (e.g., the intelligence server 200) through the communication network 500.

According to an embodiment, the input module 110 may include a microphone that is capable of receiving an utterance of a user as a voice signal. For example, the input module 110 may include a speech input system and receive an utterance of a user as a sound signal through the speech input system. For example, a microphone may be exposed through a part (e.g., a first portion) of the housing.

According to an embodiment, the display 120 may display an image, a video, and/or an execution screen of an application. For example, the display 120 may display a graphic user interface (GUI) of an app. The display 120 may be exposed to a part (e.g., a second part) of the housing.

The speaker 130 may output a voice signal. For example, the speaker 130 may output a voice signal generated in the user terminal 100 to the outside. The speaker 130 may be exposed to a part (e.g., a third portion) of the housing.

According to an embodiment, the memory 140 may store a plurality of apps (or application program) (e.g., a first app 141 and a second app 143). For example, the plurality of apps (e.g., the first app 141 and the second app 143) may be a program for performing a function corresponding to the user input. The processor 150 may include an intelligence agent 145, an execution manager module 147, or an intelligence service module 149, which may also be stored in the memory 140. For example, the intelligence agent 145, the execution manager module 147 and the intelligence service module 149 may be a framework (or application framework) for processing a received user input (e.g., a user utterance).

According to an embodiment, the memory 140 may include a database capable of storing information necessary to recognize a user input. For example, the memory 140 may include a log database capable of storing log information. For example, the memory 140 may include a persona database capable of storing user information.

According to an embodiment, the memory 140 may store the plurality of apps 141 and 143, where the plurality of apps (e.g., the first app 141 and the second app 143) may be loaded to operate. For example, the plurality of apps (e.g., the first app 141 and the second app 143) stored in the memory 140 may operate after being loaded by the execution manager module 147. The plurality of apps (e.g., the first app 141 and the second app 143) may include execution service modules 141a and 143a performing a function, respectively. The plurality of apps (e.g., the first app 141 and the second app 143) may perform a plurality of actions (e.g., a sequence of states) 141b and 143b through the execution service modules 141a and 143a for performing a function, respectively. In other words, the execution service modules 141a and 143a may be activated by the execution manager module 147 and execute the plurality of actions 141b and 143b.

According to an embodiment, when the actions 141b and 143b of the apps 141 and 143 are executed, an execution state screen according to the execution of the actions 141b and 143b may be displayed in the display 120. For example, an execution state screen may be a screen in a state where the actions 141b and 143b are completed. For example, the execution state screen may be a screen in a state where the execution of the actions 141b and 143b is in partial landing (e.g., in the case where a parameter necessary for the actions 141b and 143b are not entered).

According to an embodiment, the execution service modules 141a and 143a may execute the actions 141b and 143b depending on a path rule. For example, the execution service modules 141a and 143a may be activated by the execution manager module 147, receive an execution request from the execution manager module 147 depending on a path rule, and execute functions of the first app 141 and the second app 143 by performing the actions 141b and 143b depending on the execution request, respectively. When the execution of the actions 141b and 143b is completed, the execution service modules 141a and 143a may transmit completion information to the execution manager module 147.

According to an embodiment, in a case where the plurality of the actions 141b and 143b are respectively executed in the first app 141 and the second app 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and transmit the completion information to the execution manager module 147. In this case, it is understood that opening an arbitrary action is to change a state of the arbitrary action to an executable state or to prepare the execution of the action. In other words, when the arbitrary action is not opened, the corresponding action may not be executed. When the completion information is received, the execution manager module 147 may transmit the execution request associated with the next action (e.g., action 2 of the first app 141 or action 2 of the second app 143) to the execution service modules 141a and 143a. In a case where the plurality of apps (e.g., the first app 141 and the second app 143) are executed, the plurality of apps (e.g., the first app 141 and the second app 143) may be sequentially executed. For example, when receiving the completion information after the execution of the last action (e.g., action 3 of the first app 141) of the first app 141 is completed, the execution manager module 147 may transmit the execution request of the first action (e.g., action 1 of the second app 143) of the second app 143 to the execution service module 143a.

According to an embodiment, in a case where the plurality of the actions 141b and 143b are executed in the first app 141 and the second app 143, a result screen according to the execution of each of the executed plurality of actions 141b and 143b may be displayed in the display 120. Only a part of a plurality of result screens according to the executed plurality of the actions 141b and 143b may be displayed in the display 120.

According to an embodiment, the memory 140 may store an intelligence app (e.g., a speech recognition app) operating in conjunction with the intelligence agent 145. An app operating in conjunction with the intelligence agent 145 may receive and process an utterance of the user as a voice signal. An app operating in conjunction with the intelligence agent 145 may be operated by a certain input (e.g., an input through a hardware key, an input through a touchscreen, or a certain voice input) input through the input module 110.

According to an embodiment, the intelligence agent 145, the execution manager module 147, or the intelligence service module 149 in the processor 150, which may be stored in the memory 140, may be performed by the processor 150. The functions of the intelligence agent 145, the execution manager module 147, or the intelligence service module 149 may be implemented by the processor 150. The function of each of the intelligence agent 145, the execution manager module 147, and the intelligence service module 149 is the operation of the processor 150. The intelligence agent 145, the execution manager module 147, or the intelligence service module 149 stored in the memory 140 may be implemented with hardware as well as software.

According to an embodiment, the processor 150 may control overall actions of the user terminal 100. For example, the processor 150 may control the input module 110 to receive a user input. The processor 150 may control the display 120 to display an image. The processor 150 may control the speaker 130 to output a voice signal. The processor 150 may control the memory 140 to execute a program and to read or store information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate an instruction for launching an app based on a voice signal received as a user input. The processor 150 may execute the execution manager module 147 to launch the first app 141 and the second app 143 stored in the memory 140 depending on the generated instruction. The processor 150 may execute the intelligence service module 149 to manage information of a user and process a user input by using the information of the user.

The processor 150 may execute the intelligence agent 145 to transmit a user input received through the input module 110 to the intelligence server 200 and process the user input through the intelligence server 200.

According to an embodiment, before transmitting the user input to the intelligence server 200, the processor 150 may execute the intelligence agent 145 to pre-process the user input. To pre-process a user input, the intelligence agent 145 may include an adaptive echo canceller (AEC) module, a noise suppression (NS) module, an end-point detection (EPD) module, or an automatic gain control (AGC) module. The AEC may remove an echo included in a user input. The NS module may suppress background noise in a user input. The EPD module may detect an end-point of a user voice in a user input and search for a part in which the user voice is present, by using the detected end-point. The AGC module may recognize a user input and adjust the volume of the user input so as to be suitable to process the recognized user input. The processor 150 may execute all the pre-processing elements for performance. However, the processor 150 may execute a part of the pre-processing elements to operate at low power.

According to an embodiment, the intelligence agent 145 may execute a wakeup recognition module stored in the memory 140 for recognizing a call of a user. As such, the processor 150 may recognize the wakeup command of a user through the wakeup recognition module and execute the intelligence agent 145 for receiving user input when receiving the wakeup command. The wakeup recognition module may be implemented with a low-power processor (e.g., a processor included in an audio codec). When receiving a user input through a hardware key, the processor 150 may execute the intelligence agent 145. In a case where the intelligence agent 145 is executed, an intelligence app (e.g., a speech recognition app) operating in conjunction with the intelligence agent 145 may be executed.

According to an embodiment, the intelligence agent 145 may include a speech recognition module for performing the user input. The processor 150 may recognize the user input for executing an action in an app through the speech recognition module. For example, the processor 150 may recognize a limited user (voice) input (e.g., an utterance such as a click for performing a capture operation when a camera app is being executed) for performing an action such as a wakeup command in the first app 141 and the second app 143 through the speech recognition module. For example, the processor 150 may assist the intelligence server 200 to recognize and rapidly process a user command capable of being processed in the user terminal 100 through the speech recognition module. The speech recognition module of the intelligence agent 145 for executing a user input may be implemented in an app processor.

According to an embodiment, the speech recognition module (including the speech recognition module of a wake up module) of the intelligence agent 145 may recognize the user input by using an algorithm for recognizing a voice. For example, an algorithm for recognizing a voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert a voice input of a user into text data. For example, the processor 150 may transmit a voice of a user to the intelligence server 200 through the intelligence agent 145 and receive text data corresponding to the voice of the user from the intelligence server 200. As such, the processor 150 may display the converted text data in the display 120.

According to an embodiment, the processor 150 may execute the intelligence agent 145 to receive a path rule (or sequence) from the intelligence server 200. The processor 150 may transmit the path rule to the execution manager module 147 through the intelligence agent 145.

According to an embodiment, the processor 150 may execute the intelligence agent 145 to transmit an execution result log according to a path rule received from the intelligence server 200 to the intelligence service module 149, and the transmitted execution result log may be accumulated and managed in preference information of a user of a persona module 149*b*.

According to an embodiment, the processor 150 may execute the execution manager module 147, receive the path rule from the intelligence agent 145, and execute the apps 141 and 143; and the processor 150 may allow the apps 141 and 143 to execute the actions 141*b* and 143*b* included in the path rule. For example, the processor 150 may transmit command information (e.g., path rule information) for executing the actions 141*b* and 143*b* to the first app 141 and the second app 143, through the execution manager module 147; and the processor 150 may receive completion information of the actions 141b and 143b from the first app 141 and the second app 143.

According to an embodiment, the processor 150 may execute the execution manager module 147 to transmit the command information (e.g., path rule information) for executing the actions 141b and 143b of the first app 141 and the second app 143 between the intelligence agent 145 and the first app 141 and the second app 143. The processor 150 may bind the first app 141 and the second app 143 to be executed depending on the path rule through the execution manager module 147 and may transmit the command information (e.g., path rule information) of the actions 141b and 143b included in the path rule to the first app 141 and the second app 143. For example, the processor 150 may sequentially transmit the actions 141b and 143b included in the path rule to the first app 141 and the second app 143, through the execution manager module 147 and may sequentially execute the actions 141b and 143b of the first app 141 and the second app 143 depending on the path rule.

According to an embodiment, the processor 150 may execute the execution manager module 147 to manage execution states of the actions 141b and 143b of the first app 141 and the second app 143. For example, the processor 150 may receive information about the execution states of the actions 141b and 143b from the first app 141 and the second app 143, through the execution manager module 147. For example, in the case where the execution states of the actions 141b and 143b are in partial landing (e.g., in the case where a parameter necessary for the actions 141b and 143b are not input), the processor 150 may transmit information about the partial landing to the intelligence agent 145, through the execution manager module 147. The processor 150 may make a request for an input of necessary information (e.g., parameter information) to the user by using the received information through the intelligence agent 145. For example, in a case where the execution state of each of the actions 141b and 143b is an operating state, the processor 150 may receive an utterance from a user through the intelligence agent 145. The processor 150 may transmit information about the first app 141 and the second app 143 being executed and the execution states of the first app 141 and the second app 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may transmit the received parameter information to the execution manager module 147 through the intelligence agent 145. The execution manager module 147 may change a parameter of each of the actions 141b and 143b to a new parameter by using the received parameter information.

According to an embodiment, the processor 150 may execute the execution manager module 147 to transmit parameter information included in the path rule to the first app 141 and the second app 143. In a case where the plurality of apps (e.g., the first app 141 and the second app 143) are sequentially executed depending on the path rule, the execution manager module 147 may transmit the parameter information included in the path rule from one app to another app.

According to an embodiment, the processor 150 may execute the execution manager module 147 to receive a plurality of path rules. The processor 150 may select a plurality of path rules based on an utterance of a user, through the execution manager module 147. For example, in a case where a user utterance specifies one app (e.g., the first app 141) executing one action 141b but does not specify the other app (e.g., the second app 143) executing the other action 143b, the processor 150 may receive a plurality of different path rules, in which the same app (e.g., the first app 141) (e.g., gallery app) executing the one action 141b is executed and in which a different app (e.g., the second app 143) (e.g., a message app or a telegram app) executing the other action 143b is executed, through the execution manager module 147. For example, the processor 150 may execute the same actions 141b and 143b (e.g., the same successive actions 141b and 143b) of the plurality of path rules, through the execution manager module 147. In a case where the processor 150 executes the same action, the processor 150 may display a state screen for selecting different apps (e.g., the first app 141 and the second app 143) included in the plurality of path rules in the display 120 through the execution manager module 147.

According to an embodiment, the intelligence service module 149 may include a context module 149a, the persona module 149b, or a suggestion module 149c.

The context module 149a may collect current states of the apps (e.g., the first app 141 and the second app 143) from the apps (e.g., the first app 141 and the second app 143). For example, the context module 149a may receive context information indicating the current states of the apps (e.g., the first app 141 and the second app 143) to collect the current states of the apps (e.g., the first app 141 and the second app 143).

The persona module 149b may manage personal information of the user utilizing the user terminal 100. For example, the persona module 149b may collect the usage information and the execution result of the user terminal 100 to manage personal information of the user.

The suggestion module 149c may predict the intent of the user to recommend a command to the user. For example, the suggestion module 149c may recommend the command to the user in consideration of the current state (e.g., a time, a place, a situation, or an app) of the user.

Figure 3:
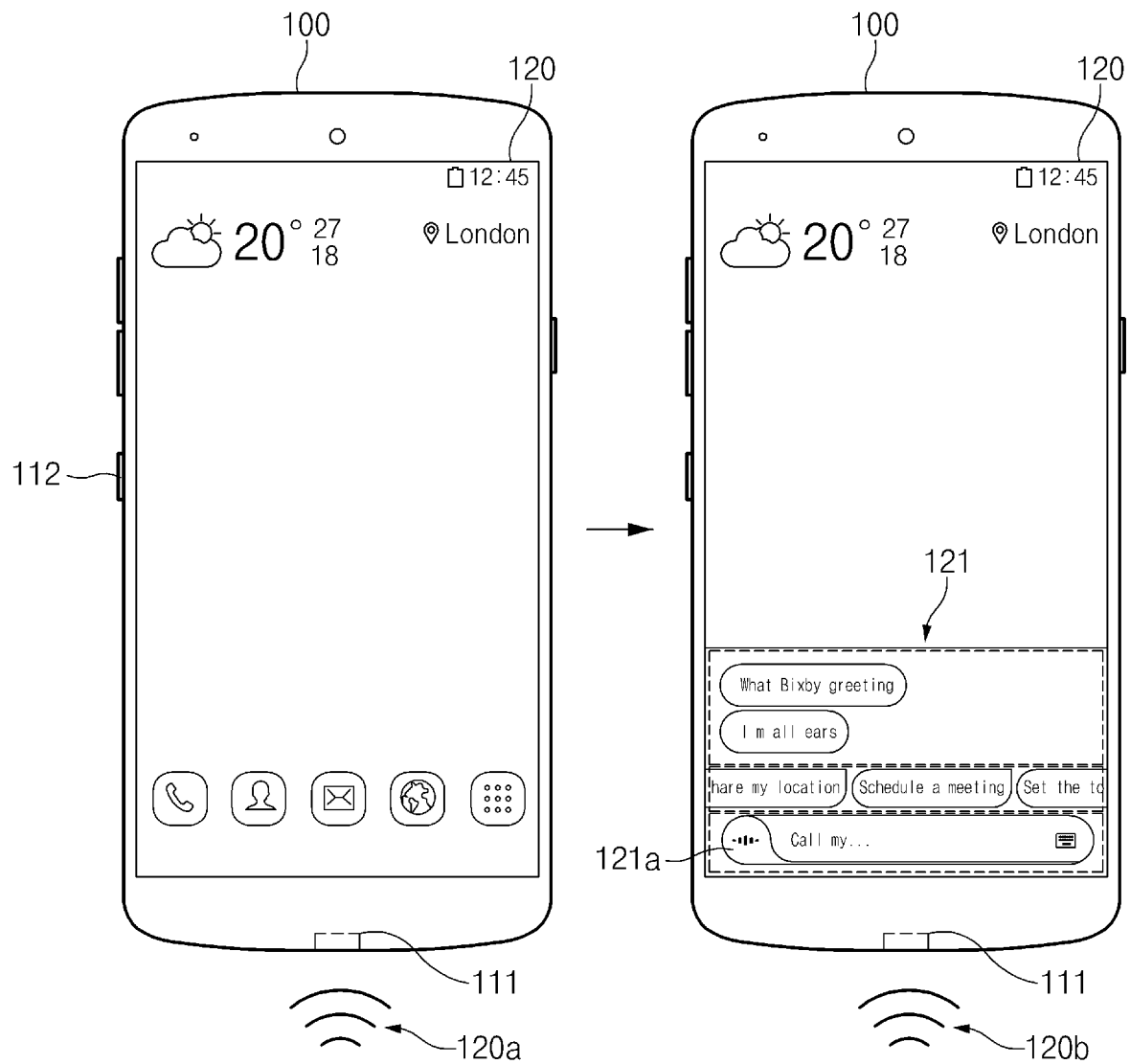
FIG. 3 is an illustration of an intelligence app of a user terminal being executed, according to an embodiment.

FIG. 3 is an illustration of an intelligence app of a user terminal 100 being executed, according to an embodiment.

Referring to FIG. 3, the user terminal 100 receives a user input to execute an intelligence app (e.g., a speech recognition app) operating in conjunction with the intelligence agent 145.

According to an embodiment, the user terminal 100 may execute the intelligence app for recognizing a voice through a hardware key 112. For example, in a case where the user terminal 100 receives a user input through the hardware key 112, the user terminal 100 may display a user interface (UI) 121 of the intelligence app in the display 120. For example, a user may touch a speech recognition button 121a to the UI 121 of the intelligence app for entering a voice 111b in a state where the UI 121 of the intelligence app is displayed in the display 120. For example, while continuously pressing the hardware key 112 to enter the voice 120b, the user may enter the voice 120b.

According to an embodiment, the user terminal 100 may execute the intelligence app for recognizing a voice through a microphone 111. For example, in a case where a voice (e.g., "wake up!") 120a is entered through the microphone 111, the user terminal 100 may display the UI 121 of the intelligence app in the display 120.

Figure 4:
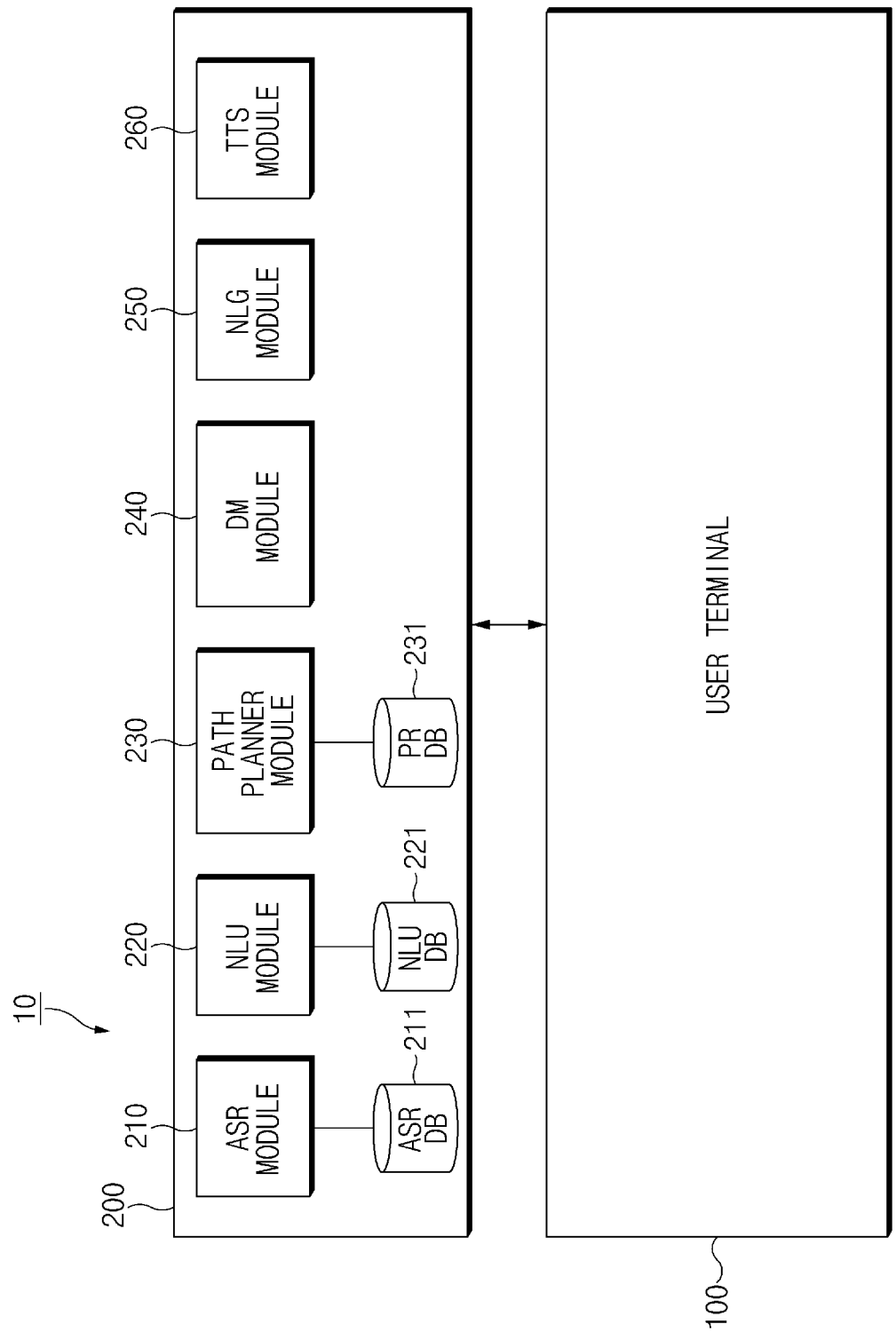
FIG. 4 is a block diagram of an intelligence server of an integrated intelligent system, according to an embodiment.

FIG. 4 is a block diagram of an intelligence server 200 of an integrated intelligent system 10, according to an embodiment.

Referring to FIG. 4, the intelligence server (or intelligence system) 200 may include an ASR module 210, an NLU module 220, a path planner module 230, a dialogue manager (DM) module 240, a natural language generator (NLG) module 250, or a text to speech (TTS) module 260. According to an embodiment, the intelligence server 200 may include a communication circuit (or network interface), a memory, and a processor. The processor may execute an instruction stored in the memory to drive the ASR module 210, the NLU module 220, the path planner module 230, the DM module 240, the NLG module 250, and the TTS module 260. The intelligence server 200 may transmit or receive data (or information) to or from an external electronic device (e.g., the user terminal 100) through the communication circuit.

The NLU module 220 or the path planner module 230 of the intelligence server 200 may generate a path rule (or sequence).

According to an embodiment, the ASR module 210 may change the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert user speech to text data by using the information associated with phonation and unit phoneme information. For example, the information about the acoustic model and the language model may be stored in an automatic speech recognition database (ASR DB) 211.

According to an embodiment, the NLU module 220 may grasp user intent by performing a syntactic analysis or a semantic analysis. The syntactic analysis may divide a user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to an embodiment, the NLU module 220 may determine an intent of a user and a parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp a meaning of words extracted from a user input by using linguistic features (e.g., grammatical elements) such as morphemes, phrases, and the like and may match the meaning of the grasped words to a domain and intent to determine user intent. For example, the NLU module 220 may calculate how many words extracted from the user input are included in each of the domain and the intent for determining the user intent. The NLU module 220 may determine a parameter of the user input by using the words which are used for grasping the intent. The NLU module 220 may determine the user intent by using the NLU DB 221 which stores the linguistic features for grasping the intent of the user input. The NLU module 220 may determine the user intent by using a personal language model (PLM). For example, the NLU module 220 may determine the user intent by using the personalized information (e.g., a contact list or a music list). For example, the PLM may be stored in the NLU DB 221. The ASR module 210 and the NLU module 220 may recognize the voice of the user with reference to the PLM stored in the NLU DB 221.

According to an embodiment, the NLU module 220 may generate a path rule based on an intent of a user input and a parameter. For example, the NLU module 220 may select an app to be executed based on the intent of the user input and determine an action to be executed in the selected app. The NLU module 220 may determine the parameter corresponding to the determined action to generate the path rule. The path rule generated by the NLU module 220 may include information about the app to be executed, the action (e.g., at least one or more states) to be executed in the app, and a parameter necessary to execute the action.

According to an embodiment, the NLU module 220 may generate one path rule or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to an embodiment, the NLU module 220 may determine an app to be executed, an action to be executed in the app, and a parameter necessary to execute the action based on an intent of a user input and the parameter for generating one path rule or a plurality of path rules. For example, the NLU module 220 may arrange the app to be executed and the action to be executed in the app by using information of the user terminal 100 depending on the intent of the user input in the form of ontology or a graph model for generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For example, in a case where only a part of an action is specified based on a user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For example, the NLU module 220 may transmit the plurality of path rules corresponding to the user input to the user terminal 100. For example, in a case where only a part of an action is specified based on a user utterance, a plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in table form. For example, the path planner module 230 may transmit a path rule set corresponding to information (e.g., operating system (OS) information or app information) of the user terminal 100, which is received from the intelligence agent 145, to the NLU module 220. For example, a table stored in the PR DB 231 may be stored for each domain or for each version of a domain.

According to an embodiment, the path planner module 230 may select one path rule or a plurality of path rules from a path rule set to transmit the selected one path rule or the selected plurality of path rules to the NLU module 220. For example, the path planner module 230 may match a user intent and a parameter to the path rule set corresponding to the user terminal 100 to select one path rule or a plurality of path rules and may transmit the selected one path rule or the selected plurality of path rules to the NLU module 220.

According to an embodiment, the path planner module 230 may generate one path rule or a plurality of path rules by using a user intent and a parameter. For example, the path planner module 230 may determine an app to be executed and an action to be executed in the app based on the user intent and the parameter for generating one path rule or a plurality of path rules. The path planner module 230 may store the generated path rule in the PR DB 231.

According to an embodiment, the path planner module 230 may store a path rule generated by the NLU module 220 in the PR DB 231. The generated path rule may be added to the path rule set stored in the PR DB 231.

According to an embodiment, a table stored in the PR DB 231 may include a plurality of path rules or a plurality of path rule sets. The plurality of path rules or the plurality of path rule sets may reflect a kind, a version, a type, or a characteristic of a device performing each path rule.

According to an embodiment, the DM module 240 may determine whether a user intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. In a case where the user intent is not clear, the DM module 240 may provide feedback for making a request for necessary information to the user. For example, the DM module 240 may provide feedback for making a request for information about the parameter for grasping the user intent.

According to an embodiment, the DM module 240 may include a content provider module. In a case where a content provider module executes an action based on an intent and a parameter grasped by the NLU module 220, the content provider module may generate a result obtained by performing a task corresponding to a user input. The DM module 240 may transmit the result generated by the content provider module as the response to the user input to the user terminal 100.

According to an embodiment, the NLG module 250 may change certain information to a text form. Information changed to the text form may be a form of a natural language utterance. For example, the certain information may be information about an additional input, information for guiding the completion of an action corresponding to a user input, or information for guiding the additional input of the user (e.g., feedback information about the user input). The information changed to the text form may be displayed in the display 120 after being transmitted to the user terminal 100 or changed to a voice form after being transmitted to the TI'S module 260.

According to an embodiment, the TTS module 260 may change information of the text form to information of a voice form. The TTS module 260 may receive the information of the text form from the NLG module 250, change the information of the text form to the information of a voice form, and transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, determine user intent and a parameter, and generate a response (e.g., a path rule) corresponding to the determined user intent and parameter. As such, the generated response may be transmitted to the user terminal 100.

Figure 5:
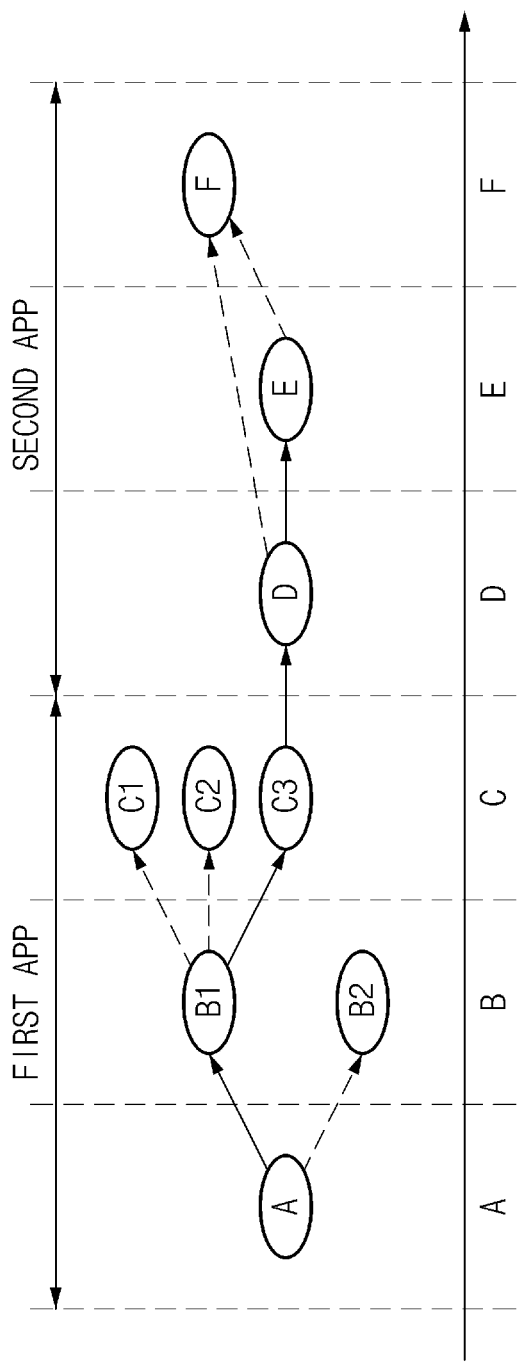
FIG. 5 is an illustration of a path rule generating method of an NLU, according to an embodiment.

FIG. 5 is an illustration of a path rule generating method of a path planner module, according to an embodiment.

Referring to FIG. 5, the NLU module 220 may divide a function of an app into any one action (e.g., state A to state F) and may store divided unit actions in the PR DB 231. For example, the NLU module 220 may store a path rule set including a plurality of path rules (A-B1-C1, A-B1-C2, A-B1-C3-D-F, and A-B1-C3-D-E-F) divided into the one action (or state), in the PR DB 231.

According to an embodiment, the PR DB 231 of the path planner module 230 may store a path rule set for performing a function of an app. The path rule set may include a plurality of path rules each of which includes a plurality of actions (e.g., a sequence of states). An action executed depending on a parameter input to each of the plurality of actions included in each of the plurality of path rules may be sequentially arranged. The plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B 1-C3-D-F, and A-B1-C3-D-E-F corresponding to the intent of a user input and the parameter.

According to an embodiment, in a case where there is no path rule completely matched to a user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit a selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for transmitting the selected one path rule to the user terminal 100.

According to an embodiment, the NLU module 220 may determine an intent of a user and a parameter corresponding to a user input (e.g., an input for selecting C3) additionally entered by the user terminal 100 for transmitting the determined user intent or the determined parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

For example, the user terminal 100 may complete the actions of apps (e.g., the first 141 and the second app 143) based on a selected one path rule.

According to an embodiment, in a case where a user input in which information is insufficient is received by the intelligence server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may transmit the partly corresponding path rule to the execution manager module 147. The processor 150 may execute the first app 141 depending on the path rule through the execution manager module 147. The processor 150 may transmit information about an insufficient parameter to the intelligence agent 145 through the execution manager module 147 while executing the first app 141. The processor 150 may make a request for an additional input to a user by using the information about the insufficient parameter through the intelligence agent 145. When an additional input is received by a user, the processor 150 may transmit and process a user input to the intelligence server 200 through the intelligence agent 145. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145 to execute the second app 143.

According to an embodiment, in a case where a user input, in which a portion of information is missing, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is partly missing, by using the user information. For example, even though the user input in which a portion of information is missing is received by the intelligence server 200, the NLU module 220 may make a request for the missing information to receive an additional input or may determine a path rule corresponding to the user input by using user information.

According to an embodiment, Table 1 below may indicate an exemplary form of a path rule associated with a task that a user requests.

TABLE 1

| Path rule ID | State | parameter |
|---|---|---|
| Gallery_101 | PictureView 25 | NULL |
| | SearchView 26 | NULL |
| | SearchViewResult 27 | Location, time |
| | SearchEmptySelectedView 28 | NULL |
| | SearchSelectedView 29 | ContentType, selectall |
| | CrossShare 30 | Anaphora |

Referring to Table 1 above, a path rule that is generated or selected by an intelligence server (e.g., the intelligence server 200 of FIG. 1) depending on user speech (e.g., "please share a picture") may include at least one state 25, 26, 27, 28, 29 or 30. For example, the at least one state (e.g., one operating state of a terminal) may correspond to at least one of picture application execution PicturesView 25, picture search function execution SearchView 26, search result display screen output SearchViewResult 27, search result display screen output, in which a picture is not selected, SearchEmptySelectedView 28, search result display screen output, in which at least one picture is selected, SearchSelectedView 29, or share application selection screen output CrossShare 30.

In an embodiment, parameter information of a path rule may correspond to at least one state. For example, the search result display screen output, in which at least one picture is selected, SearchSelectedView 29 may be included in the at least one state.

The task (e.g., "please share a picture!") that a user requests may be performed depending on the execution result of the path rule including the sequence of the states 25, 26, 27, 28, and 29.

Figure 6:
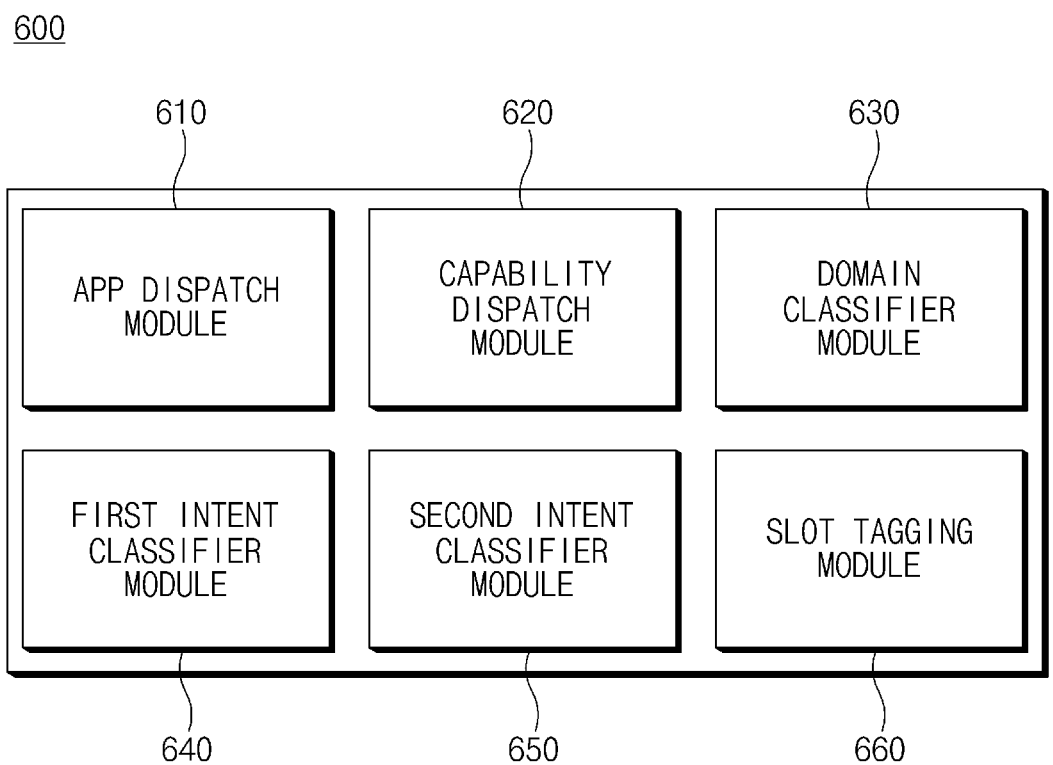
FIG. 6 is a block diagram of each function of an NLU module, according to an embodiment.

FIG. 6 is a block diagram of each function of an NLU module, according to an embodiment.

Referring to FIG. 6, an NLU module 600 may include an app dispatch module 610, a capability dispatch module 620, a domain classifier module 630, a first intent classifier module 640, a second intent classifier module 650, and a slot tagging module 660. The NLU module 600 may be similar to the NLU module 220 of FIG. 4. For example, the NLU module 600 may generate (or select) a path rule (or sequence) by using text data corresponding to a user input (e.g., voice). The path rule may include, for example, the sequence of states of the electronic device 100.

According to an embodiment, the NLU module 600 may learn a user utterance to generate a model and may generate a path rule corresponding to a user input by using a generated model. For example, the learned model may include a domain and a path rule included in the domain. The domain may correspond to an app stored in the memory of the user terminal 100. The path rule may correspond to a certain utterance. The path rule corresponding to the user input may be generated by dividing and recognizing the certain utterance by using a certain criteria (e.g., a certain function). Each configuration of the NLU module 600 may generate a response corresponding to the user input by using different models.

According to an embodiment, the app dispatch module 610 may determine whether a user input includes a certain word for determining an app that is executed or terminated depending on the user input. For example, the app dispatch module 610 may determine whether the user input includes an app name (e.g., a gallery app or a short message service (SMS) app). For example, the app dispatch module 610 may determine whether the user input includes a word (e.g., "exit" or "bye") for terminating an app.

According to an embodiment, in a case where the app dispatch module 610 recognizes a certain word, the app dispatch module 610 may determine a domain corresponding to a user input. For example, the app dispatch module 610 may determine an app performing a task corresponding to the user input and may determine a domain corresponding to the app as a domain corresponding to user input. For example, the app dispatch module 610 may determine only whether the user input includes the certain word, to determine the domain corresponding to the user input.

According to an embodiment, the capability dispatch module 620 may select a plurality of apps for performing a task corresponding to a user input. For example, the capability dispatch module 620 may select a plurality of apps (e.g., a gallery app and a memo app) corresponding to the same function (e.g., an edit function).

According to an embodiment, the capability dispatch module 620 may receive a user input to select one of a plurality of apps. For example, the capability dispatch module 620 may transmit information about the plurality of apps to the user terminal 100 and may receive a user input to select one app of the plurality of apps, through the user terminal 100. For example, the capability dispatch module 620 may determine a domain corresponding to the selected one app, as a domain corresponding to user input.

According to an embodiment, the domain classifier module 630 may determine the domain corresponding to a user input. For example, similar to a method of determining a domain of the NLU module 220 of FIG. 4, the domain classifier module 630 may determine a domain corresponding to the user input by using a linguistic feature (e.g., a grammar feature) of the user input.

According to an embodiment, the domain classifier module 630 may determine a domain corresponding to a user input. However, it may take a long time to determine the domain, as compared with the app dispatch module 610 or the capability dispatch module 620 which determines the domain by recognizing a certain word or function. As such, the NLU module 600 may operate the app dispatch module 610 and the capability dispatch module 620. In a case where the NLU module 600 does not determine the domain corresponding to the user input through the app dispatch module 610 and the capability dispatch module 620, the NLU module 600 may determine the domain corresponding to the user input through the domain classifier module 630.

According to an embodiment, the first intent classifier module 640 may grasp an intent of a user input by using a natural language understanding method based on rules (or rule matching) stored in a database (or memory), and may determine a path rule depending on the grasped intent. For example, the first intent classifier module 640 may grasp the intent, which corresponds to the user input, from among a plurality of intents included in the domain determined through the domain classifier module 630 and may determine the path rule depending on the grasped intent. The first intent classifier module 640 may determine the path rule corresponding to the user input by matching a plurality of path rules with the user input.

According to an embodiment, the second intent classifier module 650 may determine an intent of a user input by using natural language understanding based on statistical schemes including deep learning schemes and may determine a path rule depending on the grasped intent. For example, the second intent classifier module 650 may grasp (or determine) the intent corresponding to the user input by using a linguistic feature of the user input. For example, the second intent classifier module 650 may grasp the intent corresponding to the user input by using a PLM. The second intent classifier module 650 may determine the path rule corresponding to the user input based on the grasped intent. For example, the second intent classifier module 650 may calculate a matching probability (or a confidence level) of a plurality of path rules included in the domain determined through the app dispatch module 610, the capability dispatch module 620, or the domain classifier module 630, based on the grasped intent and may select the path rule having the highest matching probability as the path rule corresponding to the user input.

According to an embodiment, the second intent classifier module 650 may determine a path rule among a plurality of path rules included in a domain corresponding to an app being executed in the user terminal 100, as a path rule corresponding to the user input. For example, the second intent classifier module 650 may calculate the matching probability of the plurality of path rules included in a domain corresponding to an app being executed in the user terminal 100, based on the grasped intent of the user input and may select a path rule corresponding to the user input.

According to an embodiment, compared with the first intent classifier module 640, it takes a longer time when the second intent classifier module 650 determines a path rule, however, the second intent classifier module 650 may select a correct path rule. As such, the NLU module 600 may first determine whether the path rule determined through the first intent classifier module 640 corresponds to a certain path rule (e.g., a full path rule). In a case where a determined path rule is not the certain path rule, the NLU module 600 may determine a path rule corresponding to the user input through the second intent classifier module 650.

According to an embodiment, the slot tagging module 660 may extract a parameter necessary for a state included in a path rule. For example, the slot tagging module 660 may extract a parameter necessary for the state included in the path rule determined through the first intent classifier module 640 or the second intent classifier module 650, in words included in the user input from the user input and may tag the parameter with the state.

According to an embodiment, when not determining a domain of a user input even through the configuration, the NLU module 600 may receive a user input to select an app executed by a user and may determine the domain of the user input. For example, the NLU module 600 may transmit guide information for receiving a user input to select an app to be executed to the user terminal 100. For example, the guide information for receiving the user input may be generated through the NLG module 250.

For example, the NLU module 600 may determine a path rule corresponding to a user input. For determining the path rule corresponding to the user input among a plurality of path rules stored in a database, the NLU module 600 may classify the plurality of path rules stored in the database based on a domain corresponding to an app and may set a path rule corresponding to each of a plurality of user utterances for executing a function of the app.

FIG. 7 is an illustration of a plurality of path rules stored for each domain, according to an embodiment.

Referring to FIG. 7, a plurality of path rules corresponding to a user input may be separately stored for each domain.

According to an embodiment, the plurality of path rules may be divided into a plurality of domains including a first domain Domain1, a second domain Domain2, and a third domain Domain3 and may be stored in a database. The plurality of domains may include a domain corresponding to a native app and a third party app. For example, the native app may be an app (e.g., an SMS app) managed by a manufacturer of the user terminal 100 or an operator of the intelligence server 200. In addition, the native app may perform a task corresponding to the user input by using the path rule. The third party app may be an app (e.g., a food delivery app) managed by a third party other than the manufacturer of the user terminal 100 or the operator of the intelligence server 200. Another NLU module other than the NLU module 600 may be used to perform at least part of the function of the third party app. An NLU module different from the NLU module 600 may be additionally included in the intelligence server 200 of FIG. 2. Furthermore, the third party app may include a web app using web pages.

According to an embodiment, the domain of each of the first domain Domain1, the second domain Domain2, and the third domain Domain3 may include a plurality of path rules. For example, the first domain Domain1 may include a plurality of path rules (e.g., first path rule App1_PathRule_1 to fourteenth path rule App1_PathRule_14) associated with a first app App1. For example, the second domain Domain2 may include a plurality of path rules (e.g., first path rule App2_PathRule_1 to fourteenth path rule App2_PathRule_14) associated with a second app App2. For example, the third domain Domain3 may include a plurality of path rules (e.g., first path rule App3_PathRule_1 to fourteenth path rule App3_PathRule_14) associated with a third app App3.

According to an embodiment, the plurality of path rules included in the domain of each of the first domain Domain1, the second domain Domain2, and the third domain Domain3 may be divided into a global rule and a non-global rule. For example, the global rule may be a full path rule. The full path rule may be a path rule corresponding to a root utterance (e.g., "search for a picture of Hawaii in the gallery app") that is executable in a status of the user terminal 100. The non-global rule may be a path rule (e.g., partial path rule) other than the global rule. The partial path rule may be a path rule corresponding to a follow-up utterance (e.g., "search for Hawaii") that is executable in a certain status of the user terminal 100. The certain (or selected) path rule among a plurality of path rules included in the domain of each of the first domain Domain1, the second domain Domain2, and the third domain Domain3 may be set to the global path rule. For example, a path rule, for performing a certain function, from among the plurality of path rules may be set to the global path rule.

According to an embodiment, the NLU module 600 of FIG. 6 may recognize a certain word included in the user input and may determine the domain (e.g., first domain Domain1) corresponding to the user input. For example, the certain word may be an app name (e.g., gallery app). The NLU module 600 may select (or determine) one path rule (e.g., first path rule App1_PathRule_1) among a plurality of path rules (e.g., first path rule App1_PathRule_1 to fourteenth path rule App1_PathRule_14) included in the domain corresponding to the specified word.

According to an embodiment, in a case where a user input does not include a certain word, the NLU module 600 may not determine a domain (e.g., second domain Domain2) corresponding to the user input. In a case where the NLU module 600 does not determine the domain corresponding to the user input, the NLU module 600 may not determine the path rule (e.g., sixth path rule App2_PathRule_6) corresponding to the user input. For example, the path rule may be the non-global path rule (e.g., partial path rule). The NLU module 600 may transmit, to the user terminal 100, guide information for requesting a user input to select an app to be executed. The NLU module 600 may determine one path rule (e.g., sixth path rule App2_PathRule_6) among a plurality of path rules (e.g., first path rule App2_PathRule_1 to fourteenth path rule App2_PathRule_14) included in a domain (e.g., second domain Domain2) selected based on the user input to select an app to be executed, as a path rule corresponding to the user input.

According to an embodiment, the NLU module 600 may recognize a user input including a command for performing a certain function and may determine the path rule corresponding to the user input. For example, in the case where the user input includes the command for performing a certain function, the NLU module 600 may determine a global path rule (e.g., first path rule App2_PathRule_1). For example, the NLU module 600 may generate a path rule corresponding to the user input, without the recognition of the certain word corresponding to a domain (e.g., second domain Domain2).

For example, the NLU module 600 may determine a path rule corresponding to a user input, based on a plurality of path rules stored in a database for each domain.

Figure 8:
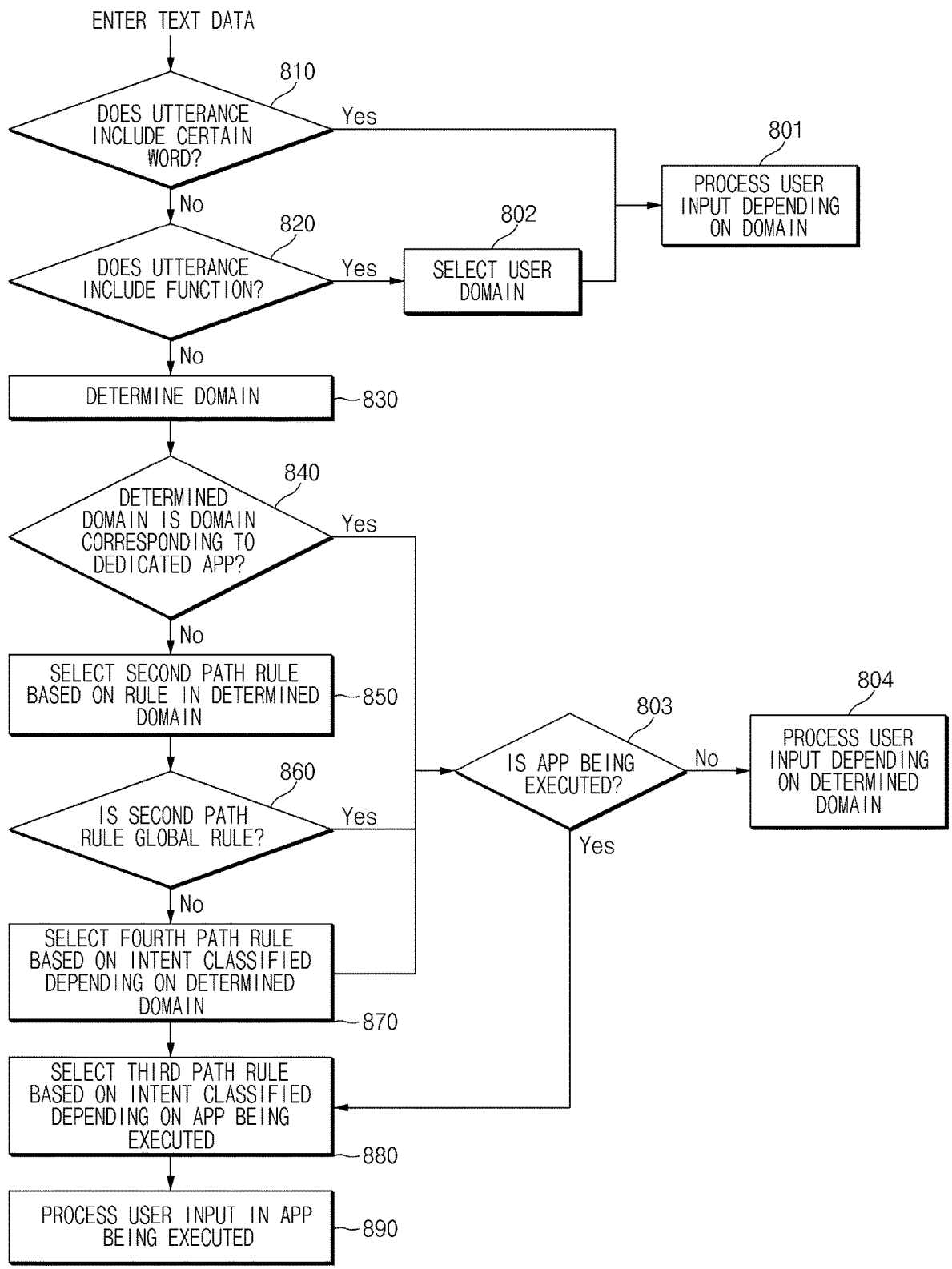
FIG. 8 is a flowchart of a path rule generating method of an NLU module, according to an embodiment.

FIG. 8 is a flowchart of a path rule generating method of an NLU module.

Referring to FIG. 8, the NLU module 600 of FIG. 6 may receive text data corresponding to a user utterance. For example, the NLU module 600 may receive data associated with a user utterance from the user terminal 100 (or external electronic device) through the communication circuit. For example, the user input may include a request for performing at least one task by using the external electronic device.

According to an embodiment, in a case where a user input corresponds to the certain user utterance, the NLU module 600 may determine a path rule (or the sequence of states) of the user terminal 100 performing the task, by using a first app corresponding to the user input.

According to an embodiment, in the case where a user input does not correspond to a certain user utterance, the NLU module 600 may determine an app, which will perform a function corresponding to the user utterance, to determine a path rule of the user terminal 100 for performing a task using a second app of the user terminal 100 or to generate guide information for receiving a user input to select a third app.

According to an embodiment, the NLU module 600 may transmit a determined path rule of the user terminal 100 or generated guide information to an external electronic device.

According to an embodiment, in step 810, the NLU module 600 (e.g., the app dispatch module 610) may determine whether a user utterance includes a certain word. For example, the NLU module 600 may determine whether the user utterance includes a name of an app (e.g., a gallery app). The NLU module 600 may determine a domain corresponding to the certain word. For example, the NLU module 600 may determine whether the user input includes a command (e.g., "exit!") for terminating the app. The NLU module 600 may determine whether the user input includes at least one of the name of the app and the command for terminating the app. In a case where the command for terminating the app is entered, the user terminal 100 may terminate the app being executed and the process may not proceed any more. In step 801, in a case where the user input includes the name of the app, the NLU module 600 may process the user input depending on the domain corresponding to the user input. A method in which the NLU module 600 processes a user input is described below in greater detail with respect to FIG. 9.

According to an embodiment, in a case where a user input does not include a name of a app, in step 820, the NLU module 600 (e.g., the capability dispatch module 620) may determine whether the user input (or utterance) includes a command for performing the certain function of an app. In a case where the user input includes the command for performing the function of the app, in step 802, the NLU module 600 may transmit information about a plurality of apps for performing the certain function, to the user terminal 100. For example, the user terminal 100 may provide a user with the information about the plurality of apps and may receive a user input to select one app among the plurality of apps. The NLU module 600 may perform step 801.

According to an embodiment, in a case where a user input does not include a command for performing a function of an app, in step 830, the NLU module 600 (e.g., the domain classifier module 630) may determine a domain corresponding to the user input. In step 840, the NLU module 600 may determine whether the determined domain is a domain corresponding to the dedicated app (e.g., chatbot) for processing the user input. The dedicated app may be an app that does not use a path rule to perform a task. Alternatively, the domain corresponding to the dedicated app may not include the path rule. In a case where the user input corresponds to the domain of the dedicated app, the NLU module 600 may not generate the path rule corresponding to the user input. The NLU module 600 may obtain the result corresponding to the user input instead of the path rule and may allow the dedicated app to display the obtained result.

According to an embodiment, in a case where a determined domain is the same as a domain corresponding to a dedicated app, in step 803, the NLU module 600 may determine whether the app is being executed in the user terminal 100. The NLU module 600 may verify the state (e.g., whether the app is being executed, home screen, or lock screen) of the user terminal 100 to determine whether the app is being executed.

According to an embodiment, in a case where a app is not being executed in the user terminal 100, in step 804, the NLU module 600 may process a user input depending on the determined domain. A method in which the NLU module 600 processes a user input is described below in greater detail with respect to FIG. 10.

According to an embodiment, in a case where the determined domain is not the same as a domain corresponding to a dedicated app, in step 850, the NLU module 600 (e.g., the first intent classifier module 640) may select (or determine) a second path rule based on the rule included in the determined domain. For example, the NLU module 600 may determine the second path rule depending on the intent determined by using a natural language understanding scheme based on a rule stored in the database. In step 860, the NLU module 600 may determine whether the selected second path rule is a global rule. In a case where the selected second path rule is the global path rule, the NLU module 600 may determine whether to determine the intent associated with a user utterance, based on the status of the user terminal 100. For example, in step 803, the status of the user terminal 100 may be a state where the app is being executed.

According to an embodiment, in a case where the selected second path rule is not the global path rule, in step 870, the NLU module 600 (e.g., the second intent classifier module 650) may select a fourth path rule among path rules included in the determined domain, based on deep learning schemes. For example, the NLU module 600 may determine the intent of the user utterance by using the natural language understanding based on a statistical scheme (e.g., a linguistic feature, or a PLM) including a deep learning scheme, and may select the fourth path rule based on the determined intent. For example, the NLU module 600 may determine the intent based on the determined domain and the user utterance. The NLU module 600 may determine the path rule by using matching rules of the domain, intent, and parameter (or slot) with respect to the grammatical components. When the fourth path rule is determined, in step 803, the NLU module 600 may determine whether to determine the intent associated with the user utterance, based on the status (e.g., the execution state of the app) of the user terminal 100. For example, the fourth path rule may be the same as the second path rule selected by step 860.

According to an embodiment, in a case where an app is being executed in the user terminal 100, in step 880, the NLU module 600 (e.g., the second intent classifier module 650) may select a third path rule among path rules included in the determined domain, based on the intent classified depending on the app (or domain corresponding to the app being executed) being executed. For example, the intent classified depending on the app being executed may be different from the intent classified depending on the domain determined in step 870. Furthermore, intents classified depending on the app being executed may be the same as each other. As such, the third path rule selected by the NLU module 600 may be the same as or different from the second path rule selected by step 860.

According to an embodiment, in step 890, the NLU module 600 (e.g., the second intent classifier module 650) may process a user input depending on the domain corresponding to the app being executed. A method in which the NLU module 600 processes a user input is described below in greater detail with respect to FIG. 11.

According to an embodiment, in a case where the second path rule selected in step 850 and step 860 is a global path rule, the NLU module 600 may transmit the second path rule to the user terminal 100. The NLU module 600 may determine whether the selected path rule corresponds to the global path rule. In a case where it is determined that the selected path rule corresponds to the global path rule, the NLU module 600 may not perform step 840. Similar to step 860 after step 870, the NLU module 600 may determine whether the fourth path rule corresponds to the global path rule. In a case where the fourth path rule is the global path rule, the NLU module 600 may transmit the fourth path rule to the user terminal 100. In a case where the selected path rule is the non-global path rule in step 850 and step 860, the NLU module 600 may perform step 803. In a case where the app is being executed in the user terminal 100, the NLU module 600 may perform step 880 and step 890. In a case where the app is not being executed in the user terminal 100, the NLU module 600 may transmit guide information for receiving an additional user input (e.g., app selection) to the user terminal 100.

According to an embodiment, the NLU module 600 may determine whether the user terminal 100 executes an app in step 803 to select a path rule to be transmitted to the user terminal 100. The NLU module 600 may determine whether the user terminal 100 executes the app to select a path rule corresponding to the user input. In a case where it is determined that the user terminal 100 executes the app, the NLU module 600 may not perform step 860. For example, in a case where the user terminal 100 executes the app, in step 880, the NLU module 600 may select the third path rule based on the user utterance and the determined domain. In step 804 or step 1030, the NLU module 600 may transmit the third path rule to the user terminal 100. The NLU module 600 may verify the confidence level of the selected third path rule. In a case where the confidence level of the third path rule is low, the NLU module 600 may transmit the second path rule selected in step 850, instead of the third path rule to the user terminal 100.

Figure 9:
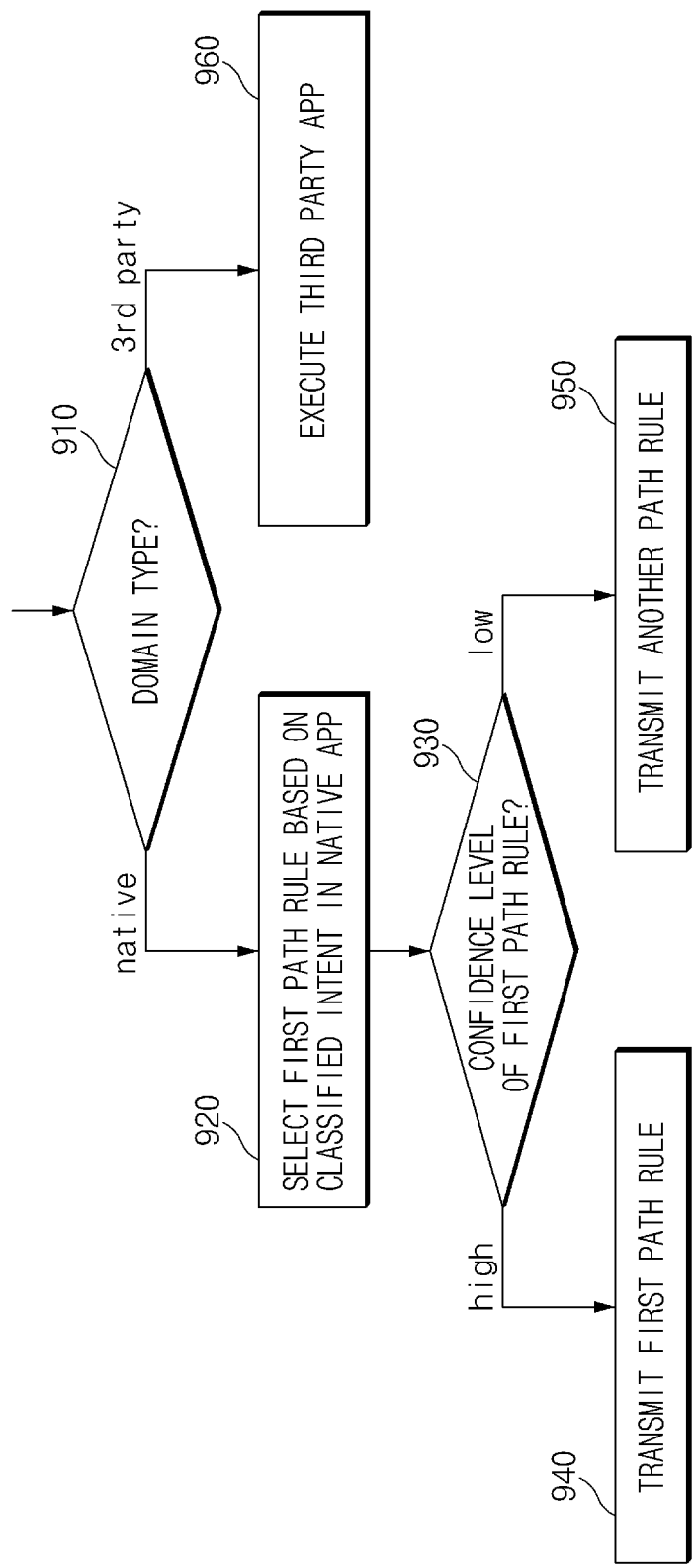
FIG. 9 is a flowchart of a method in which an NLU module processes a user input depending on a determined domain, according to an embodiment.

FIG. 9 is a flowchart of a method in which an NLU module processes a user input depending on a determined domain. That is, FIG. 9 illustrates a method of step 801 in FIG. 8.

Referring to FIG. 9, in a case where a user input includes a certain word or a domain corresponding to the user input is determined by including a function of an app in step 810 or step 802, the NLU module 600 of FIG. 6 may process the user input depending on the determined domain.

According to an embodiment, in step 910, the NLU module 600 may determine the type of the determined domain. For example, the NLU module may determine whether the app corresponding to the determined domain corresponds to one of a native app and a third party app.

According to an embodiment, in a case where an app corresponding to the determined domain is the native app, in step 920, the NLU module 600 (e.g., the second intent classifier module 650) may select a first path rule among path rules included in the determined domain depending on the grasped intent of the user input.

According to an embodiment, in step 930, the NLU module 600 (e.g., the second intent classifier module 650) may calculate the confidence level of the first path rule.

According to an embodiment, in a case where the confidence level of the first path rule is high, in step 940, the NLU module 600 may transmit the first path rule as a path rule corresponding to the user input. In other words, in a case where the confidence level of the first path rule exceeds a certain value, the NLU module 600 may transmit the first path rule as the path rule corresponding to the user input.

According to an embodiment, in a case where the confidence level of the first path rule is low, in step 950, the NLU module 600 may transmit another path rule as the path rule corresponding to the user input. In other words, in a case where the confidence level of the first path rule is not greater than the certain value, the NLU module 600 may transmit another path rule as the path rule corresponding to the user input. For example, the NLU module 600 may transmit information about a plurality of path rules corresponding to the user input, to the user terminal 100. As such, the user terminal 100 may receive a user input to select one path rule among the plurality of path rules and may perform the operation of the user terminal 100 depending on the selected one path rule.

According to an embodiment, in a case where the app corresponding to the determined domain is a third party app (3rd party), in step 960, an NLU module that is different from the NLU module 600 may generate a command for executing the third party app, and may transmit the command to the user terminal 100.

Figure 10:
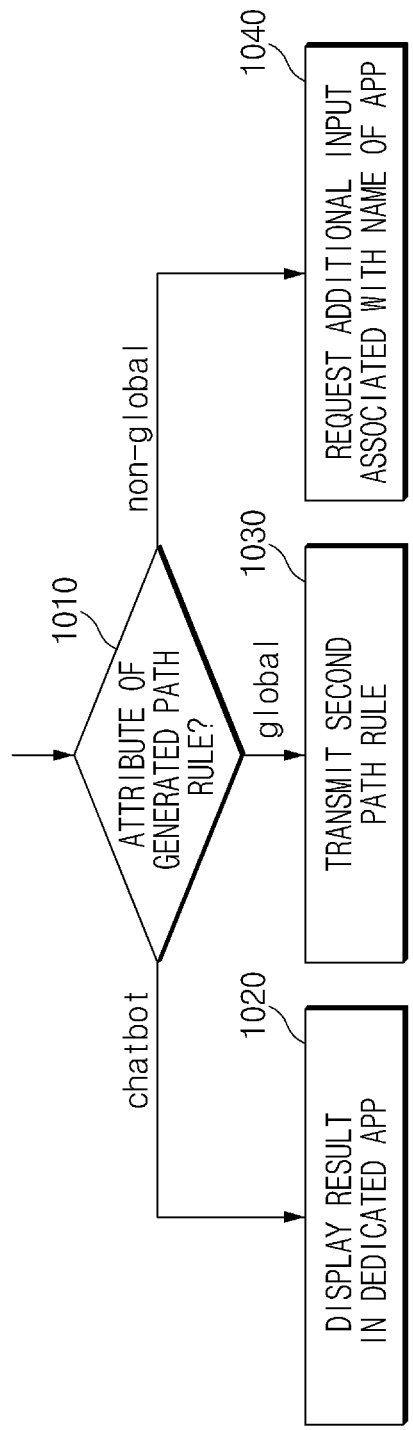
FIG. 10 is a flowchart of a method in which an NLU module processes a user input depending on a determined domain, according to an embodiment.

FIG. 10 is a flowchart of a method in which an NLU module processes a user input depending on a determined domain, according to an embodiment. That is, FIG. 9 illustrates a method of step 804 in FIG. 8.

Referring to FIG. 10, in a case where an app is not being executed in the user terminal 100 in step 803, the NLU module 600 of FIG. 6 may process a user input depending on the determined domain.

According to an embodiment, in step 1010, the NLU module 600 may determine an attribute of a generated path rule or whether the generated path rule is present.

According to an embodiment, in a case where a domain corresponding to the user input is the domain of the dedicated app (chatbot), in step 1020, a command for displaying the result corresponding to the user input in the dedicated app may be generated, and the generated command may be transmitted to the user terminal 100 through an NLU module different from the NLU module 600.

According to an embodiment, in a case where a second path rule corresponding to a user input is a global path rule, in step 1030, the NLU module 600 (e.g., the second intent classifier module 650) may transmit the second path rule to the user terminal 100. For example, the second path rule may be the global path rule corresponding to "find the picture of Hawaii!" entered when the user terminal 100 displays a home screen in a display.

According to an embodiment, in a case where a path rule corresponding to a user input is a non-global path rule, in step 1040, the NLU module 600 (e.g., the second intent classifier module 650) may transmit, to the user terminal 100, guide information requesting an additional user input (e.g., app selection) corresponding to the user input. For example, the non-global path rule may be the non-global path rule corresponding to "show me a credit card!" entered when the user terminal 100 displays a home screen in the display. The user terminal 100 may output the guide information "this is to do in another app" and "Tell me the name of the app!".

Figure 11:
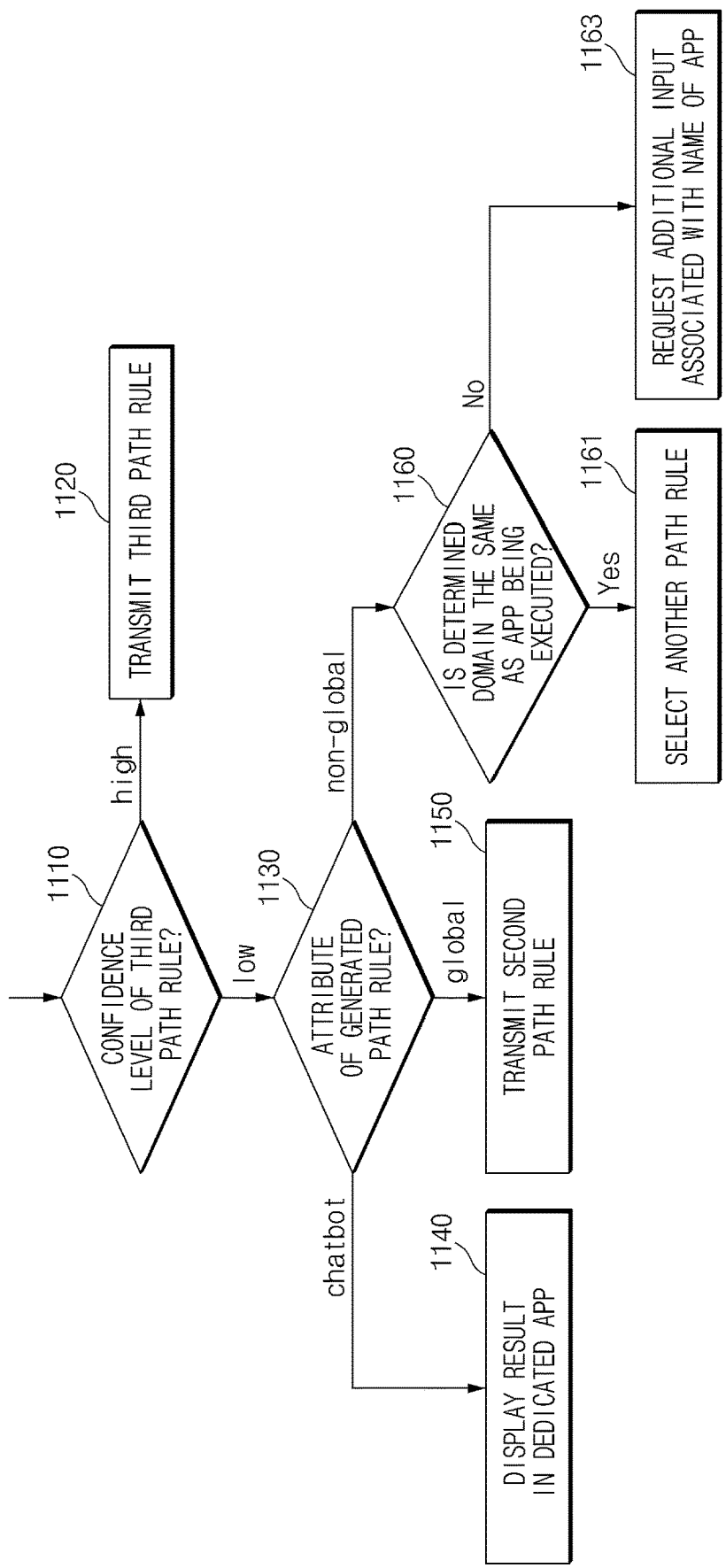
FIG. 11 is a flowchart of a method in which an NLU module processes a user input depending on a domain corresponding to an app being executed in a user terminal, according to an embodiment.

FIG. 11 is a flowchart of a method in which an NLU module processes a user input depending on a domain corresponding to an app being executed in a user terminal, according to an embodiment. That is, FIG. 11 illustrates a method of step 890 in FIG. 8.

Referring to FIG. 11, in a case where an app is being executed in the user terminal 100 in step 880, the NLU module 600 of FIG. 6 may process a user input depending on a domain corresponding to the app being executed.

According to an embodiment, in step 1110, the NLU module 600 may calculate a confidence level of a third path rule corresponding to a user input. In a case where the confidence level of the third path rule is high, in step 1120, the NLU module 600 may select the third path rule to transmit the third path rule to the user terminal 100. For example, the third path rule may be a path rule corresponding to "show me family album!" entered when the user terminal 100 displays the screen of a gallery app in a display.

According to an embodiment, in a case where a confidence level of a third path rule is low, in step 1130, the NLU module 600 (e.g., the second intent classifier module 650) may determine an attribute of the path rule generated in step 870 of FIG. 8 or whether the generated path rule is present, similar to step 1010 of FIG. 10. In step 1140, the NLU module 600 may transmit, to the user terminal 100, a command for displaying the result corresponding to the user input in a dedicated app, similar to step 1020 of FIG. 10. In a case where a second path rule corresponding to the user input is a global path rule, in step 1150, the NLU module 600 may select the second path rule to transmit the second path rule to the user terminal 100, similar to step 1030 of FIG. 10. For example, the second path rule may be a global path rule corresponding to "search for Kim Yeon-Ah!" entered when the user terminal 100 displays the screen of a gallery app in a display.

According to an embodiment, in a case where a first path rule corresponding to the user input is the non-global path rule, in step 1160, the NLU module 600 (e.g., the second intent classifier module 650) may determine whether the domain corresponding to the first path rule is the same as a domain corresponding to the app being executed in the user terminal 100.

According to an embodiment, in a case where a domain corresponding to the second path rule is the same as a domain corresponding to an app being executed in the user terminal 100, in step 1161, the NLU module 600 may select another path rule included in the domain corresponding to the app being executed in the user terminal 100, to the user terminal 100. The NLU module 600 may transmit a plurality of path rules to the user terminal 100. For example, the plurality of path rules may include at least one of the first path rule or the second path rule. For example, the first path rule may be a path rule corresponding to "edit the picture and attach the edited picture!" entered when the user terminal 100 displays the screen of a gallery app in the display.

According to an embodiment, in a case where a domain corresponding to a first path rule is different from a domain corresponding to an app being executed in the user terminal 100 (no), in step 1163, the NLU module 600 may transmit guide information for receiving a user input to select the app to the user terminal 100, similar to step 1040 of FIG. 10. For example, the second path rule may be the non-global path rule corresponding to "show me a credit card!" entered when the user terminal 100 displays the screen of a gallery app in the display. According to an embodiment, the NLU module 600 may request additional information about the selected third application program from the user terminal 100, may execute the third app to determine a path rule that will perform the task, and may transmit the determined path rule to the user terminal 100.

According to an embodiment, the NLU module 600 may transmit, to the user terminal 100, a response including a path rule or the like generated in response to the request received from the user terminal 100. The user terminal 100 may receive the response from the intelligence server 200 and may perform the operation of the user terminal 100 depending on the response.

According to an embodiment, the user terminal 100 may execute the first app to display the screen of the first app in the display. The user terminal 100 may receive a user input through the microphone, and the user input may include a request for performing at least one task through the app. The user terminal 100 may transmit data associated with the user input to the intelligence server 200 through a communication circuit. The user terminal 100 may receive a response including information about the path rule (or sequence of states of the user terminal 100) from the intelligence server 200 through the communication circuit.

According to an embodiment, in a case where the user input corresponds to a certain user input, the user terminal 100 may execute the second app depending on the response to display the screen of the second app in a display. For example, the certain user input may include at least one of a command for terminating the first app and the name of the second app. For example, the certain user input may include a command for performing the certain function of the second app. The response may include a path rule for performing a task by executing the second app corresponding to the user input.

According to an embodiment, in a case where the user input does not correspond to the certain user input, the user terminal 100 may execute the first app depending on the response to perform a task or may select a third app depending on the response. For example, the response may correspond to the user input, may include a path rule for performing a task by executing the first app or may include guide information for receiving a user input to select the third app.

Figure 12:
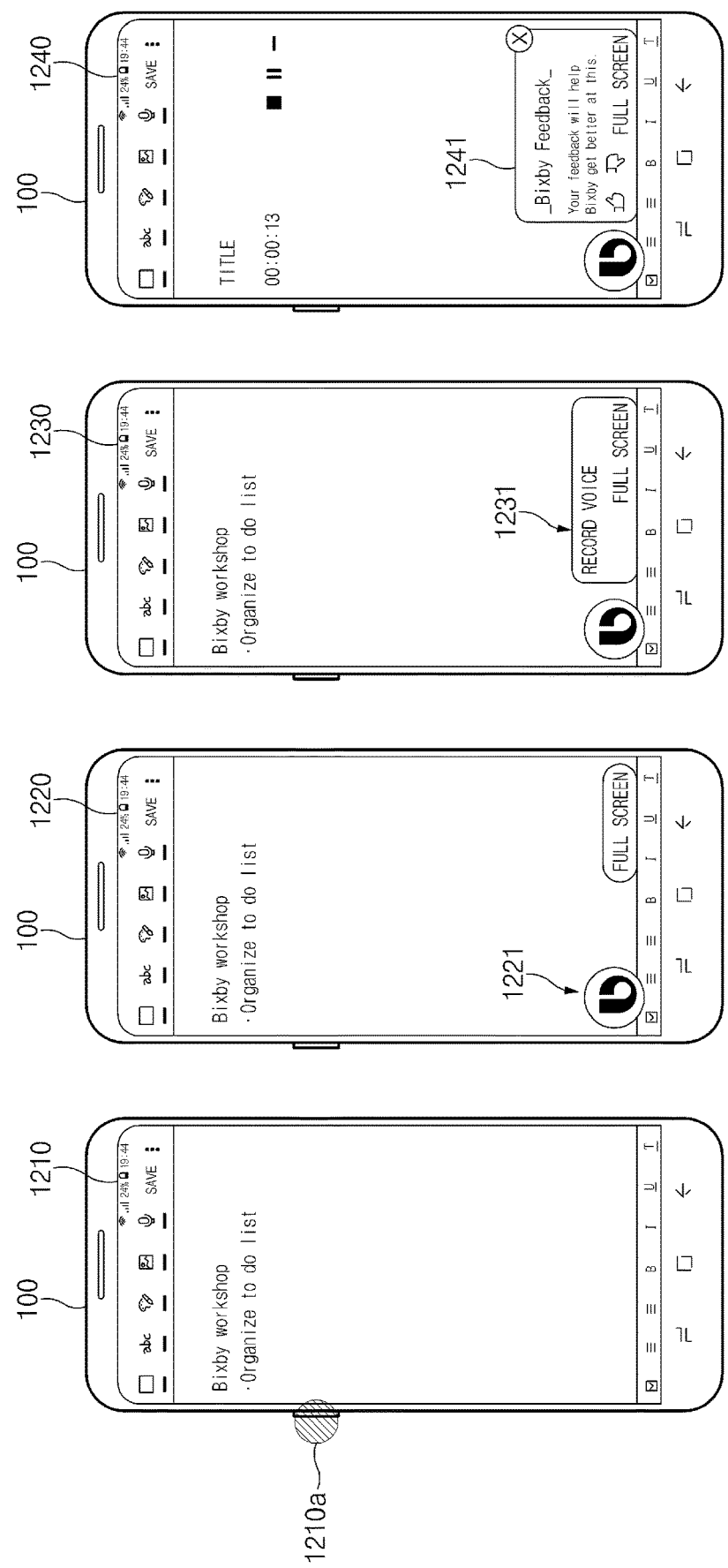
FIG. 12 is an illustration of a user terminal receiving a user input for performing a function of an app being executed, according to an embodiment.

FIG. 12 is an illustration of a user terminal 100 receiving a user input for performing a function of an app being executed, according to an embodiment.

Referring to FIG. 12, while executing a first app (e.g., memo app), the user terminal 100 may receive a user input (e.g., "record"). The user terminal 100 may receive a path rule corresponding to the user input through step 1120 of FIG. 11 of the intelligence server 200.

According to an embodiment, the user terminal 100 may execute a first app to display a screen 1210 of the first app in a display. The user terminal 100 may receive a user input 1210a (e.g., input through a hardware key) to receive a user utterance.

According to an embodiment, the user terminal 100 may display a screen 1220 for receiving the user utterance in the display. The screen 1220 for receiving the user utterance may include an indicator (e.g., an icon) 1221 indicating a state where the user utterance is received. The user terminal 100 may receive the user utterance (e.g., "record") from a user.

According to an embodiment, the user terminal 100 may receive text data corresponding to the user input from the intelligence server 200 and may display a screen 1230 for displaying the text data in the display. The screen 1230 for displaying the text data may include a text 1231 corresponding to the user utterance.

According to an embodiment, the user terminal 100 may receive a path rule associated with the first app from the intelligence server 200 and may display a screen 1240 for executing (e.g., executing a record function in a memo app) an operation corresponding to a state included in the path rule, in the display. For example, the screen 1240 for executing the operation corresponding to a state included in the path rule may include an indicator 1241 for receiving a feedback associated with a result of executing the operation. The intelligence server 200 may receive the user input, may execute step 1120 of FIG. 11 to select a path rule associated with a first app corresponding to a user input, and may transmit the selected path rule to the user terminal 100.

Figure 13:
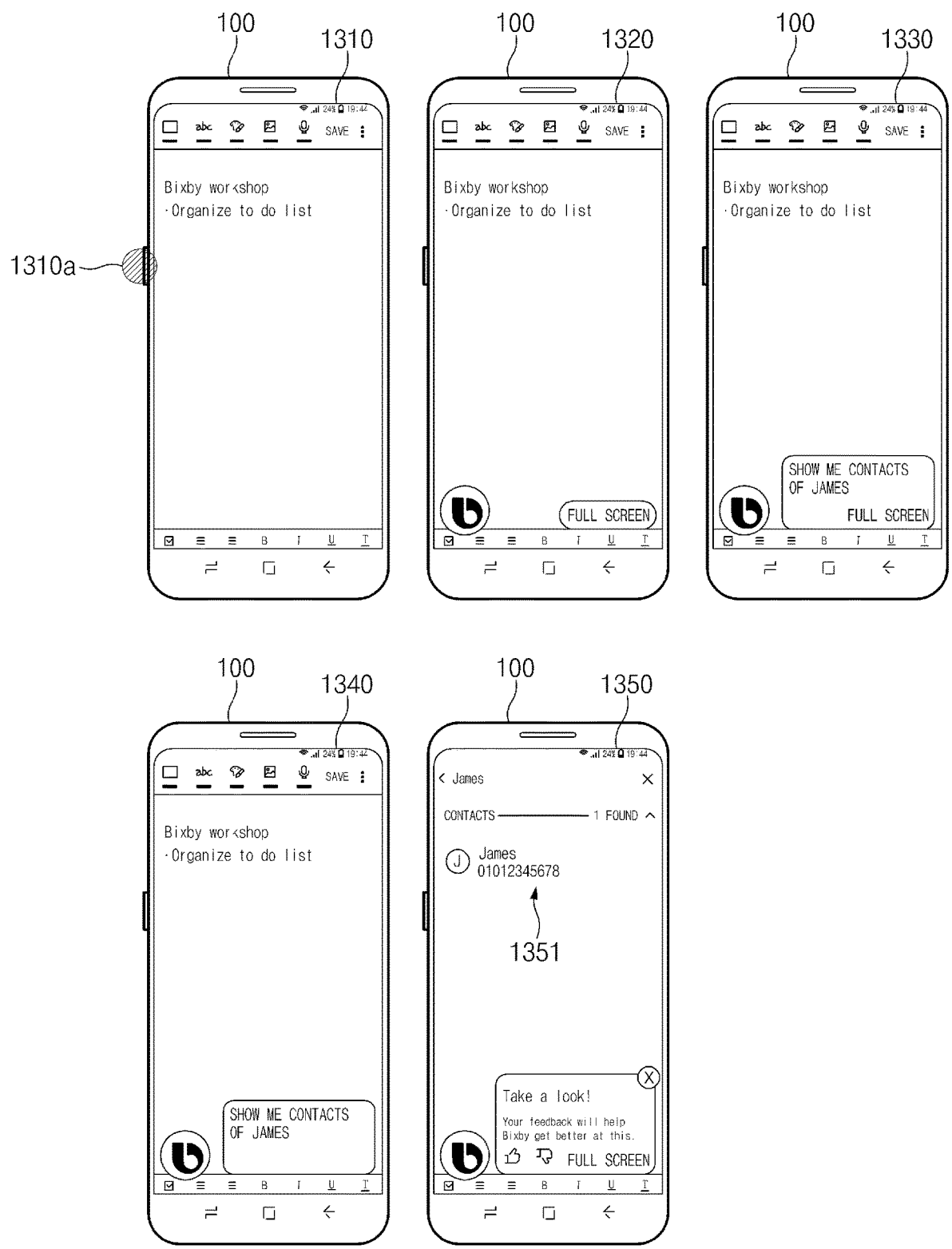
FIG. 13 is an illustration of a user terminal receiving a user input for performing a function of an app that is different from an app being executed, according to an embodiment.

FIG. 13 is an illustration of a user terminal 100 receiving a user input for performing a function of an app that is different from an app being executed, according to an embodiment.

Referring to FIG. 13, while executing a first app (e.g., a memo app), the user terminal 100 may receive a user input 1310a (e.g., "search for the phone number of James"). The user terminal 100 may receive a path rule corresponding to the user input through step 1150 of FIG. 11 of the intelligence server 200.

According to an embodiment, similar to the screen 1210 of the first app, the screen 1220 for receiving a user utterance, and the screen 1230 for displaying text data that are displayed in FIG. 12, the user terminal 100 may display a screen 1310 of the first app, a screen 1320 for receiving a user utterance, and a screen 1330 for displaying text data in a display.

According to an embodiment, the user terminal 100 may display a screen 1340 indicating a state where a user input is being processed, in the display. The intelligence server 200 may receive the user input, may execute step 1150 of FIG. 11 to select a path rule associated with a second app (e.g., a contact app) corresponding to the user input, and may transmit the selected path rule to the user terminal 100. For example, the selected path rule may be a global path rule.

According to an embodiment, the user terminal 100 may receive the path rule associated with the second app from the intelligence server 200 and may execute the second app to display a screen 1350 of the second app in a display. For example, the screen 1350 of the second app may include the result (e.g., a found contact number 1351) of executing an operation corresponding to the state included in the path rule.

Figure 14:
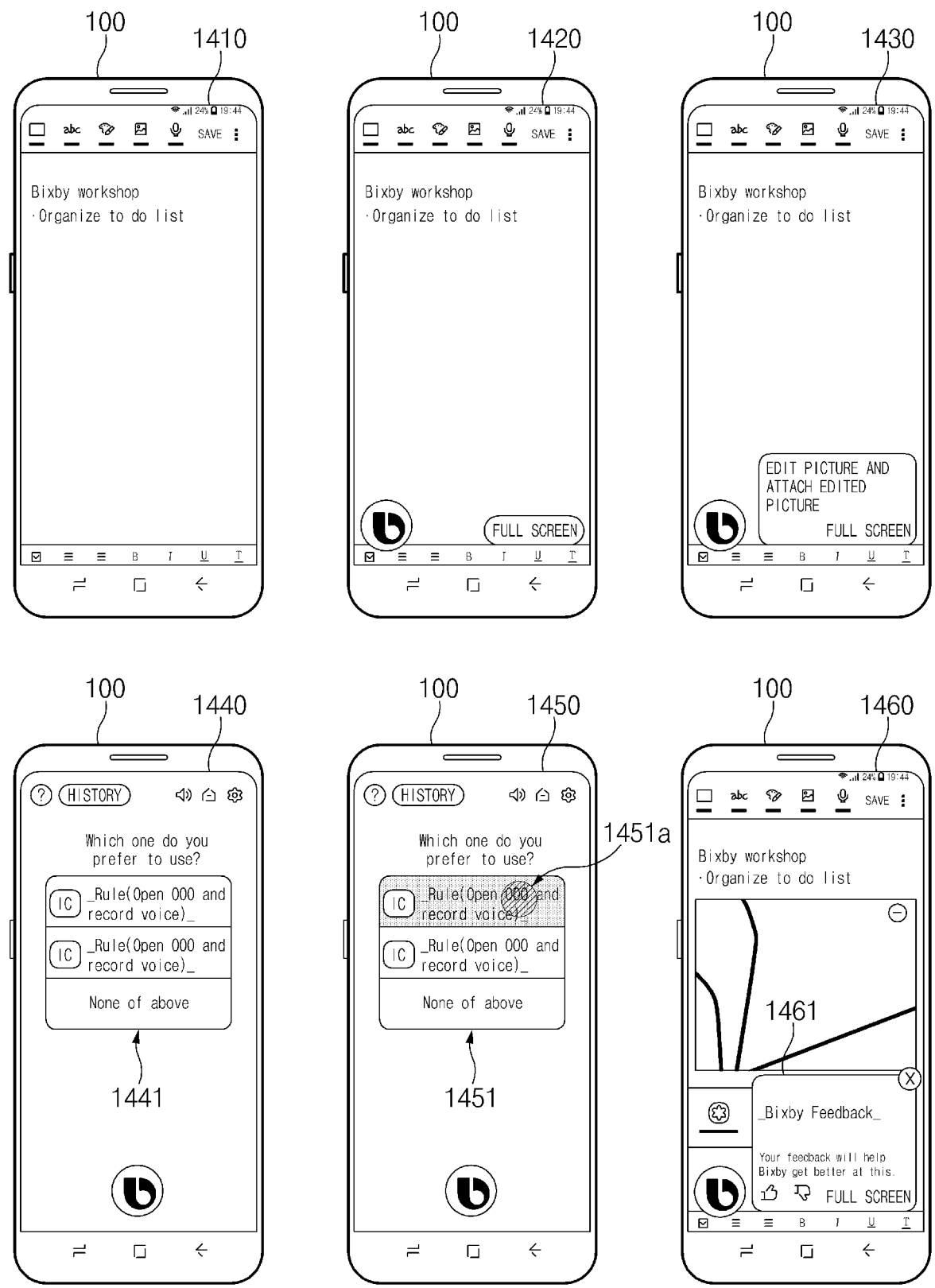
FIG. 14 is an illustration of a user terminal receiving a user input for performing a function of an app being executed, according to an embodiment.

FIG. 14 is an illustration of a user terminal receiving a user input for performing a function of an app being executed, according to an embodiment.

Referring to FIG. 14, while executing a first app (e.g., a memo app), the user terminal 100 may receive a user input (e.g., "edit the picture and attach the edited picture"). The user terminal 100 may receive a path rule corresponding to the user input through step 1161 of FIG. 11 of the intelligence server 200.

According to an embodiment, similar to the screen 1210 of the first app, the screen 1220 for receiving a user utterance, and the screen 1230 for displaying text data that are displayed in FIG. 12, the user terminal 100 may display a screen 1410 of the first app, a screen 1420 for receiving a user utterance, and a screen 1430 for displaying text data in a display.

According to an embodiment, the user terminal 100 may display a screen 1440 for receiving the user input to select one path rule among a plurality of path rules corresponding to the user input, in the display. The screen 1440 for receiving the user input may include an indicator 1441 indicating a plurality of path rules. The intelligence server 200 may receive the user input, may execute step 1161 of FIG. 11 to select a plurality of path rules associated with a first app corresponding to a user input, and may transmit the selected plurality of path rules to the user terminal 100.

According to an embodiment, the user terminal 100 may display a screen 1450, in which one path rule among the plurality of path rules is selected, in the display. The user terminal 100 may receive a user input (e.g., touch input 1451*a*) to select one path rule among the plurality of path rules. The screen 1450 in which one path rule is selected may include the indicator 1451 displaying the selected path rule.

According to an embodiment, the user terminal 100 may display a screen 1460 for executing (e.g., attaching the edited picture) an operation corresponding to a state included in the selected path rule, in the display. Furthermore, the user terminal 100 may request entering information about another app. For example, the screen 1460 for performing the operation corresponding to the state included in the selected path rule may include an indicator 1461 for guiding a user to enter the name of a third app during an utterance. Also, the indicator 1461 may include information for receiving a feedback associated with the result of executing the operation.

Figure 15:
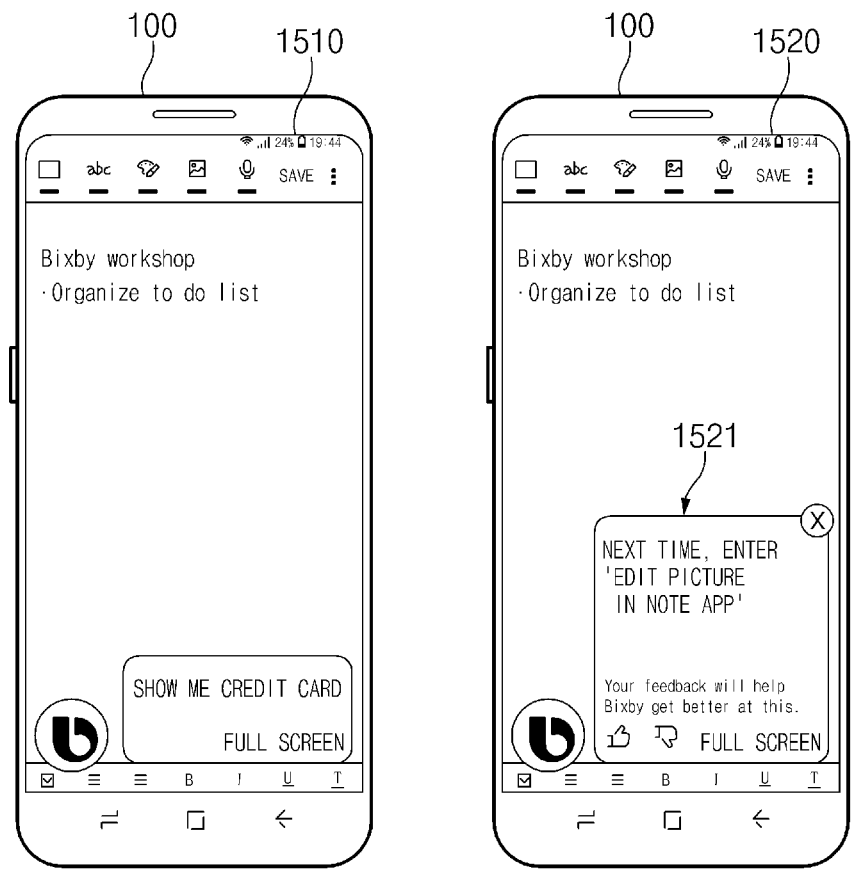
FIG. 15 is an illustration of a user terminal receiving a user input for performing a function of an app that is different from an app being executed, according to an embodiment.

FIG. 15 is an illustration of a user terminal receiving a user input for performing a function of an app that is different from an app being executed, according to an embodiment.

Referring to FIG. 15, while executing a first app (e.g., a memo app), the user terminal 100 may receive a user input (e.g., "show me a credit card"). The user terminal 100 may receive guide information for selecting another app through step 1162 of FIG. 11 of the intelligence server 200.

According to an embodiment, similar to the screen 1210 of the first app of FIG. 12, the user terminal 100 may display a screen 1510 of the first app in a display.

According to an embodiment, the user terminal 100 may display a screen 1520 for displaying the guide information for selecting another app, in the display. For example, the screen 1520 for displaying the guide information may include an indicator 1521 including the guidance and a feedback that are associated with a user input.

Figure 16:
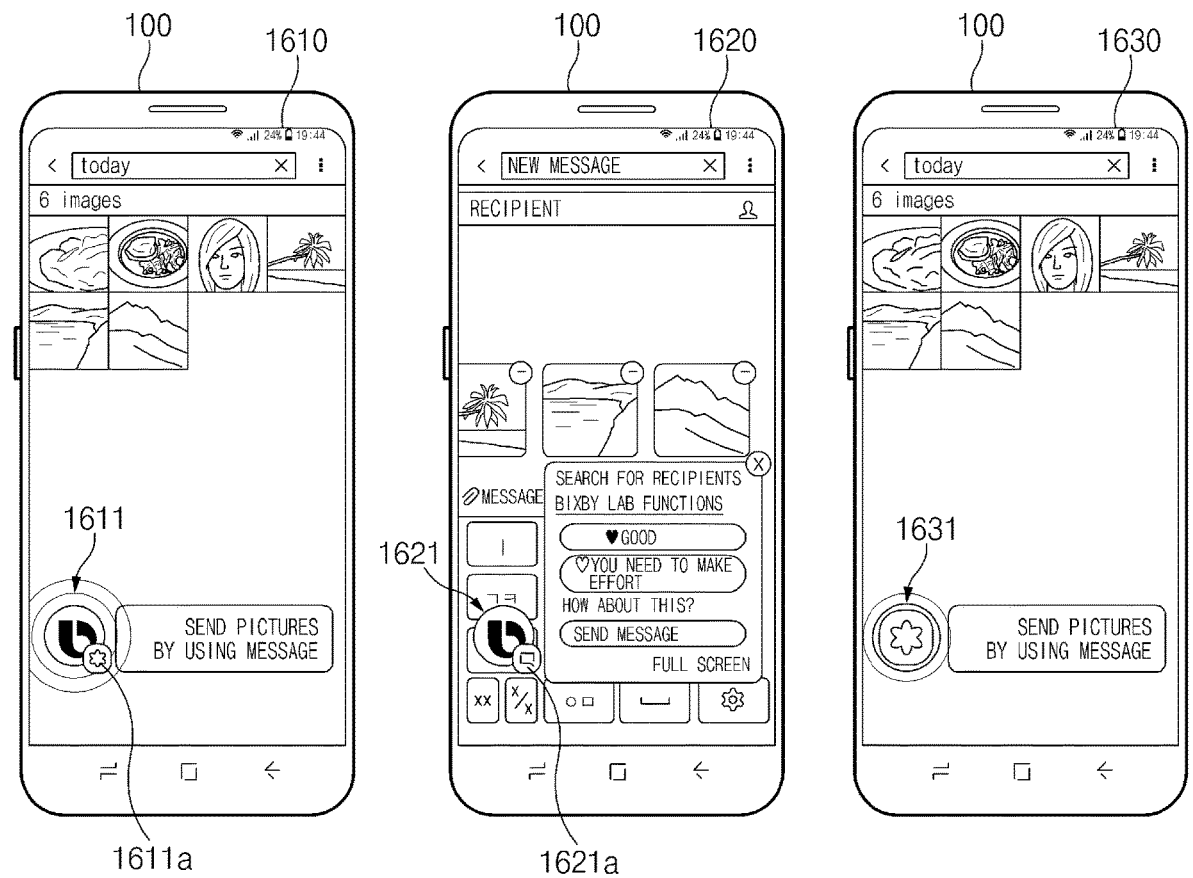
FIG. 16 is an illustration of a user terminal displaying a domain corresponding to an app, which is currently being executed, in a display, according to an embodiment.

FIG. 16 is an illustration of a user terminal displaying information about an app, which is currently being executed, in a display, according to an embodiment.

Referring to FIG. 16, the user terminal 100 displays information (or domain information corresponding to an app) about an app, which is currently being executed, in a display when receiving a user input.

According to an embodiment, while executing a first app (e.g., a gallery app) currently being executed, the user terminal 100 may receive a user input (e.g., "send this pictures by using SMS!"). The user terminal 100 may display a screen 1610 for receiving the user input in the display. The screen 1610 for receiving the user input may include an indicator (e.g., an icon) 1611 indicating a state where the user input is received. The indicator 1611 that indicates the state may include a portion 1611*a* indicating information of the first app being executed in the user terminal 100.

According to an embodiment, the user terminal 100 may receive a path rule corresponding to the user input (e.g., "send this pictures by using SMS!") and may execute a second app (e.g., SMS app) depending on the path rule. The user terminal 100 may display a screen 1620 for performing an operation (e.g., an operation of sending an image by using SMS) corresponding to the user input, in the display. The screen 1620 for performing the operation may include an indicator (e.g., an icon) 1621 indicating a state where the operation is performed. The indicator 1621 that indicates the state may include a portion 1621*a* indicating information of the second app being executed in the user terminal 100. In other words, the user terminal 100 may change a portion that indicates an app being executed while being displayed in the indicators 1611 and 1621 that indicate the state, from the portion 1611*a* that indicates the first app to the portion 1621*a* that indicates the second app. Thus, during an utterance, a user may allow the name of an app to be included in a user input, with reference to the portion 1611*a* or 1621*a* in which the app being executed is illustrated. In other words, in a case where a user executes another app, which is different from an app corresponding to the portion 1611*a* or 1621*a* in which the app being executed is illustrated, to perform an operation corresponding to the user input, the user may allow the name of an app to be executed to be included in the user input.

According to an embodiment, the user terminal 100 may display a screen 1630 similar to the screen 1610 for receiving the user input, in a display. An indicator 1631, which is included in a screen 1630 for receiving the user input and which indicates the state where the user input is received, may indicate information about the first app (e.g., a gallery app) being executed in the user terminal 100. In other words, the user terminal 100 may display the indicator 1631 indicating the state and the first app (or domain corresponding to the first app) being executed in the user terminal 100.

Figure 17:
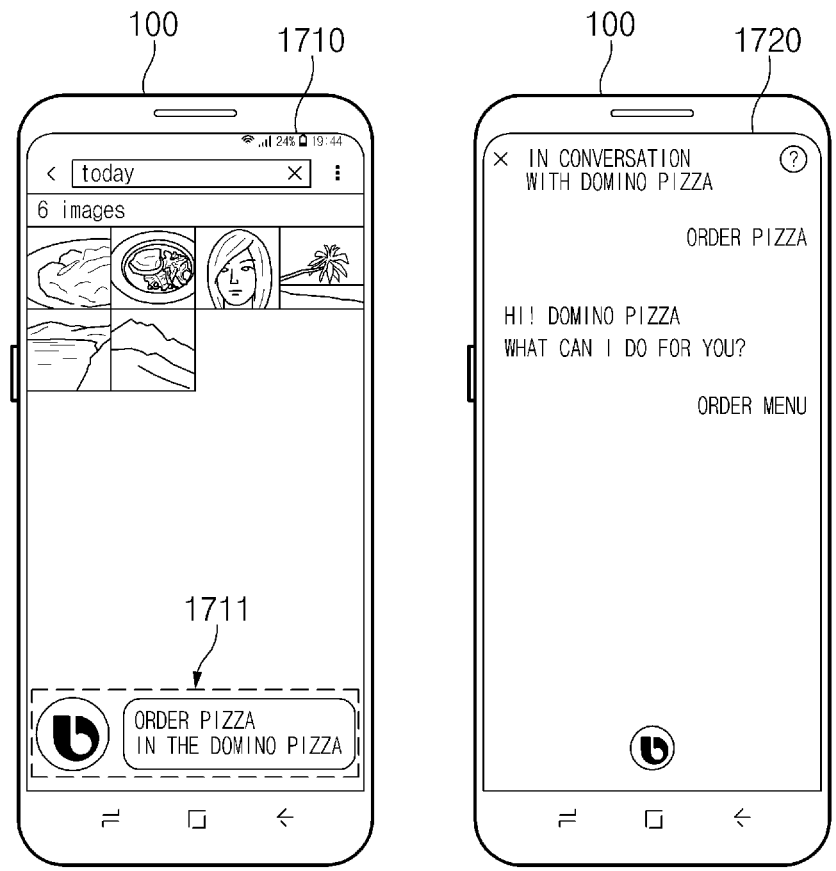
FIG. 17 is an illustration of a user terminal receiving a user input for executing a third party app, according to an embodiment.

FIG. 17 is an illustration of a user terminal receiving a user input for executing a third party app, according to an embodiment.

Referring to FIG. 17, while executing a first app (e.g., a native app), the user terminal 100 may receive a user input (e.g., "order a pizza in the domino pizza app!") for executing a third party app (e.g., a Domino Pizza app).

According to an embodiment, the user terminal 100 may display a screen 1710 for displaying the user input in the display. For example, a screen 1710 for receiving the user input may include a text 1711 corresponding to the user input. The user terminal 100 may transmit data associated with the user input to the intelligence server 200. The intelligence server 200 may recognize a certain word (e.g., a Domino Pizza app) through the app dispatch module 610 of the NLU module 600 and may generate a command for executing the third party app (or chatbot) and may transmit the command to the user terminal 100.

According to an embodiment, the user terminal 100 may execute a third party app depending on the command and may display a screen 1720 of the third party app in a display. For example, the screen 1720 of the third party app may be displayed (e.g., "in conversation with a Domino Pizza" or "Hi! Domino Pizza") such that the third party app has been executed. Moreover, the user terminal 100 may output a guide voice of the changed tone (e.g., changed from a male voice to a female voice) to indicate that the third party app has been executed. Alternatively, the user terminal 100 may output the changed background screen (e.g., changed to a background image) to indicate that the third party app has been executed. When a user enters an utterance including a certain word (e.g., "exit") or enters an utterance corresponding to a global rule, the user terminal 100 may terminate the third party app. The user terminal 100 may output an indication (e.g., "thank you") for providing a notification that the third party app has been terminated, to indicate that the third party app has been terminated.

Figure 18:
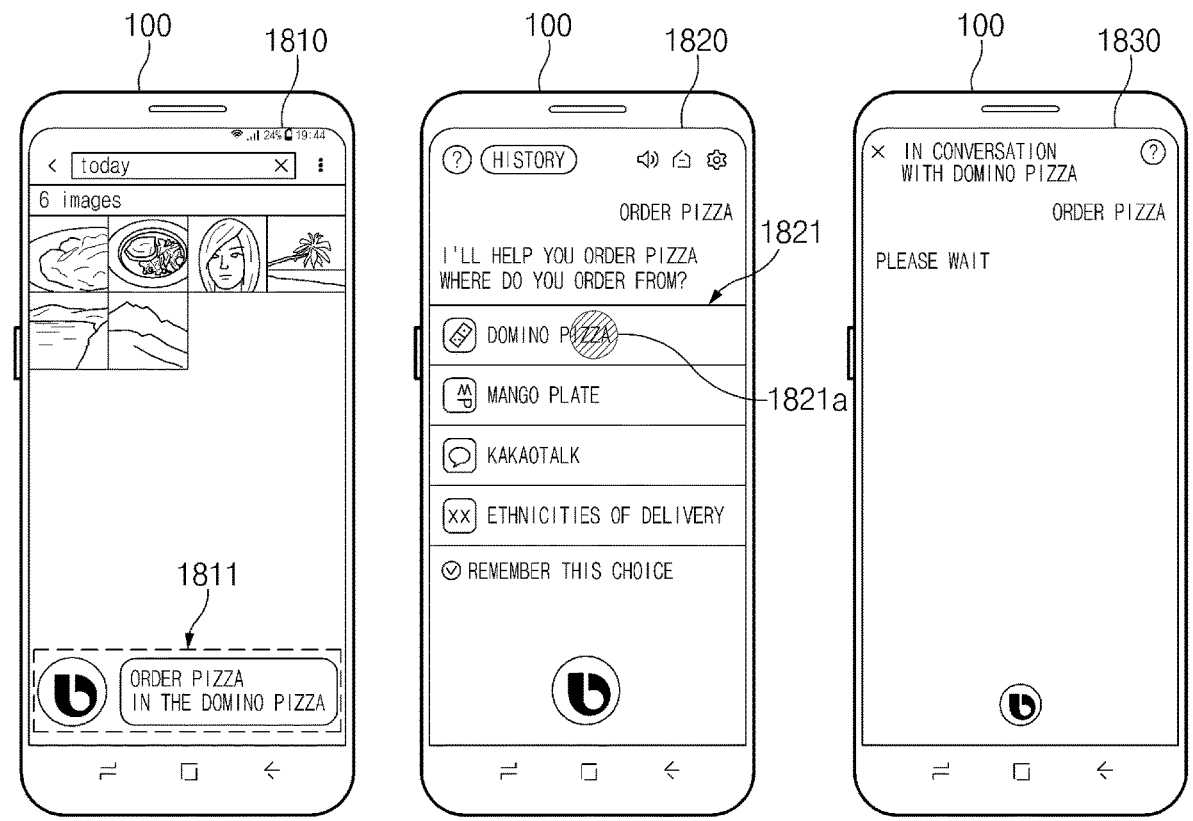
FIG. 18 is an illustration of a user terminal receiving a user input for executing a function, according to an embodiment.

FIG. 18 is an illustration of a user terminal receiving a user input for executing a certain function, according to an embodiment.

Referring to FIG. 18, while executing a first app (e.g., a native app), the user terminal 100 may receive a user input (e.g., "order a pizza!") for executing a certain function (e.g., order of a pizza).

According to an embodiment, the user terminal 100 may display a screen 1810 for receiving the user input in a display. For example, a screen 1810 for receiving the user input may include a text 1811 corresponding to the user input. The user terminal 100 may transmit data associated with the user input to the intelligence server 200. The intelligence server 200 may recognize a certain function (e.g., order of a pizza) through the capability dispatch module 620 of the NLU module 600 and may transmit, to the user terminal 100, information about a plurality of apps capable of executing the function.

According to an embodiment, the user terminal 100 may display a screen 1820 indicating information of the plurality of apps in the display. The screen 1820 indicating the information of the plurality of apps may include an indicator 1821 indicating a plurality of apps. The user terminal 100 may receive a user input (e.g., touch input) 1821a to select one app among the plurality of apps.

According to an embodiment, the user terminal 100 may execute the app (e.g., third party app) depending on the user input to select the app and may display a screen 1830 of the selected app in the display.

Figure 19:
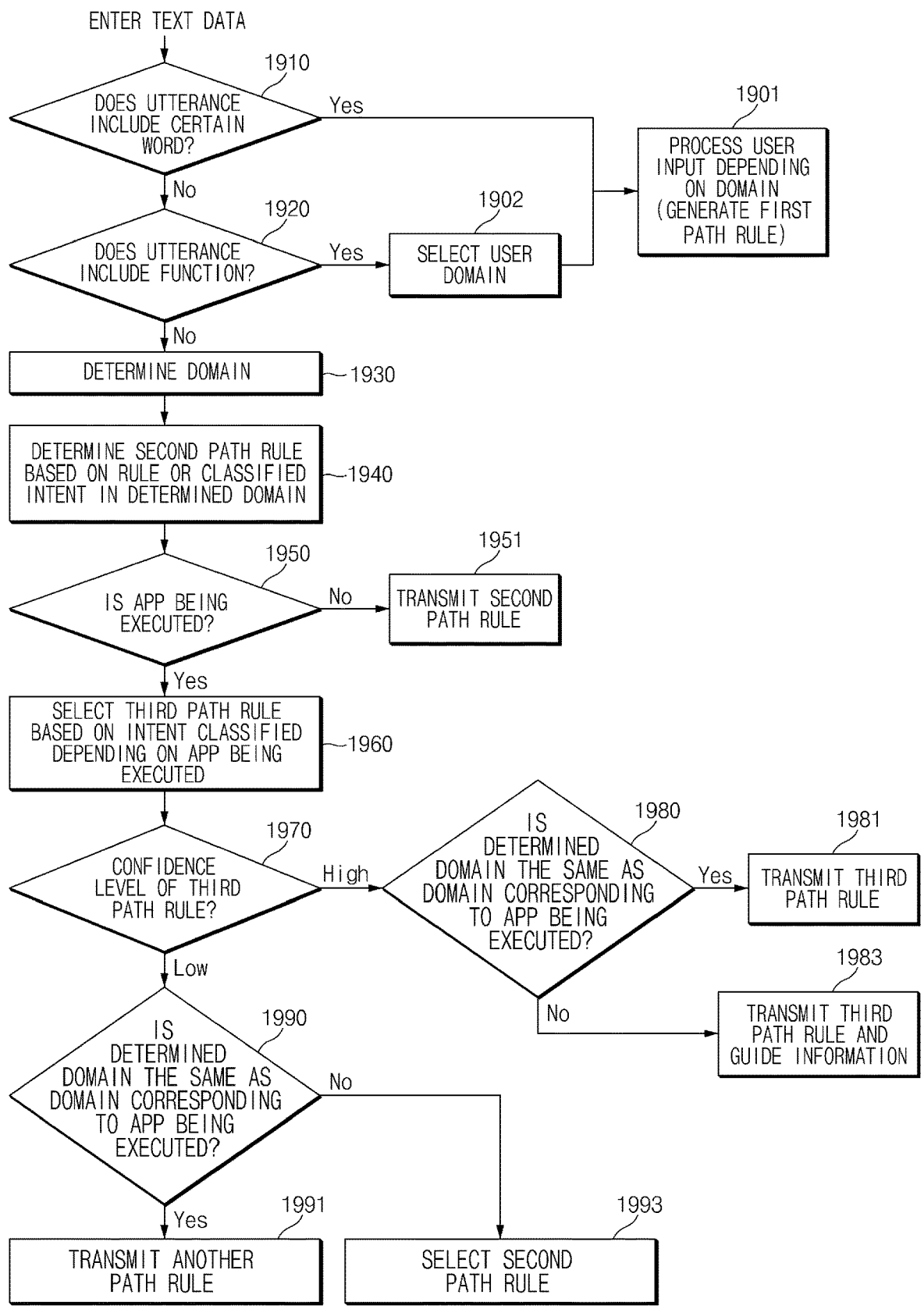
FIG. 19 is a flowchart of a path rule generating method of an NLU module, according to an embodiment.

FIG. 19 is a flowchart of a path rule generating method of an NLU module, according to an embodiment.

Referring to FIG. 19, the intelligence server 200 of the integrated intelligent system 10 of FIG. 2 may determine a path rule depending on an app (or application program) being executed and may transmit the path rule to the user terminal 100.

According to an embodiment, the NLU module 220 of the intelligence server 200 may receive text data corresponding to a user input (e.g., user utterance) from the ASR module 210.

According to an embodiment, in step 1910, the NLU module 220 may determine whether a user input includes a name of the app (e.g., a contact app or a note app). The NLU module 220 may determine a domain corresponding to the name of the app. In a case where the user input includes the name of the app, in step 1901, the NLU module 220 may process a user input depending on the domain corresponding to the user utterance. Step 1901 may be similar to step 801 of FIG. 8. In addition, step 1901 may be similar to the processing method of FIG. 9.

According to an embodiment, in a case where the user utterance does not include the name of the app, in step 1920, the NLU module 220 may determine whether the user utterance includes a command for performing the certain function of the app. In a case where the user input includes the command for performing the certain function of the app, in step 1902, the NLU module 220 may transmit information about a plurality of apps for performing the function, to the user terminal 100. For example, the user terminal 100 may provide a user with the information about the plurality of apps and may receive a user input to select one app among the plurality of apps. The NLU module 220 may perform step 1901. In other words, the NLU module 220 may determine (or select) a first path rule based on the determined domain.

According to an embodiment, in the case where the user input does not include the command for performing the function of the app, in step 1930, the NLU module 220 may determine a domain corresponding to the user utterance. For example, the NLU module 220 may determine the domain corresponding to the user utterance by using a linguistic feature (e.g., a grammar feature) of the user input. In step 1940, NLU module 220 may determine a second path rule corresponding to the user utterance, based on a rule included in the determined domain or the classified intent.

According to an embodiment, in step 1950, the NLU module 220 may determine whether the app is being executed in the user terminal 100. In a case where the app is not being executed in the user terminal 100, in step 1951, the NLU module 220 may transmit (or provide) the second path rule to the user terminal 100.

According to an embodiment, in a case where the app is being executed in the user terminal 100, in step 1960, the NLU module 220 may select a third path rule based on the intent classified depending on the app being executed. For example, NLU module 220 may determine the intent of a user based on a domain (or a domain associated with the executed app) corresponding to the app being executed and a user utterance and may select the third path rule based on the determined intent.

According to an embodiment, in step 1970, the NLU module 220 may verify the confidence level of the third path rule. The confidence level may indicate the matching probability to be generated such that the path rule selected based on the user utterance is matched with the intent of the user.

According to an embodiment, in a case where the confidence level of the third path rule is high, in step 1980, the NLU module 220 may determine whether the domain determined in step 1930 is the same as the domain corresponding to the app being executed in the user terminal 100. In a case where the determined domain is the same as the domain corresponding to the app being executed, in step 1981, the NLU module 220 may transmit the third path rule to the user terminal 100. In a case where the determined domain is not the same as the domain corresponding to the app being executed, in step 1993, the NLU module 220 may transmit information indicating that the user utterance including the name of an application program is a correct utterance, as well as the third path rule.

According to an embodiment, in the case where the confidence level of the third path rule is low, in step 1990, the NLU module 220 may determine whether the domain determined in step 1930 is the same as the domain corresponding to the app being executed in the user terminal 100, as in step 1980. In a case where the determined domain is the same as the domain corresponding to the app being executed, in step 1991, the NLU module 220 may transmit the selected at least one other path rule to the user terminal 100. In a case where the determined domain is not the same as the domain corresponding to the app being executed, in step 1993, the NLU module 220 may select another path rule corresponding to the user input to transmit the selected other path rule to the user terminal 100. The second path rule generated in step 1940 may be transmitted to the user terminal 100.

In a case where the user input does not include the name of an app to be executed, the integrated intelligent system 10 may select a path rule based on the domain corresponding to the user utterance, may determine whether the app is being executed in the user terminal 100, and may transmit another path rule generated based on the selected path rule or the user intent to the user terminal 100.

Figure 20:
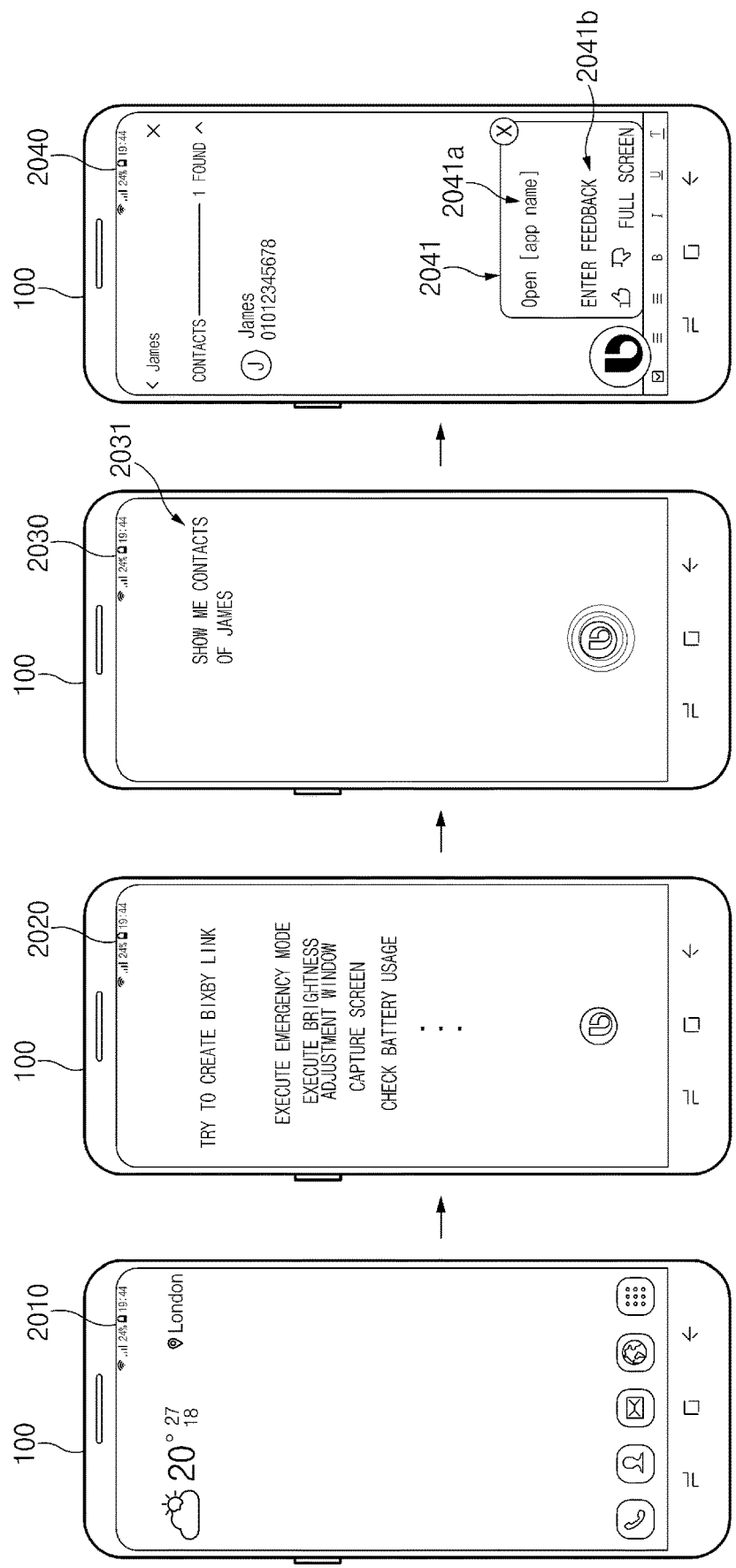
FIG. 20 is an illustration of a user terminal receiving a user utterance in a home screen, according to an embodiment.

FIG. 20 is an illustration of a user terminal receiving a user utterance in a home screen, according to an embodiment.

Referring to FIG. 20, the user terminal 100 may receive a user utterance for performing a task by using the stored app in a home screen (or lock screen). The user terminal 100 may receive a path rule (e.g., a second path rule) according to step 1951 of FIG. 9 of the intelligence server 200 to perform an operation.

According to an embodiment, the user terminal 100 may display a home screen 2010 in a display. The user terminal 100 may display a screen 2020 in which the dedicated app for receiving the user utterance is executed, in the display. The user terminal 100 may receive "show me contacts of James" from a user. The user terminal 100 may display a screen 2030 for displaying the received user input, in the display. For example, the screen 2030 for displaying the received user input may display text information 2031 corresponding to the received user input, in the display.

According to an embodiment, the user terminal 100 may receive the path rule corresponding to the user input from the intelligence server 200 and may display a screen 2040, in which contacts are found depending on the path rule, in the display. For example, the path rule may be determined depending on the domain corresponding to the user utterance. The user terminal 100 may provide the user with information and may provide an indicator 2041 for interacting with the user, in the screen 2040 in which the contacts are found. For example, the user terminal 100 may display information 2041a about the domain corresponding to an app executed by the user input, in the indicator 2041. The user terminal 100 may display information about the status of the user terminal 100, which the intelligence server 200 recognizes, in the indicator 2041. The information about the domain may be "Open [app name]" 2041a. The information about the domain may be "you are now in [app name]" or "we are now in [app name]". Furthermore, the user terminal 100 may display a feedback input request 2041b of the user associated with a result of performing an operation depending on the received path rule, in the indicator 2041.

The integrated intelligent system 10 may provide a user with information about the status (e.g., domain information) of the user terminal 100, which the intelligence server 200 recognizes and, thus, the integrated intelligent system 10 may receive a correct utterance, in which an operation is executed in the provided state so as to be suitable for the user intent, from the user.

Figure 21:
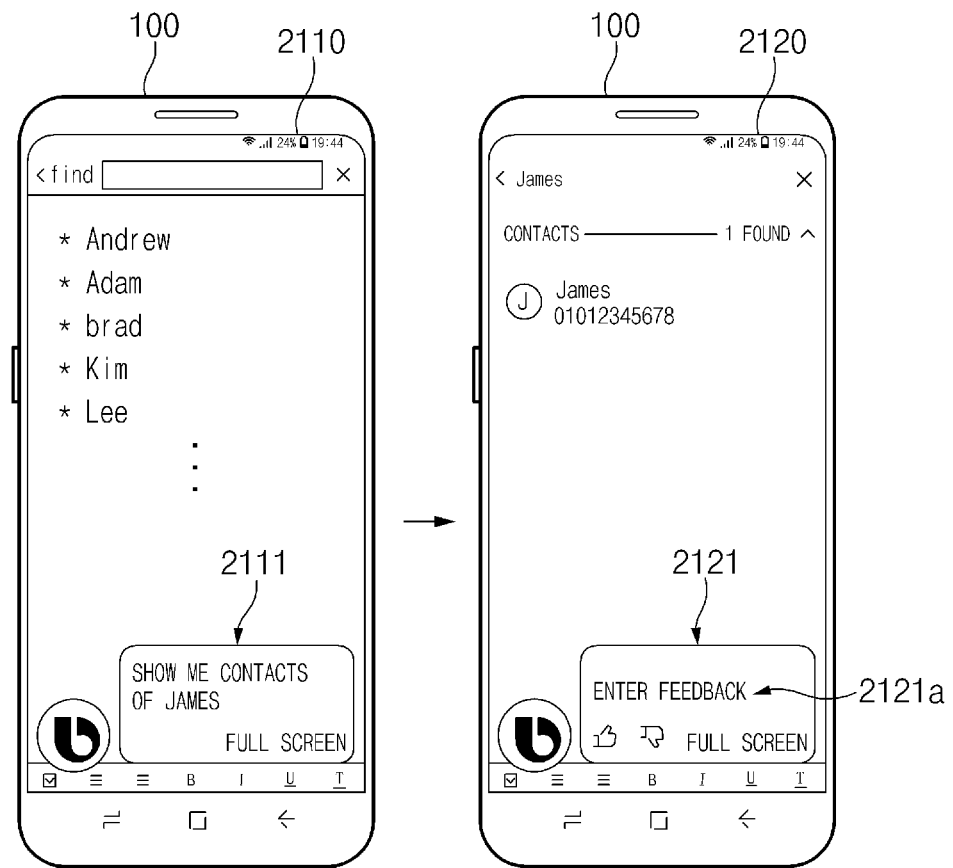
FIG. 21 is an illustration of receiving a user utterance for performing an operation of an app being executed in a user terminal, according to an embodiment.

FIG. 21 is an illustration of receiving a user utterance for performing an operation of an app being executed in a user terminal, according to an embodiment.

Referring to FIG. 21, the user terminal 100 may receive a user input for performing a task using an executed app, in a state where the app is executed. The confidence level of a path rule corresponding to the user input selected through the intelligence server 200 may be high. The confidence level of the path rule may exceed a certain value. The user terminal 100 may receive a path rule (e.g., third path rule) according to step 1981 of FIG. 9 of the intelligence server 200 to perform an operation.

According to an embodiment, the user terminal 100 may display a screen 2110 of the executed app in a display. For example, the user terminal 100 may display the screen 2110 in which a contact app is executed, in the display.

According to an embodiment, the user terminal 100 may receive a user input to operate the app being executed. For example, the user terminal 100 may receive "show me contacts of James" from a user. The user terminal 100 may display a first indicator 2111 including information about the user utterance, in the screen 2110 of the executed app. For example, information about the user utterance may be text information.

According to an embodiment, the user terminal 100 may receive the path rule corresponding to the user input from the intelligence server 200 and may display a screen 2120, in which contacts are found depending on the path rule, in the display. The user terminal 100 may display only a feedback input request 2121a of the user associated with a result of performing an operation depending on the received path rule, in a second indicator 2121.

The user terminal 100 may receive an utterance for operating the app being executed, and thus may not provide the status of the user terminal 100, which the intelligence server 200 recognizes, through an indicator.

Figure 22:
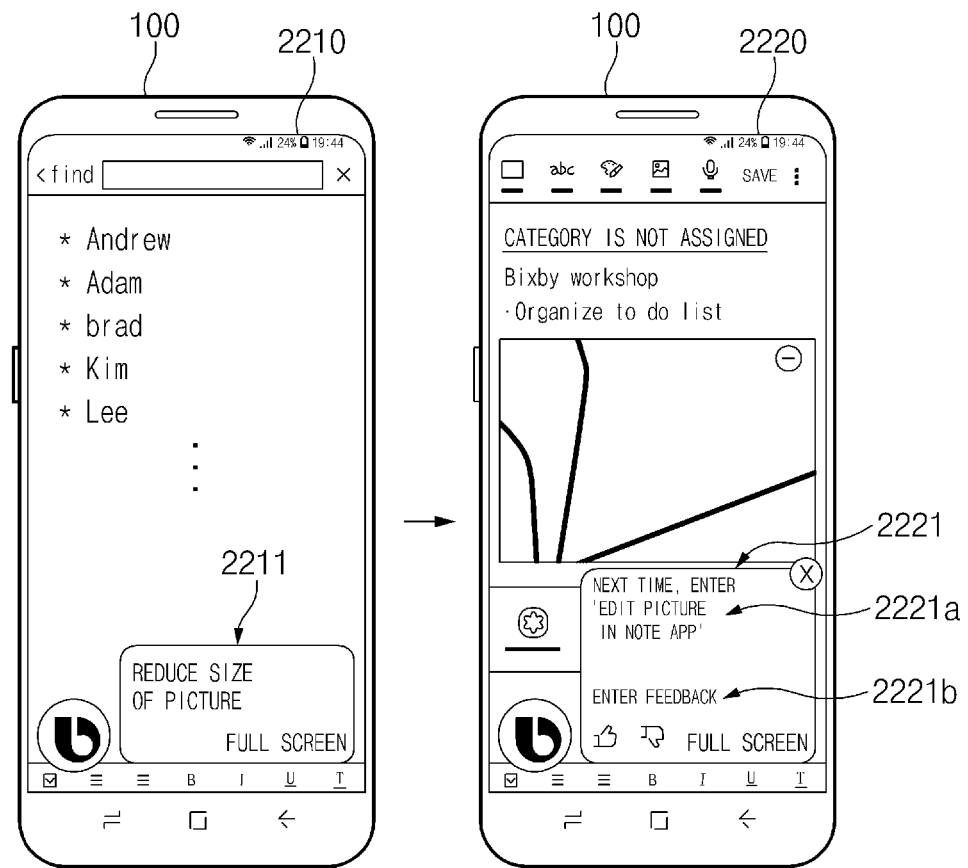
FIG. 22 is an illustration of receiving a user utterance for performing an operation of an app that is different from an app being executed in a user terminal, according to an embodiment.

FIG. 22 is an illustration of a receiving a user utterance for performing an operation of an app that is different from an app being executed in a user terminal, according to an embodiment.

Referring to FIG. 22, the user terminal 100 may receive a user input for performing a task using another app, in a state where the app is executed. The confidence level of a path rule corresponding to the user input selected through the intelligence server 200 may be high. The user terminal 100 may receive a path rule (e.g., third path rule) according to step 1983 of FIG. 9 of the intelligence server 200 to perform an operation.

According to an embodiment, the user terminal 100 may display a screen 2210 of the executed app in a display. For example, the user terminal 100 may display the screen 2210 in which a contact app is executed, in the display.

According to an embodiment, the user terminal 100 may receive a user input to operate an app that is different from the app being executed. For example, the user terminal 100 may receive "reduce the size of a picture" using a note app, from a user. The user terminal 100 may display a first indicator 2211 including information about the user utterance, in the display.

According to an embodiment, the user terminal 100 may receive the path rule corresponding to the user input from the intelligence server 200 and may display a screen 2220, in which a picture is edited depending on the path rule, in the display. The user terminal 100 may display information 2221a indicating that a user utterance including the name of an application program is the correct utterance, in a second indicator 2221. For example, the user terminal 100 may display the guide information 2221a saying that "next time, please enter 'edit a picture in a note app'", in the second indicator 2221. Furthermore, the user terminal 100 may display a feedback input request 2221b of the user associated with the executed result, in the indicator 2221. Differently from an indicator 2030 of FIG. 20, the user terminal 100 may not display information about the domain corresponding to the executed app, in the indicator 2221.

Figure 23:
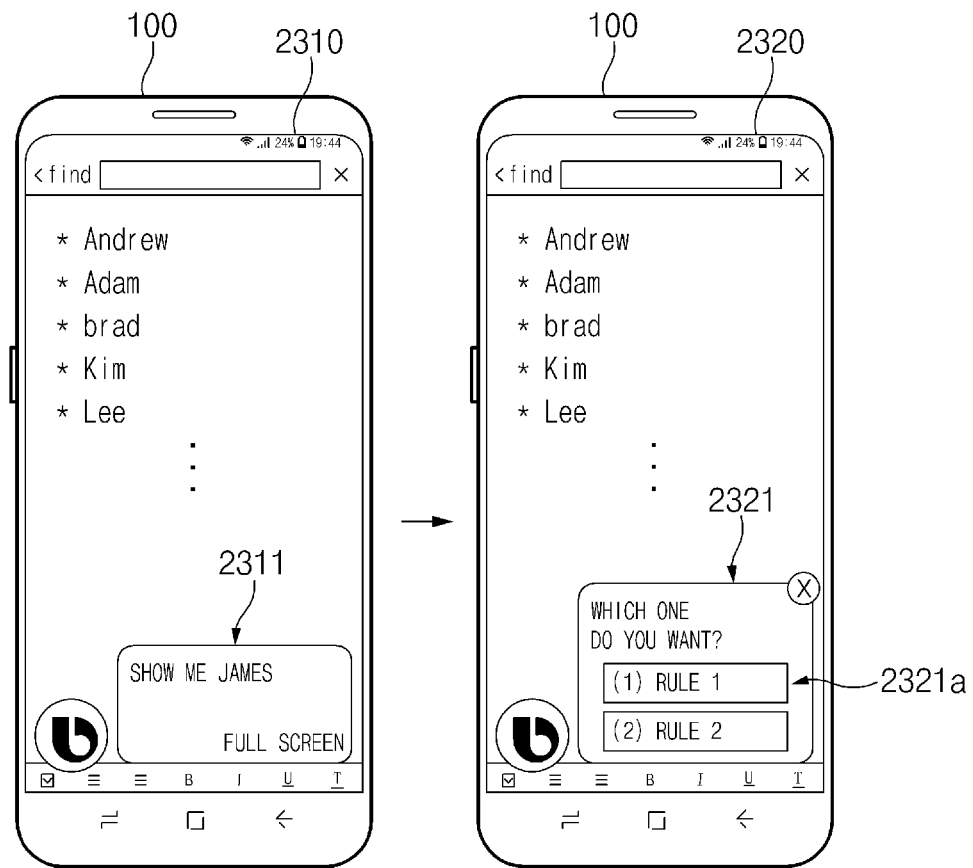
FIG. 23 is an illustration of receiving a user utterance for performing an operation of an app being executed in a user terminal, according to an embodiment.

FIG. 23 is an illustration of receiving a user utterance for performing an operation of an app being executed in a user terminal, according to an embodiment.

Referring to FIG. 23, the user terminal 100 may receive a user input to operate the app being executed. The confidence level of a path rule corresponding to the user input selected through the intelligence server 200 may be low. The user terminal 100 may receive a path rule (e.g., path rule different from second path rule) according to step 1991 of FIG. 9 of the intelligence server 200 to perform an operation.

According to an embodiment, the user terminal 100 may display a screen 2310 of the executed app in a display. For example, the user terminal 100 may display the screen 2310 in which a contact app is executed, in the display.

According to an embodiment, the user terminal 100 may receive a user input to operate the app being executed. For example, the user terminal 100 may receive "show me James" from a user. Compared with a user input "show me contacts of James", information for selecting a path rule may be insufficient in the user input. Thus, the confidence level of the path rule determined based on the user input may be low. The user terminal 100 may display a first indicator 2311 including information about the user utterance, in the display.

According to an embodiment, the user terminal 100 may receive a plurality of path rules corresponding to the user utterance, from the intelligence server 200. The confidence level of the path rule (e.g., third path rule) determined depending on the app being executed may be low, and since the domain determined by the user input is the same as a domain corresponding to the app being executed, a plurality of path rules corresponding to the user utterance may be selected. The user terminal 100 may identically display information (e.g., rule chooser) 2321a for receiving a user input to select one of the plurality of path rules, in a second indicator 2321 of a screen 2320 in which a contact app is executed. The user terminal 100 may receive a path rule for selecting one of the plurality of path rules and may perform an operation depending on the selected path rule.

Since the user terminal 100 receives a user input in which it is difficult to grasp the intent of the user, to receive a plurality of path rules from the intelligence server 200, the user terminal 100 may not provide the user with the status of the user terminal 100, which the intelligence server 200 recognizes, through an indicator.

Figure 24:
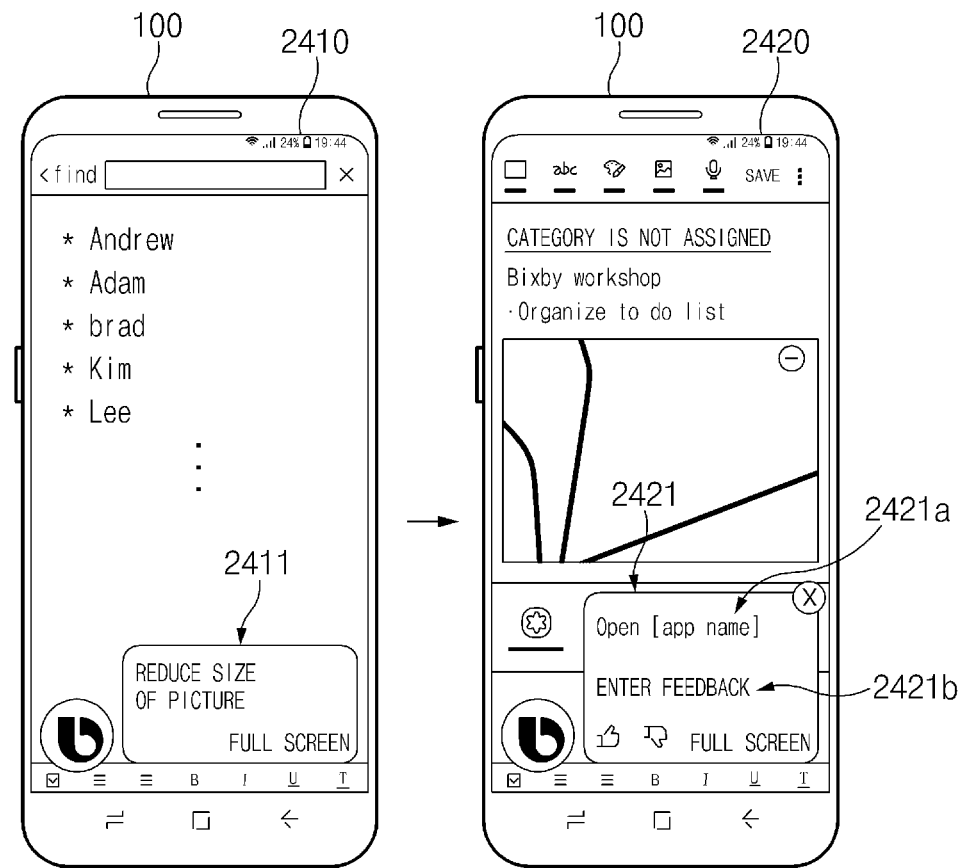
FIG. 24 is an illustration of receiving a user utterance for performing an operation of an that is app different from an app being executed in a user terminal, according to an embodiment.

FIG. 24 is an illustration of receiving a user utterance for performing an operation of another app different from an app being executed in a user terminal, according to an embodiment.

Referring to FIG. 24, the user terminal 100 may receive a user input for performing a task using an app that is different from the executed app, in a state where the app is executed. The confidence level of a path rule corresponding to the user input selected through the intelligence server 200 may be low. The confidence level of the path rule may not be greater than a certain value. The user terminal 100 may receive a path rule (e.g., a second path rule) according to step 1993 of FIG. 9 of the intelligence server 200 to perform an operation.

According to an embodiment, the user terminal 100 may display a screen 2410 of the executed app in a display. For example, the user terminal 100 may display the screen 2410 in which a contact app is executed, in the display.

According to an embodiment, the user terminal 100 may receive a user input to operate an app that is different from the executed app. For example, the user terminal 100 may receive "reduce the size of a picture" from a user. The user terminal 100 may display a first indicator 2411 including information about the user utterance in the screen 2410 of the executed app. For example, the user input may not be an input for performing the operation of the app (e.g., contact app) being executed. As such, the confidence level of the path rule determined based on the intent of the user input in a domain corresponding to the app being executed may be low. The user terminal 100 may display the first indicator 2411 including information about the user utterance, in the display.

According to an embodiment, the user terminal 100 may receive a path rule corresponding to the user input, from the intelligence server 200. For example, since the confidence level of the path rule is low and the domain determined by a user input is different from a domain corresponding to the app being executed, the intelligence server 200 may transmit the path rule (e.g., a second path rule) selected in the domain determined based on the user utterance, to the user terminal 100. The user terminal 100 may display a screen 2420, in which a picture is edited depending on the received path rule, and may display information 2421a about the domain corresponding to the executed app in a second indicator 2421. Furthermore, the user terminal 100 may display a feedback input request 2421b of the user associated with the result executed depending on the received path rule in the second indicator 2421.

Since the user terminal 100 receives a user input in which it is difficult to grasp the intent of the user, to perform an operation on a path rule, the confidence level of which is low, the user terminal 100 may provide the user with the status of the user terminal 100, which the intelligence server 200 recognizes, through an indicator.

According to an embodiment of the present disclosure described above with reference to in FIGS. 1 to 24, the integrated intelligence system that processes a user utterance may recognize a user input including a certain word to execute or terminate an app corresponding to the user input and, thus, may organically control an app so as to be matched with the intent of the user input. Even though the user input does not include a certain word, in the case where the user input includes a command for performing a certain function, the integrated intelligence system may control an app corresponding to the user input. The integrated intelligence system may recognize a certain user input to control an app and, thus, may control an app provided and managed by a third party as well as a general app.

Furthermore, the integrated intelligence system may selectively apply a complex process (or an operation process) for grasping a user's intent and may reduce the determination range for grasping the user's intent by selecting a path rule corresponding to a user utterance in consideration of the status of the user terminal 100. Accordingly, the integrated intelligence system may rapidly provide the path rule corresponding to the user input to the user terminal 100.

Figure 25:
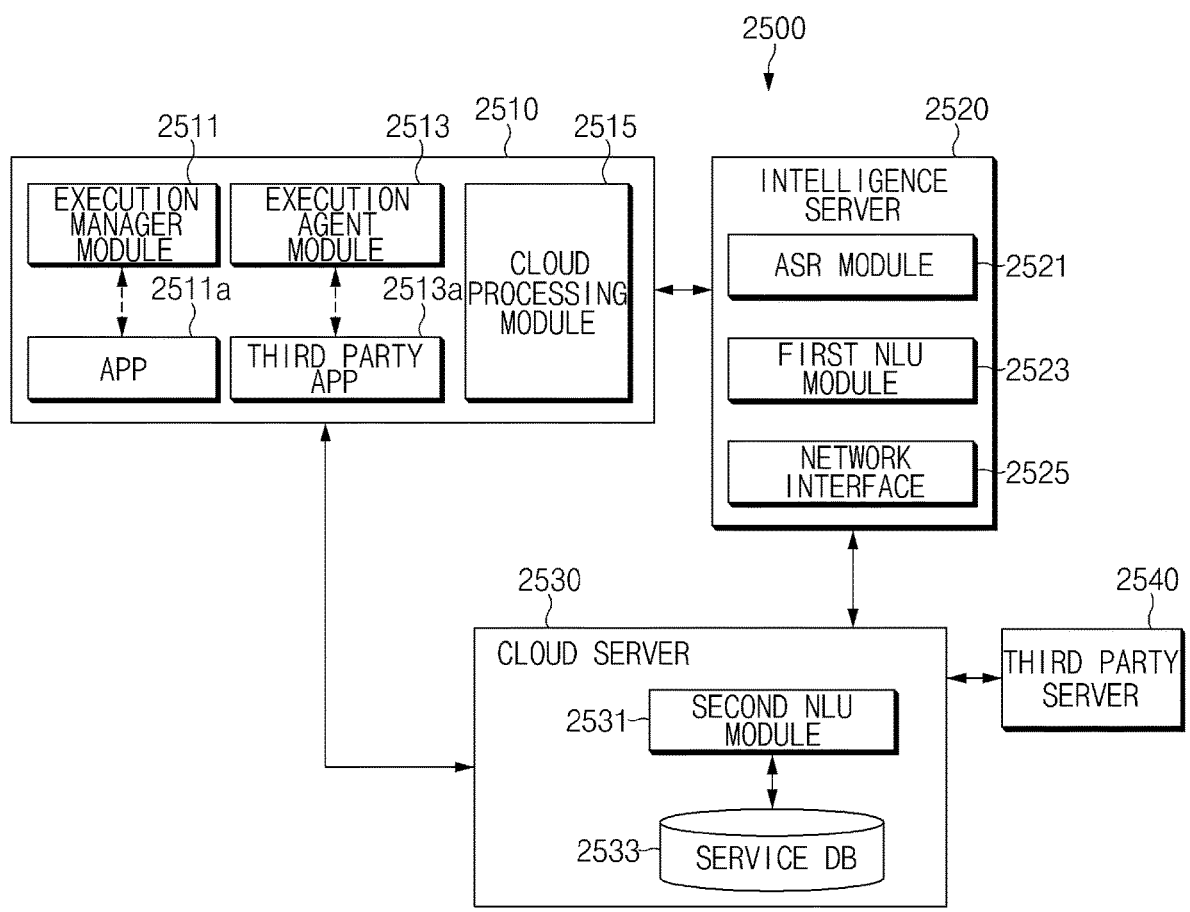
FIG. 25 is block diagram of an integrated intelligent system, according to an embodiment.

FIG. 25 is block diagram of an integrated intelligent system 2500, according to an embodiment.

Referring to FIG. 25, the integrated intelligent system 2500 may include a user terminal 2510, an intelligence server 2520, and a cloud server 2530. The integrated intelligent system 2500 may be similar to the integrated intelligent system 10 of FIG. 1. For example, the integrated intelligent system 2500 may further include the cloud server 2530.

The user terminal 2510 may process a user input (e.g., a user utterance) through an external server (e.g., the intelligence server 2520 and the cloud server 2530).

According to an embodiment, the user terminal 2510 may include an execution manager module 2511, an execution agent module 2513, and a cloud processing module 2515. The user terminal 2510 may be similar to the user terminal 100 of FIG. 2. For example, the user terminal 2510 may further include the execution agent module 2513 and the cloud processing module 2515. The cloud processing module 2515 may receive data (or content) necessary to perform the operation of a third party app 2513a, from the cloud server 2530.

According to an embodiment, the execution manager module 2511 may control the operation of an app 2511a. For example, the execution manager module 2511 may execute the app 2511a. In addition, the execution manager module 2511 may transmit a command to the app 2511a to perform the operation.

According to an embodiment, the execution manager module 2511 may execute the app 2511a depending on the path rule received from the intelligence server 2520. Furthermore, the intelligence server 2520 may transmit the command to the app 2511a depending on the path rule to perform a certain operation.

According to an embodiment, the app 2511a controlled by the execution manager module 2511 may be an app capable of selecting a path rule for performing a certain task in the intelligence server 2520. For example, the app 2511a controlled by the execution manager module 2511 may be an app (e.g., a phone app, a message app, a contact app, or the like) installed by a manufacturer of the user terminal 2510. The execution manager module 2511 may receive a path rule for performing a certain task from the intelligence server 2520 to operate the app 2511a.

According to an embodiment, the execution agent module 2513 may control the operation of the third party app 2513a. For example, the execution agent module 2513 may execute the third party app 2513a. Moreover, the execution agent module 2513 may transmit the command to execute the certain operation. Also, the execution result of the operation may be received from the third party app 2513a.

According to an embodiment, the execution agent module 2513 may execute the third party app 2513a depending on the path rule received from the intelligence server 2520. The execution agent module 2513 may transmit the command to the third party app 2513a depending on the user input (or a user intent) to perform an operation.

According to an embodiment, the third party app 2513a controlled by the execution agent module 2513 may be an app that is not capable of selecting the path rule for performing a certain task in the intelligence server 2520. For example, the third party app 2513a may be an app (e.g., a restaurant app, a food order app, an online banking app, an airplane schedule app, or the like) provided or managed by the third authority (or the third party). The execution agent module 2513 may execute the third party app 2513a depending on the received path rule received from the intelligence server 2520, but the execution agent module 2513 may not execute the operation to perform the certain task. The path rule received from the intelligence server 2520 may not include information about the execution of the operation of the third party app 2513a. The NLU module (e.g., a second NLU module 2531) of another server (e.g., the cloud server 2530) may be used for the third party app 2513a to perform at least part of function, instead of the NLU module (e.g., a first NLU module 2523) of the intelligence server 2520.

According to an embodiment, the third party app 2513a may perform an operation depending on the user input. In addition, the third party app 2513a may perform an operation by using the data received from the cloud server 2530.

According to an embodiment, the cloud processing module 2515 may receive the intent of a user and may transmit a request for obtaining information depending on the received intent of the user, to the cloud server 2530.

The intelligence server 2520 may process the user utterance received from the user terminal 2510.

According to an embodiment, the intelligence server 2520 may include an ASR module 2521 and the first NLU module 2523. The ASR module 2521 and the first NLU module 2523 of the intelligence server 2520 may be similar to the ASR module 210 and the NLU module 220 of the intelligence server 200 of FIG. 4, respectively.

According to an embodiment, the ASR module 2521 may convert the user utterance received from the user terminal 100 to text data. The ASR module 2521 may transmit the text data to the first NLU module 2523.

According to an embodiment, the first NLU module 2523 may generate (or determine) a path rule corresponding to the user input, by using the text data received from the ASR module 2521. For example, the first NLU module 2523 may determine the domain corresponding to the user input and the user's intent, based on the text data and may extract a slot (or parameter) necessary to perform an operation to generate a path rule.

According to an embodiment, the first NLU module 2523 may verify the status of the user terminal 2510 through context information received from the user terminal 2510. For example, the first NLU module 2523 may verify an app being executed in the user terminal 2510, through the context information. For example, information about the status may include session information (e.g., a third party session, an Internet banking session, or the like) corresponding to the app being executed in the user terminal 2510. The first NLU module 2523 may determine a path rule by using the session information. For example, the first NLU module 2523 may determine a path rule, which is included in the context information and which executes the operation of the app being executed.

According to an embodiment, the first NLU module 2523 may determine whether to transmit text data to the cloud server 2530, based on the status of the user terminal 100. For example, in the case where the first NLU module 2523 verifies a state where the user terminal 100 executes the third party app 2513a, through the context information, the first NLU module 2523 may transmit the text data and the context information to the cloud server 2530 instead of generating the path rule. In a case where the user terminal 100 is within a third party session, the first NLU module 2523 may transmit the text data and the context information to the cloud server 2530 instead of generating the path rule.

According to an embodiment, a network interface 2525 may receive data from an external device and may transmit the data to the external device. The network interface 2525 may receive a response to a request from the external device. In addition, the network interface 2525 may determine the type of the received response to transmit the received response to a proper configuration (e.g., the first NLU module 2523) for proper processing in the intelligence server 2520. For example, the network interface 2525 may receive the user utterance and the context information from the user terminal 2510. The network interface 2525 may transmit the user utterance received from the user terminal 2510, to the ASR module 2521 and may transmit the context information to the first NLU module 2523. The first NLU module 2523 may transmit the text data and the context information to the cloud server 2530 through the network interface 2525. Furthermore, the first NLU module 2523 may receive the result (e.g., the user's intent) of processing text data, from the cloud server 2530. Hereinafter, it is understood that transmission/reception of data of the intelligence server 2520 is transmission/reception of data through the network interface 2525.

The cloud server 2530 may process text data received from the intelligence server 2520. The cloud server 2530 may provide the user terminal 2510 with a service associated with the third party app 2513a by using the text data and the context information.

According to an embodiment, the cloud server 2530 may include the second NLU module 2531 and a service database (or service DB) 2533.

According to an embodiment, in a case where the user terminal 2510 is within a third party session (or in a case where a third party app is being executed), the second NLU module 2531 may effectively process the text data received from the intelligence server 2520. The second NLU module 2531 may determine the user's intent corresponding to the received text data. For example, the text data effectively processed by the second NLU module 2531 may include information (e.g., service information) associated with the third party app 2513a. The second NLU module 2531 may determine the user's intent by using the received context information. For example, the second NLU module 2531 may determine the user's intent corresponding to the corresponding app by using execution information (or session information) of an app included in the context information. The second NLU module 2531 may transmit the determined intent of the user to the intelligence server 2520.

According to an embodiment, in the case where the user terminal 2510 is not within the third party session (or in the case where the third party app is not being executed), the second NLU module 2531 may not effectively process the text data received from the intelligence server 2520. For example, the text data that is not effectively processed by the second NLU module 2531 may include information (e.g., service information) associated with the app 2511a. The second NLU module 2531 may transmit the result, which is not effectively processed, to the intelligence server 2520.

According to an embodiment, the second NLU module 2531 may obtain data associated with a service provided through the third party app 2531a from at least one of the service DB 2533 and a third party server 2540. For example, in a case where the second NLU module 2531 receives a request for data associated with a service provided by the third party app 2513a, from the user terminal 100, the second NLU module 2531 may obtain data corresponding to the request from at least one of the service DB 2533 and the third party server 2540.

According to an embodiment, the service DB 2533 may store the data associated with the service provided through the third party app 2513a. For example, the service DB 2533 may store content (e.g., a restaurant list or a menu) associated with the third party app 2513a. For example, data stored in the service DB 2533 may be data of a service, which is frequently used, or data of a service, the security of which is not important.

According to an embodiment, the third party server 2540 may store information associated with the service provided through the third party app 2513a. For example, the third party server 2540 may store data (e.g., online banking information, a flight schedule, or the like) associated with the third party app 2513a. The data stored in the third party server 2540 may be, for example, data of the service, the security of which is important. The third party server 2540 may provide the user terminal 100 with the information associated with the service through the cloud server 2530.

According to an embodiment, in a case where the second NLU module 2531 does not find the data associated with the service in the service DB 2533, the second NLU module 2531 may obtain the relevant data from the third party server 2540.

According to an embodiment, the second NLU module 2531 may transmit the obtained data associated with the service of the third party app 2513a, to the user terminal 2510. The second NLU module 2531 may be included in the first NLU module 2523. In other words, the intelligence server 2520 and the cloud server 2530 may be implemented with the same server.

Figure 26:
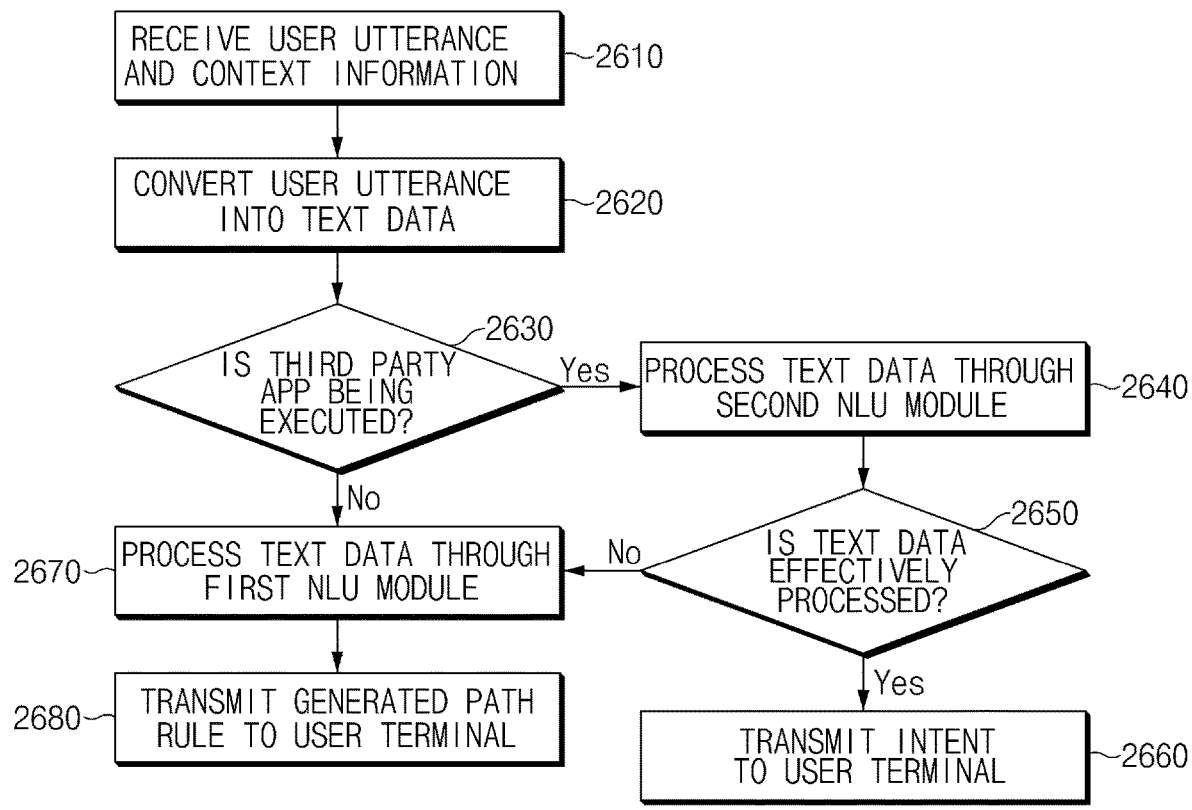
FIG. 26 is a flowchart of a method of processing a user utterance in an integrated intelligent system, according to an embodiment.

FIG. 26 is a flowchart of a method of processing a user utterance in an integrated intelligent system, according to an embodiment.

Referring to FIG. 26, the intelligence server 2520 of the integrated intelligent system 2500 of FIG. 25 may process a user utterance received from the user terminal 100 to provide a service corresponding to a user's intent.

According to an embodiment, in step 2610, the intelligence server 2520 (e.g., the network interface 2525) may receive the user utterance and context information.

According to an embodiment, in step 2620, the intelligence server 2520 (e.g., the ASR module 2521) may convert the user utterance into text data.

According to an embodiment, in step 2630, the intelligence server 2520 (e.g., the first NLU module 2523) may receive the text data corresponding to the user utterance and the context information and may determine whether the user terminal 2510 executes a third party app (or whether the user terminal 2510 is within a third party session), through the context information. The intelligence server 2520 may determine whether the user terminal 2510 executes the third party app. In a case where the user terminal 2510 is within the third party session, the intelligence server 2520 may transmit the text data and the context information (e.g., session information) to the cloud server 2530.

According to an embodiment, in step 2640, the cloud server 2530 may process the text data through the second NLU module 2531. For example, in a case where the received text data includes information (or information for performing a task in the third party app) associated with the third party app 2513a, the cloud server 2530 may determine the user's intent corresponding to a user input. The cloud server 2530 may transmit the result of processing the text data, to the intelligence server 2520.

According to an embodiment, in step 2650, the intelligence server 2520 (e.g., the first NLU module 2523) may determine whether the received text data has been effectively processed. For example, the intelligence server 2520 may determine whether the text data has been effectively processed, through the result of processing the text data received from the cloud server 2530. For example, the intelligence server 2520 may determine whether the text data has been effectively processed, depending on whether the user's intent has been determined.

According to an embodiment, in a case where the text data is effectively processed, in step 2660, the intelligence server (e.g., the first NLU module 2523) 2520 may transmit the determined intent to the user terminal 2510.

According to an embodiment, in step 2670, the intelligence server 2520 may process the user utterance through the first NLU module 2523. For example, in the case where the user terminal 2510 does not execute the third party app, in step 2630, the user terminal 2510 may generate a path rule based on the text data. For example, in a case where the text data is not effectively processed, in step 2650, the user terminal 2510 may generate the path rule based on the text data.

According to an embodiment, in step 2680, the intelligence server 2520 may transmit the generated path rule to the user terminal 100.

The intelligence server 2520 of the integrated intelligent system 2500 may process the user utterance to transmit the path rule corresponding to the user input or the user's intent to the user terminal 100.

Figure 27:
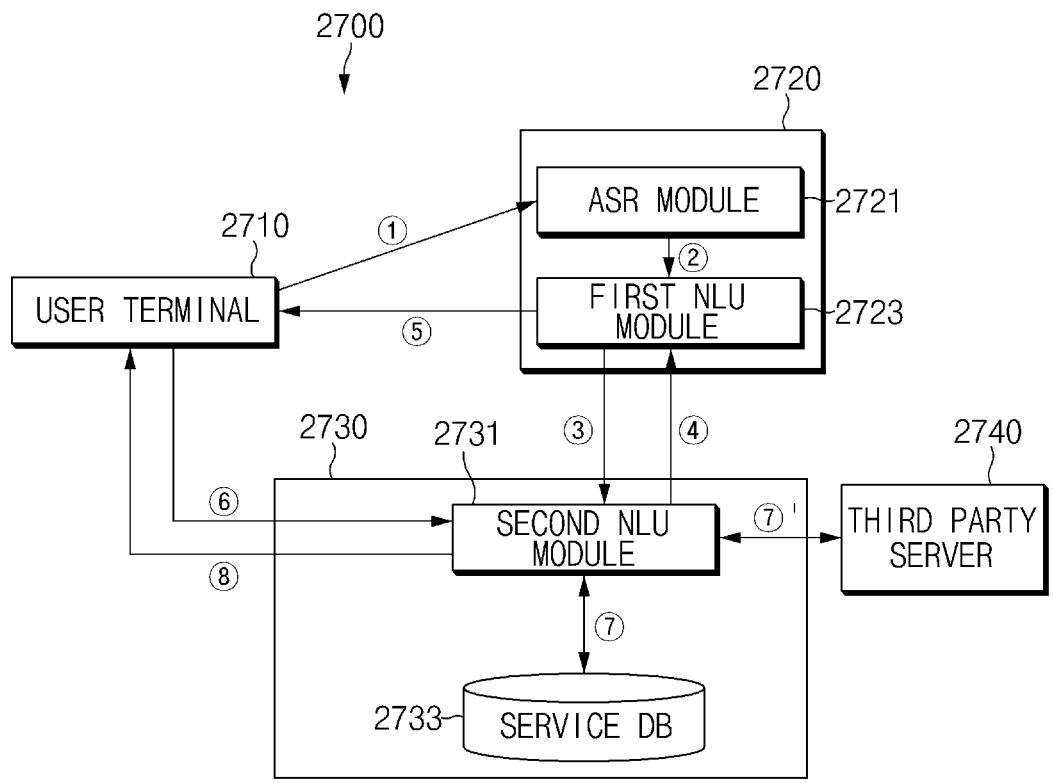
FIGS. 27 and 28 are block diagrams of integrated intelligent systems for implementing methods in which a user terminal receives an intent of a user through an intelligence server to obtain information, according to an embodiment.
Figure 28:
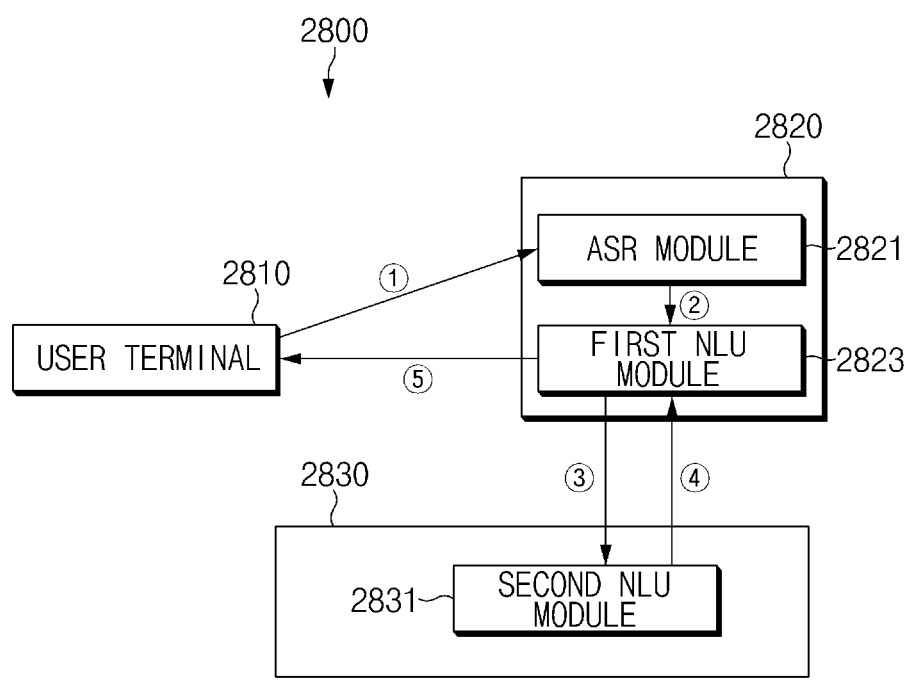

FIGS. 27 and 28 are block diagrams of an integrated intelligent system 2700 for implementing methods in which a user terminal 2710 receives an intent of a user through an intelligence server to obtain information, according to an embodiment.

Referring to FIG. 27, while executing a third party app (e.g., a restaurant app), the user terminal 2710 may process a user input (e.g., "find a nearby restaurant!") to request a service (or task) associated with the third party app being executed. The integrated intelligent system 2700 may be similar to the integrated intelligent system 2500 of FIG. 25. For example, the integrated intelligent system 2700 may sequentially perform step 2610, step 2620, step 2630, and step 2640 of FIG. 26.

According to an embodiment, a user terminal 2710 may transmit a user input including service information associated with the third party app and context information to an intelligence server 2720 (①). The context information may include information about the fact that the user terminal 2710 executes the third party app (e.g., a restaurant app).

According to an embodiment, an ASR module 2721 of the intelligence server 2720 may convert the received user input into text data. The ASR module 2721 may transmit the converted text data to a first NLU module 2723 (②).

According to an embodiment, the first NLU module 2723 may receive the text data and determine whether the third party app is being executed in the user terminal 2710 by using context information received from the user terminal 2710. The first NLU module 2723 may transmit the text data and the context information to a cloud server 2730 (③).

According to an embodiment, a second NLU module 2731 of the cloud server 2730 may determine a user's intent (e.g., search for a nearby restaurant) by using the received text data. The second NLU module 2731 may effectively process the text data received from the intelligence server 2720. The second NLU module 2731 may transmit the determined intent to the intelligence server 2720 (④). For example, the second NLU module 2731 may transmit information (e.g., # Searchrestaurant) corresponding to the determined intent to the intelligence server 2720.

According to an embodiment, the first NLU module 2723 of the intelligence server 2720 may transmit the received intent to the user terminal 2710 (s).

According to an embodiment, the user terminal 2710 (e.g., cloud processing module) may receive the user's intent and may transmit a request for searching for the nearby restaurant to the cloud server 2730 depending on the user's intent (⑥). The request may include global positioning system (GPS) information of the user terminal 2710.

According to an embodiment, the second NLU module 2731 of the cloud server 2730 may obtain information (e.g., a result of searching for a nearby restaurant) corresponding to the request received from a service DB 2733 or a third party server 2740 (⑦). The second NLU module 2731 may transmit the obtained information to the user terminal 2710 (⑧).

According to an embodiment, the user terminal 2710 (e.g., a cloud processing module) may provide the user with the received information. For example, the user terminal 2710 may provide the user with the received information (e.g., a web app) through an app for processing the user utterance. For example, the user terminal 2710 may provide the user with the received information (e.g., information necessary for a certain state) through the third party app (e.g., a restaurant app). The user terminal 100 may process a user input to request a service associated with the third party app through the intelligence server 2720 and the cloud server 2730.

Referring to FIG. 28, while executing the third party app (e.g., a restaurant app), the user terminal 2810 may process a user input (e.g., "send a message to Mom that I'm late") for operating another app (e.g., a message app) that is different from the third party app being executed. An integrated intelligent system 2800 may be similar to the integrated intelligent system 2500 of FIG. 25. For example, the integrated intelligent system 2800 may sequentially perform step 2610, step 2620, step 2630, step 2650, and step 2660 of FIG. 26.

According to an embodiment, operations ①, ②, and ③ in which the user terminal 2810 and the intelligence server 2820 transmit text data of a user input and context information to the cloud server 2830 may be similar to operations ①, ②, and ③ in which the user terminal 2710 and the intelligence server 2720 of FIG. 27 transmit text data of a user input and context information to the cloud server 2730, respectively.

According to an embodiment, the second NLU module 2831 of the cloud server 2830 may not determine the user's intent (e.g., message transfer) by using the received text data. The second NLU module 2831 may not effectively process the received text data. The second NLU module 2831 may transmit information about the result of processing the text data to the intelligence server 2820 (④).

According to an embodiment, a first NLU module 2823 of the intelligence server 2820 may generate a path rule for sending a message in a message app depending on the received information about the result by using the text data corresponding to the user input. The intelligence server 2820 may transmit the generated path rule to the user terminal 2810 (⑤).

According to an embodiment, the user terminal 2810 (e.g., an execution agent module) may execute the message app depending on the path rule and may sequentially perform operations (e.g., an operation of selecting a recipient, an operation of writing a message, and the like) of sending a message. The user terminal 2810 may process a user input for performing the operation of another app that is different from the third party app through the intelligence server 2820.

Figure 29:
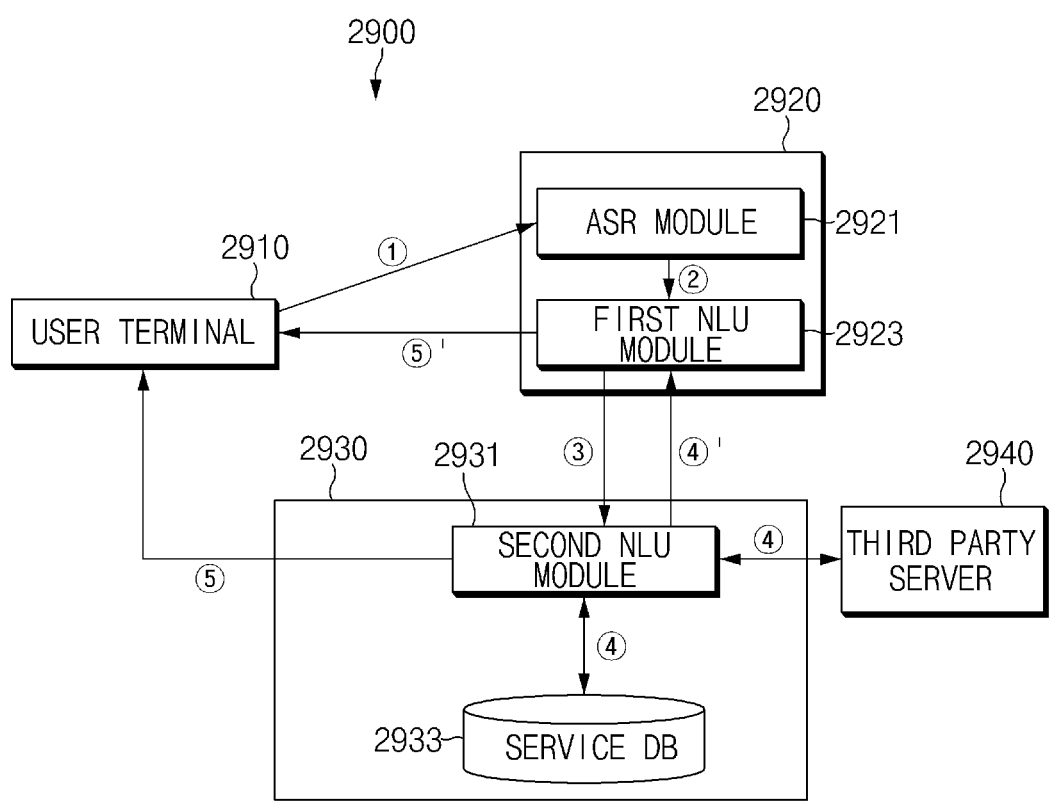
FIG. 29 is a block diagram of an integrated intelligent system for implementing a method in which a user terminal directly receives an intent of a user from a cloud server and obtains information, according to an embodiment.

FIG. 29 is a block diagram of an integrated intelligent system 2900 for implementing a method in which a user terminal directly receives information corresponding to a user's intent from a cloud server, according to an embodiment.

Referring to FIG. 29, while executing a third party app (e.g., a restaurant app), the user terminal 2910 may process a user input. The integrated intelligent system 2900 may be similar to the integrated intelligent system 2500 of FIG. 25. For example, the integrated intelligent system 2900 may transmit a service associated with the user input to the user terminal 2910, instead of transmitting the user intent determined in a cloud server 2930 through an intelligence server 2920.

According to an embodiment, operations ①, ②, and ③ in which the user terminal 2910 and the intelligence server 2920 transmit text data of the user input to the cloud server 2930 may be similar to operations ①, ② and ③ in which the user terminal 2710 and the intelligence server 2720 of FIG. 27 transmit text data of the user input to the cloud server 2730, respectively.

According to an embodiment, in a case where the user terminal 2910 receives a user input (e.g., "find a nearby restaurant") associated with the third party app, a second NLU module 2931 may determine a user's intent (e.g., searching for a restaurant) by using text data corresponding to the user input. The second NLU module 2931 may obtain information (e.g., the result of searching for the nearby restaurant) corresponding to the determined intent from a service DB 2933 or a third party server 2940 (④). The second NLU module 2931 may transmit the obtained information to the user terminal 2910 (⑤). The user terminal 2910 (e.g., an execution agent module) may provide a user with the information through the third party app (e.g., a restaurant app).

According to an embodiment, in a case where the user terminal 2910 receives a user input (e.g., "send a message") associated with an app that is not associated with the third party app, the second NLU module 2931 may not determine the user's intent (e.g., message transfer) by using text data. The second NLU module 2931 may not effectively process the received text data. Operations ④' and ⑤' in which the user terminal 2910 receives a path rule from the intelligence server 2920 may be similar to operations ④ and ⑤ in which the user terminal 2710, which are illustrated in FIG. 27, receives a path rule from the intelligence server 2720, respectively. The user terminal 2910 (e.g., an execution manager module) may execute a message app depending on a path rule and may sequentially perform operations for sending a message.

As such, the cloud server 2930 may determine the intent of text information corresponding to a user utterance and may transmit data for providing a service through the third party app, to the user terminal 2910 depending on the determined intent, and thus the integrated intelligent system 2900 may effectively transmit or receive data associated with the third party app.

Figure 30A:
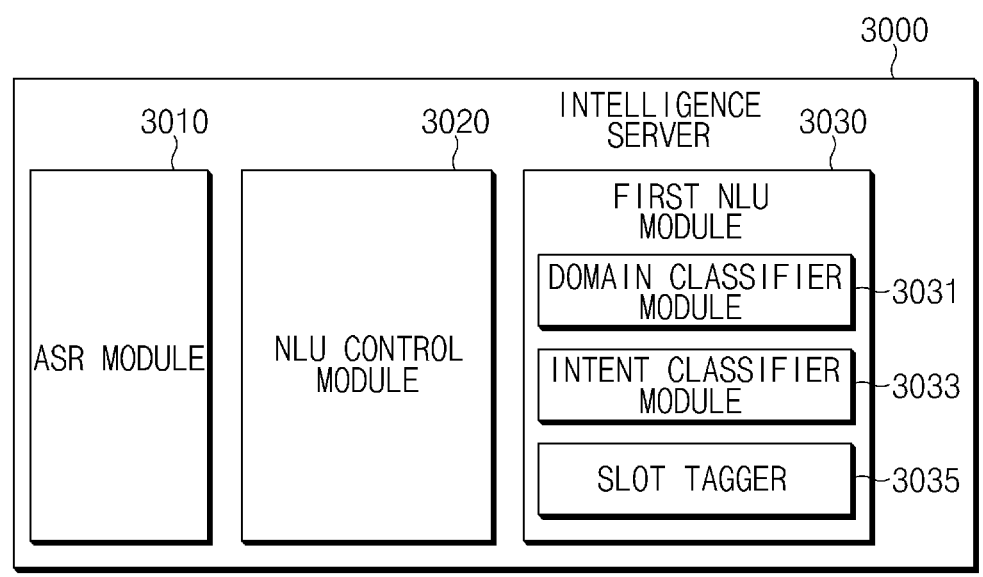
FIG. 30A is a block diagram of an NLU module of an intelligence server, according to an embodiment.

FIG. 30A is a block diagram of an NLU module of an intelligence server 3000, according to an embodiment.

Referring to FIG. 30A, an intelligence server 3000 may process a user utterance by using the method of FIG. 26 and the method of FIG. 8. The intelligence server 3000 may first perform the user input processing method of FIG. 26.

According to an embodiment, the intelligence server 3000 may include an ASR module 3010, a NLU control module 3020, and a first NLU module 3030. The first NLU module 3030 may include a domain classifier module 3031, an intent classifier module 3033, and a slot tagger 3035. For example, the NLU control module 3020 may be a configuration for performing the user input processing method of FIG. 26. The NLU control module 3020 may be an external module of the first NLU module 3030.

Figure 30B:
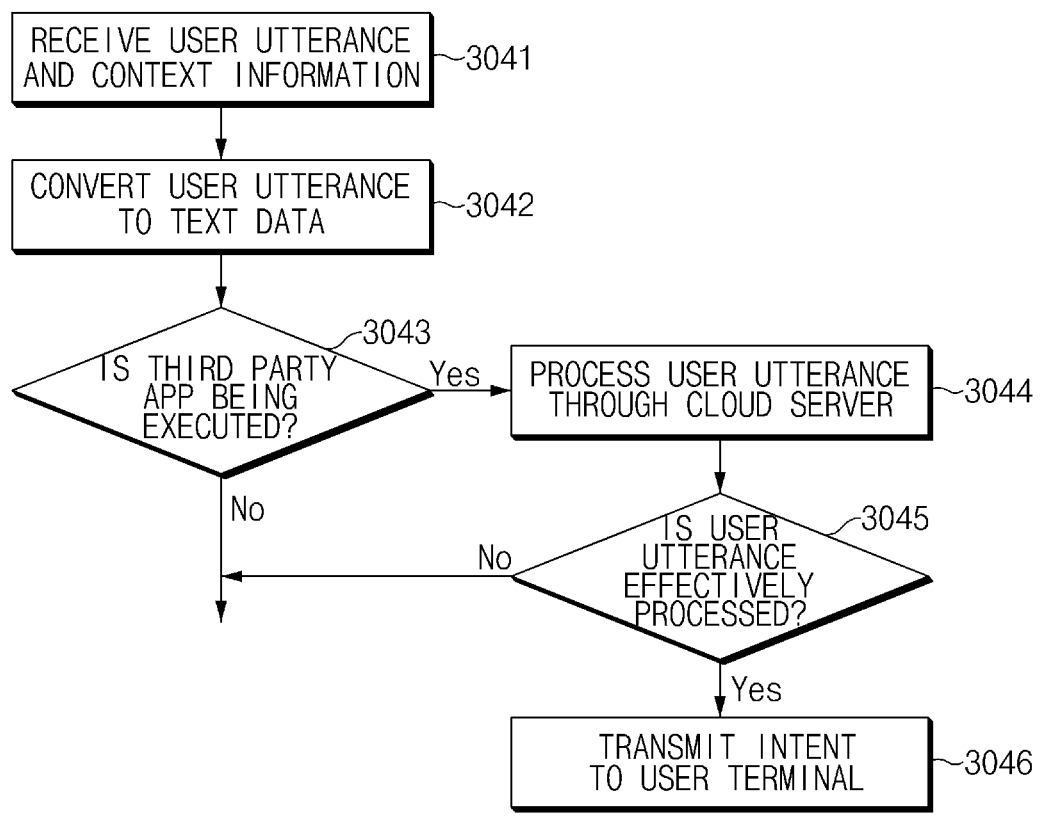
FIG. 30B is a flowchart of a user utterance processing method of an intelligence server, according to an embodiment.

FIG. 30B is a flowchart of a user utterance processing method of an intelligence server, according to an embodiment.

Referring to FIG. 30B, the intelligence server 3000 may first perform the user input processing method of FIG. 26 to process a user utterance.

According to an embodiment, in step 3041, the intelligence server 3000 may receive the user utterance and context information from a user terminal.

According to an embodiment, in step 3042, the intelligence server 3000 may convert the user utterance to text data.

According to an embodiment, in step 3043, the intelligence server 3000 (e.g., natural language control module 3020) may determine whether a user terminal is executing a third party app.

According to an embodiment, in a case where the user terminal is within a third party session, in step 3044, the intelligence server 3000 may process the user utterance through a cloud server.

According to an embodiment, in step 3045, the intelligence server 3000 may determine whether the cloud server effectively processes the user utterance.

According to an embodiment, in a case where the intelligence server 3000 receives the intent of a user from the cloud server, in step 3046, the intelligence server 3000 may transmit the received intent to the user terminal.

According to an embodiment, in a case where the intelligence server 3000 receives the result in which text data is not processed, from the cloud server, the intelligence server 3000 may process the user utterance by using the method of FIG. 8 to generate a path rule. The intelligence server 3000 may perform step 810 of FIG. 8.

Figure 31A:
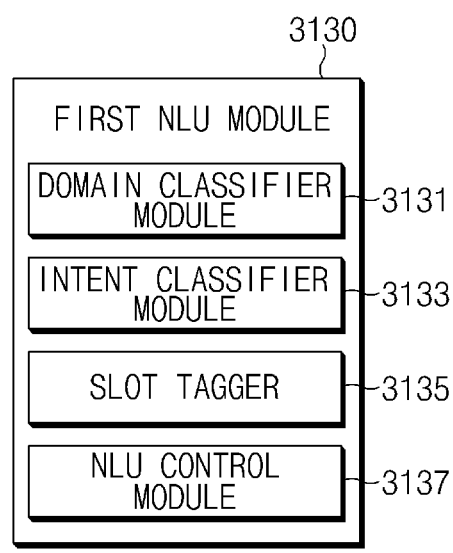
FIG. 31A is a block diagram of a first NLU module of an intelligence server, according to an embodiment.

FIG. 31A is a block diagram of a first NLU module 3130 of an intelligence server, according to an embodiment.

Referring to FIG. 31A, the first NLU module 3130 may process a user utterance by using the method of FIG. 26 and the method of FIG. 8. While performing the method of FIG. 8, the intelligence server 3000 may perform the method of FIG. 26.

According to an embodiment, the first NLU module 3130 may include a domain classifier module 3131, an intent classifier module 3133, a slot tagger 3135, and an NLU control module 3137. For example, the NLU control module 3137 may perform the user input processing method of FIG. 26. The NLU control module 3020 may be the internal configuration of the first NLU module 3130.

Figure 31B:
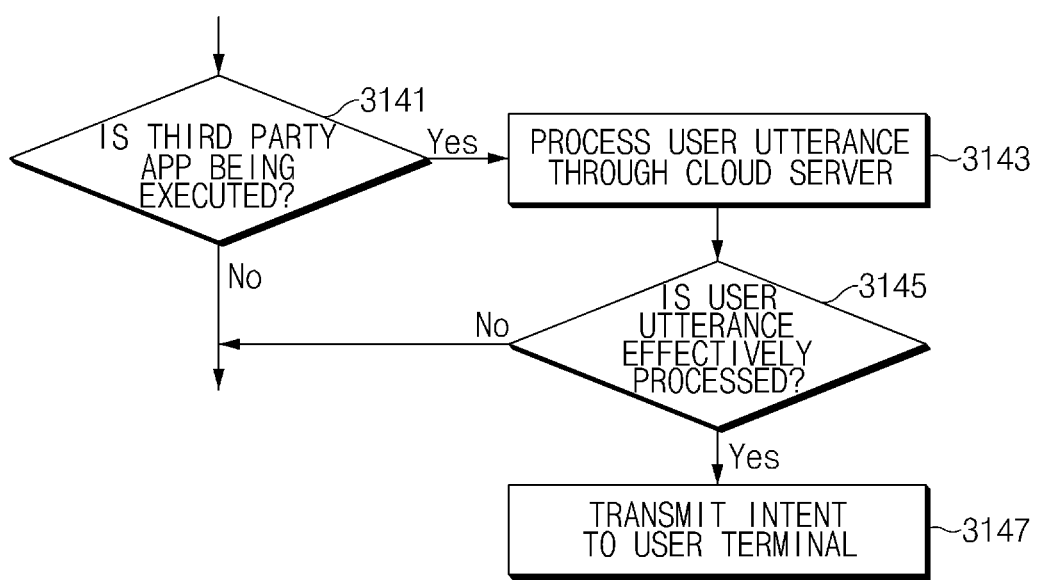
FIG. 31B is a flowchart of a user utterance processing method of a first natural language processing module, according to an embodiment.

FIG. 31B is a flowchart of a user utterance processing method of a first natural language processing module, according to an embodiment.

Referring to FIG. 31B, the first NLU module 3130 may perform the method of FIG. 26 in the middle of performing the method of FIG. 8, and then may process a user utterance.

According to an embodiment, the first NLU module 3130 (e.g., the NLU control module 3137) may first perform step 810 and step 820, which are illustrated in FIG. 8, for processing a user utterance. In other words, the first NLU module 3130 may determine whether the user utterance includes a name of an app to be executed.

According to an embodiment, in a case where the user utterance does not include a name of an app to be executed, in step 3141, the first NLU module 3130 may determine whether a user terminal is executing the third party app.

According to an embodiment, in a case where the user terminal is within a third party session, in step 3143, the first NLU module 3130 may process the user utterance through a cloud server.

According to an embodiment, in step 3145, the first NLU module 3130 may determine whether the cloud server effectively processes the user utterance.

According to an embodiment, in the case where the first NLU module 3130 receives the intent of a user from the cloud server, in step 3147, the first NLU module 3130 may transmit the received intent to the user terminal.

Figure 32:
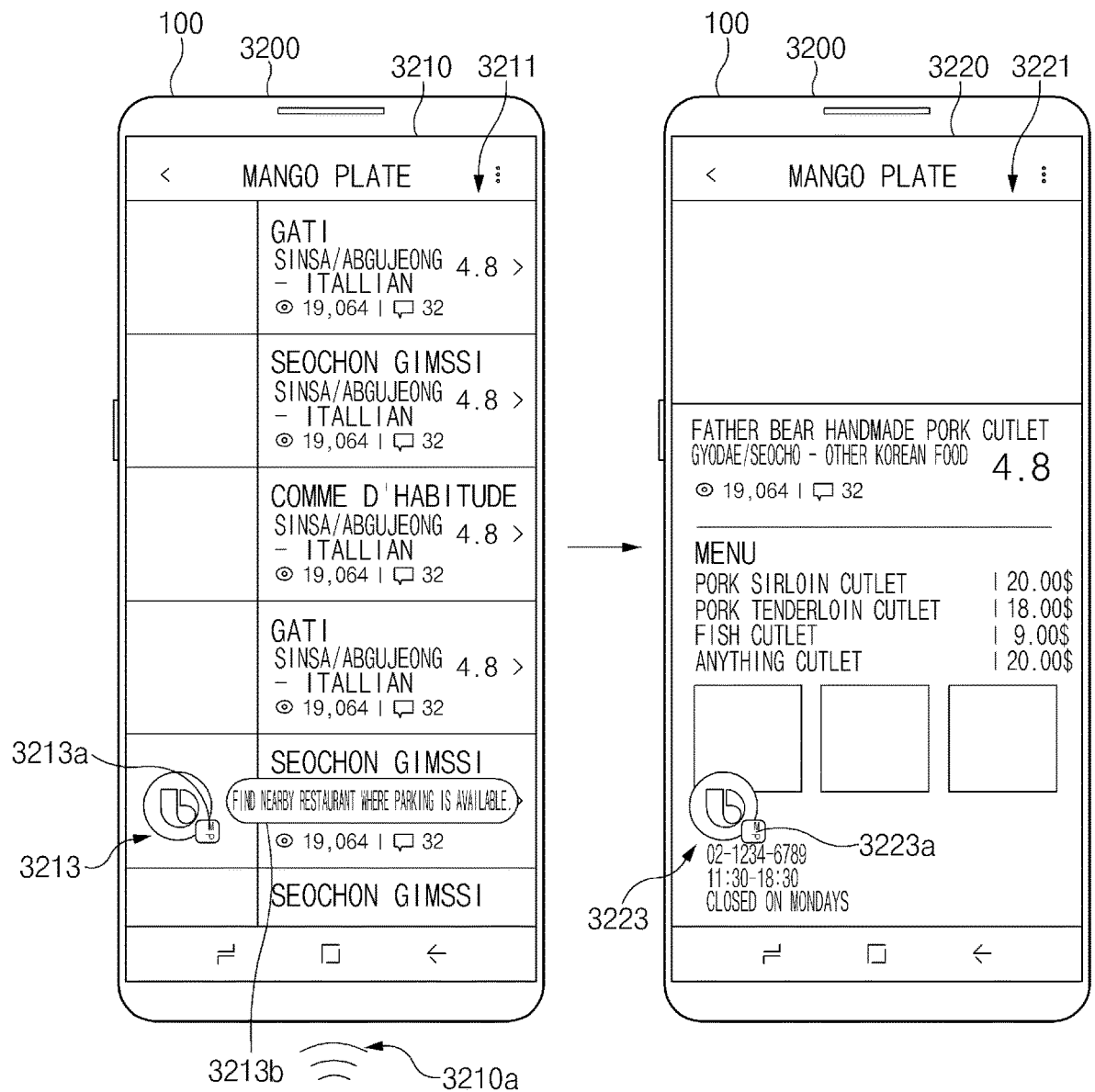
FIG. 32 is an illustration of a screen displayed in a user terminal in a case where a user utterance processed by a cloud server is effective, according to an embodiment.

FIG. 32 is an illustration of a screen displayed in a user terminal 3200 in a case where a user utterance processed by a cloud server is effective, according to an embodiment.

Referring to FIG. 32, the user terminal 3200 may execute a third party app (e.g., a restaurant app) and may receive a user input (e.g., "find a nearby restaurant where parking is available!") associated with the executed third party app. The integrated intelligent system 2700 may perform a task corresponding to a user input depending on the operation of FIG. 27 (or operations ④ and ⑤ of FIG. 29).

According to an embodiment, the user terminal 3200 may display a screen 3210 of a restaurant app in a display. For example, the user terminal 3200 may receive a user input (e.g., a user input to find a nearby restaurant) and may perform an operation. The user terminal 3200 may provide a list 3211 of nearby restaurants, through a UI of the restaurant app. The user terminal 3200 may display an indicator 3213 indicating a speech recognition service in the display. The indicator 3213 indicating the speech recognition service may display the restaurant app being currently executed (3213*a*).

According to an embodiment, the user terminal 3200 may receive a user utterance (e.g., "find nearby restaurant where parking is available!") 3210*a*. The user terminal 3200 may display the received user input 3210*a* through the indicator 3213 indicating the speech recognition service (3213*b*).

According to an embodiment, the user terminal 3200 may receive data associated with a service corresponding to the user utterance, from a cloud server. For example, the data associated with the service may have the form of a web app.

According to an embodiment, the user terminal 3200 may display detailed information screen 3220 of a restaurant, by using the data received from the cloud server, in the display. The user terminal 3200 may display restaurant information 3221 corresponding to the user utterance in the detailed information screen 3220 of a restaurant. In addition, the user terminal 3200 may display an indicator 3223 indicating the speech recognition service, in the display and may display an app (e.g., a restaurant app), which is being executed, through the indicator 3233 (3223*a*).

Figure 33:
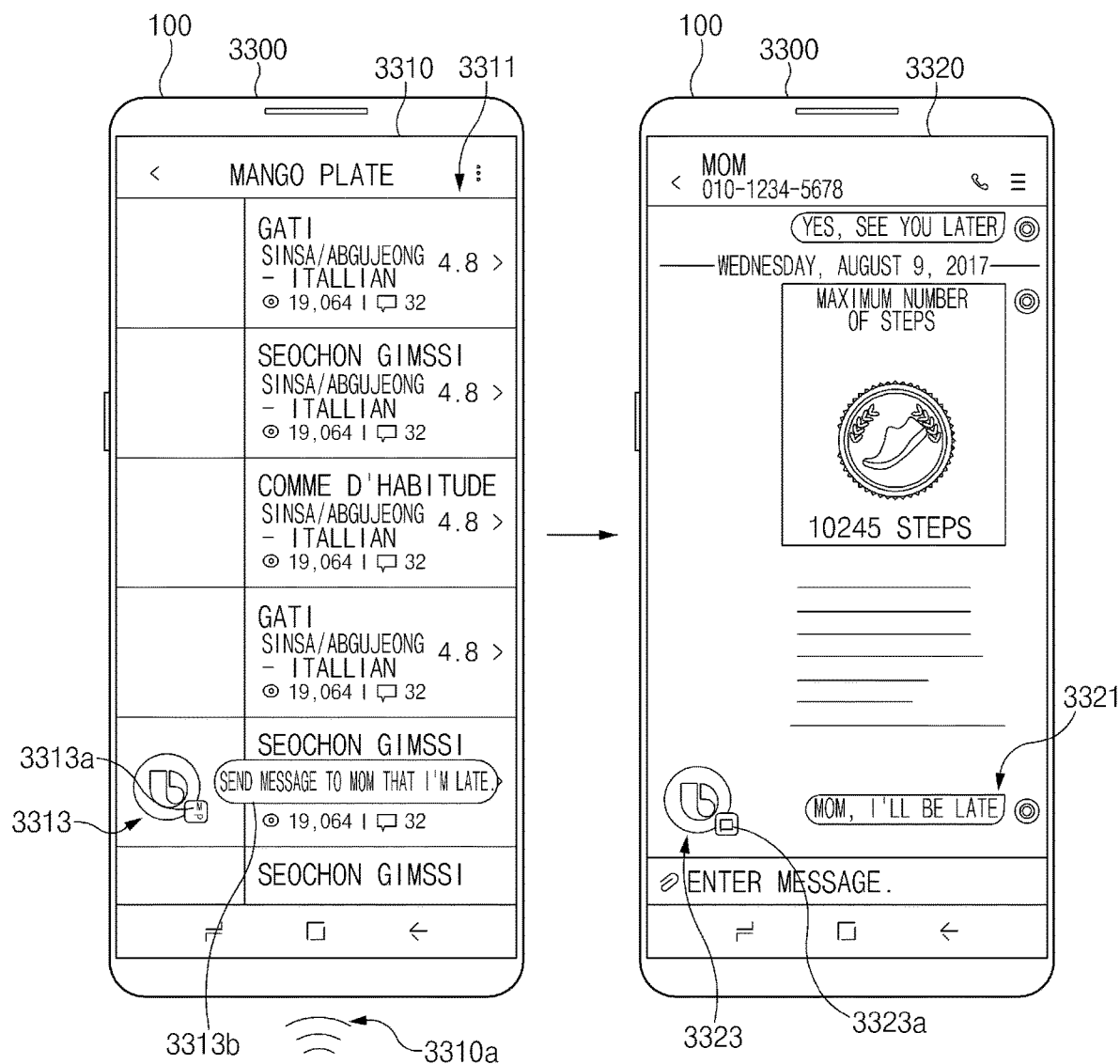
FIG. 33 is an illustration of a screen displayed in a user terminal in a case where a user utterance processed by a cloud server is not effective, according to an embodiment.

FIG. 33 is an illustration of a screen displayed in a user terminal 3300 in a case where a user utterance processed by a cloud server is not effective, according to an embodiment.

Referring to FIG. 33, the user terminal 3300 may execute a third party app (e.g., a restaurant app) and may receive a user input (e.g., "send a message to Mom that I'm late") for executing an app (e.g., a message app) different from the executed third party app. The integrated intelligent system 2700 may perform a task corresponding to a user input depending on the operation of FIG. 28 (or operations a and S' of FIG. 29).

According to an embodiment, similar to FIG. 32, the user terminal 3300 may display a screen 3310 of the restaurant app, in a display and may provide a list 3311 of restaurants. In addition, the user terminal 3300 may display an indicator 3313 indicating a speech recognition service in a display and may display the restaurant app being currently executed (3313*a*).

According to an embodiment, the user terminal 3300 may receive a user input (e.g., "send a message to Mom that I'm late") 3310*a*. The user terminal 3300 may display the received user input 3310*a* through the indicator 3313 indicating the speech recognition service (3313*b*). The user terminal 3300 may receive a path rule corresponding to the received user input from an intelligence server.

According to an embodiment, the user terminal 3300 may perform an operation depending on the path rule received from the intelligence server to display a message app screen 3320 in the display. The user terminal 3300 may display a message 3321, which is transmitted depending on the path rule, in the screen 3320 of the message app. The user terminal 3300 may display an indicator 3323 indicating a speech recognition service in a display and may display the message app being currently executed (3323*a*).

Figure 34:
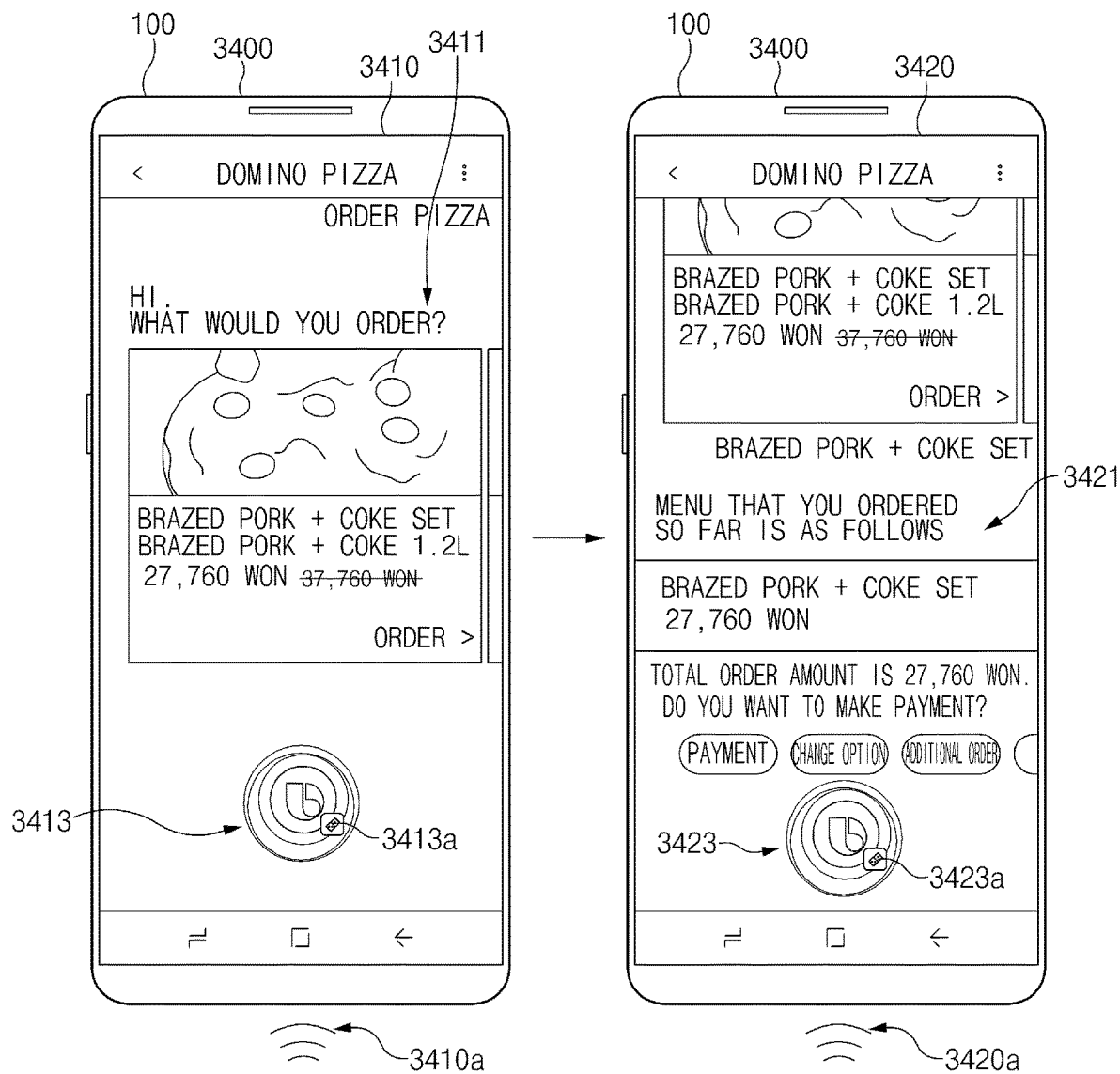
FIG. 34 is an illustration of receiving an additional user input in a case where a user utterance processed by a cloud server is effective, according to an embodiment.

FIG. 34 is an illustration of a user terminal 3400 processes a user input associated with a third party app and receiving an additional utterance associated with a third party app, according to an embodiment.

Referring to FIG. 34, after processing a user input (e.g., "order a pizza") to request a service associated with a third party app (e.g., a food order app), the user terminal 3400 may receive an additional utterance for providing the service.

According to an embodiment, the user terminal 3400 may receive the user input (e.g., "order a pizza") to request the service associated with the third party app (e.g., a food order app). The user terminal 3400 may display the third party app in a screen 3410 by using the received data and may display a screen (e.g., a pizza selection screen) 3411 corresponding to the service corresponding to the user input in a display. The user terminal 3400 may display an indicator 3413 indicating the speech recognition service in a display and may display the app (e.g., a food order app) being executed (3413*a*).

According to an embodiment, the user terminal 3400 may output an additional request (e.g., a menu selection request) for providing a user with the service corresponding to the user input. The user terminal 3400 may change (e.g., add a ripple effects) the shape of the indicator 3413 indicating the speech recognition service when outputting the request.

According to an embodiment, the user terminal 3400 may receive a user input (e.g., selecting a pizza) 3410*a* to order food. The user terminal 3400 may receive data (e.g., selected food information) associated with a service corresponding to the user input through a cloud server. For example, information associated with the service may have the form of a web app. In addition, the user terminal 3400 may display an indicator 3413 indicating a speech recognition service in a display and may display the food order app being currently executed (3413*a*).

According to an embodiment, the user terminal 3400 may display a screen 3420 for ordering the food selected by using the received data in a display. The user terminal 3400 may display the user's order information 3421 on the screen 3420 for ordering the food. The user terminal 3400 may output an additional request (e.g., a request for verify an order) for performing an operation (e.g., ordering food). When receiving a user input (e.g., verification of an order) 3420*a* to order the food, the user terminal 3400 may perform the operation.

Figure 35:
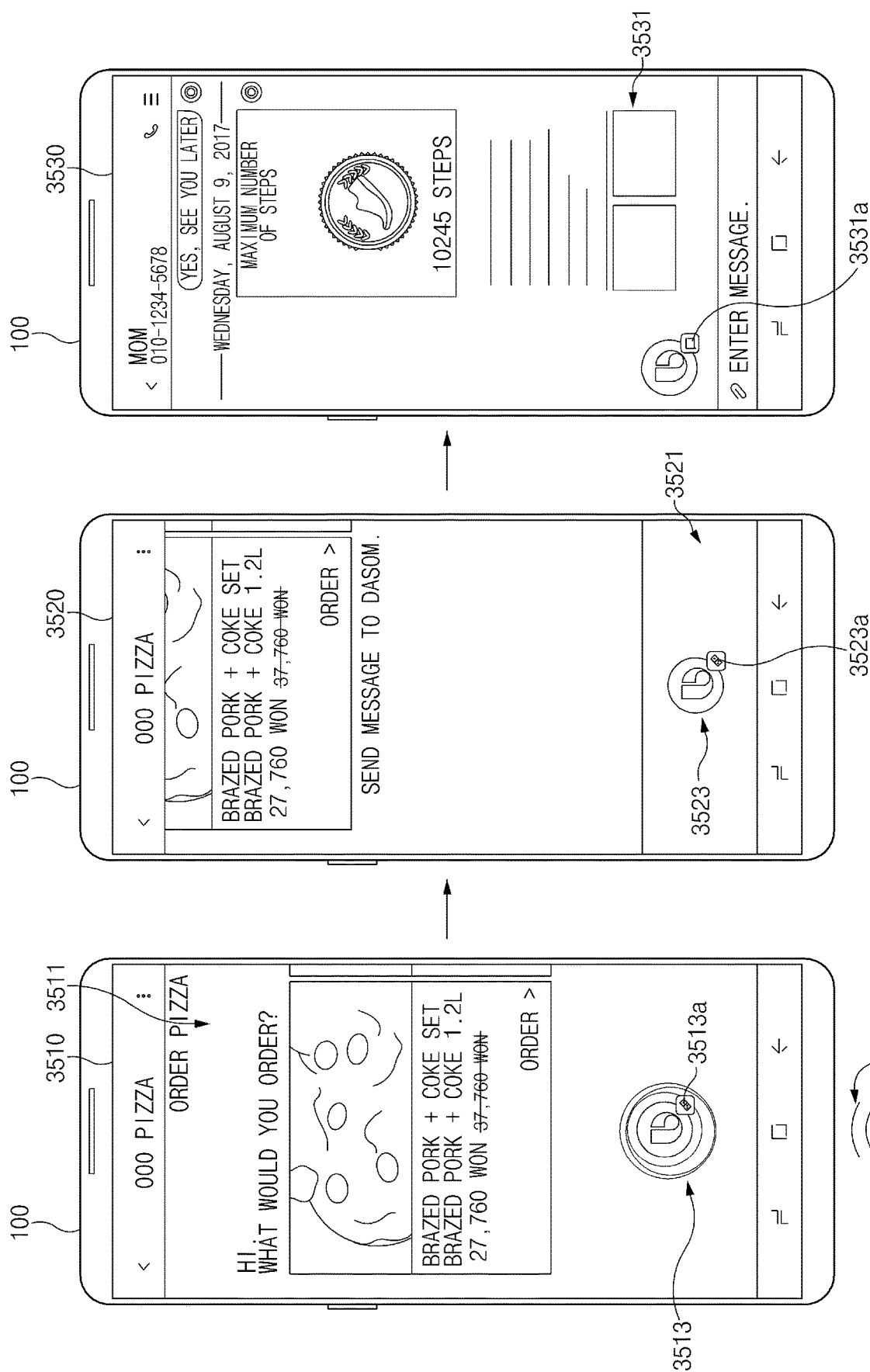
FIG. 35 is an illustration of displaying a generated path rule on a screen in a case where a user utterance processed by a cloud server is not effective, according to an embodiment.

FIG. 35 is an illustration of a user terminal 3510 processing a user input associated with a third party app and receiving an additional utterance for operating an app, which is not associated with the third party app, according to an embodiment.

Referring to FIG. 35, after processing a user input (e.g., "order a pizza") to request a service associated with a third party app (e.g., food order app), the user terminal 3500 may receive an additional utterance for operating an app (e.g., a message app) that is different from a third party app.

According to an embodiment, the user terminal 3500 may operate, as described above with reference to FIG. 34. The user terminal 3500 may receive the user input (e.g., "order a pizza") to request the service associated with the third party app (e.g., a food order app) and may display a pizza order screen 3511 in a display.

According to an embodiment, the user terminal 3500 may output an additional request (e.g., a menu selection request) for providing a user with the service corresponding to the user input. The user terminal 3500 may receive a user input (e.g., "send a message to Mom that I'm late") 3510*a*, which is not associated with the additional request. The user input may be an app (e.g., a message app) that is not associated with the third party app. In addition, the user terminal 3500 may display an indicator 3513 indicating a speech recognition service in a display and may display the food order app being currently executed (3513*a*).

According to an embodiment, the user terminal 3500 may display a screen 3520 indicating the user input, in the display. The user terminal 3500 may display a user input 3521 in the screen 3520 indicating the user input. The user terminal 3500 may display an indicator 3523 indicating the speech recognition service in a display and may display the app (e.g., a food order app) 3523*a* being currently executed.

According to an embodiment, the user terminal 3500 may perform an operation depending on the path rule received from the intelligence server to display a message app screen 3530 in the display. The user terminal 3500 may display a message 3531, which is transmitted depending on the path rule, in the screen 3530 of the message app. The user terminal 3500 may display an indicator 3531*a* indicating a speech recognition service in a display and may display the message app being currently executed (3531*a*).

According to an embodiment of the present disclosure described above with reference to FIGS. 25 to 35, for processing a user input to request a service associated with the third party app, a user terminal may grasp the intent of a user through a cloud server, receive, from the cloud server, information associated with the service depending on the intent of the user, provide the user with the information, and thus may execute a third party app provided by the third party so as to be matched with the intent of the user.

According to an embodiment of the present disclosure, a system may include at least one network interface, at least one processor operatively connected to the network interface, and at least one memory operatively connected to the processor. The memory may store a first NLU unit configured to interact with at least one client device and a second NLU unit configured to interact with at least one external server. The memory may further store instructions that, when executed, cause the processor to receive a status of a first client device configured to execute a plurality of application programs, to receive first voice data associated with a user utterance provided from the first client device, to process the first voice data with an ASR unit to generate first text data, to provide the first text data via the first NLU unit to the second NLU unit, to determine an intent associated with the user utterance based at least partly on the first text data by using the second NLU unit, and to provide the determined intent via the first NLU unit to the first client device. The status may be associated with at least one of the application programs, and the user utterance may include a first request for performing a task using the first client device.

According to an embodiment of the present disclosure, the instructions may cause the processor to receive a second request for obtaining information from the first client device, provide the second request to the second NLU, obtain information from the at least one external server, based on the second request, and provide the information to the first client device.

According to an embodiment of the present disclosure, the instructions may cause the processor to determine an intent associated with the user utterance, based at least partly on the first text data, using the first NLU unit when the second NLU unit is not capable of determining an intent associated with the user utterance, determine a sequence of states for the first client device to perform the task, based partly on the at least one of the application programs, and provide the sequence of states to the first client device.

According to an embodiment of the present disclosure, the instructions may cause the processor to determine whether the user utterance includes a name of at least one of the application programs, by using the first NLU unit, determine a domain by using the name of the at least one of the application programs when the user utterance includes the name of the at least one of the application programs, determine a sequence of states the first client device to perform the task based at least partly on the determined domain, determine a domain associated with the user utterance based on the first text data when the user utterance does not include the name of the at least one of the application programs, and determine a sequence of states of the first client device to perform the task, based on the first text data and the determined domain.

According to an embodiment of the present disclosure, the instructions may cause the processor to select the determined sequence and to provide the selected sequence to the first client device, when the user utterance does not include the name of the at least one of the application programs, and when the determined sequence is one of the certain sequences.

According to of the present disclosure, the instructions may cause the processor to receive a status of the first client device and to determine whether to determine an intent associated with the user utterance, based at least partly on the status when the user utterance does not include the name of the at least one of the application programs, and when the sequence is one of the certain sequences.

According to an embodiment of the present disclosure, the instructions may cause the processor to receive a status of the first client device, and, when the user utterance does not include the name of the at least one of the application programs and the determined sequence is one of the selected sequences, determine an intent associated with the user utterance, based at least partly on the status, determine a second sequence of states for the first client device to perform the task, based at least partly on the intent, and provide the second sequence to the first client device.

According to an embodiment of the present disclosure, the instructions may cause the processor to determine an intent associated with the user utterance, based at least partly on the first text data when the user utterance does not include the name of the at least one of the application programs, and when the sequence is not one of the certain sequences.

According to an embodiment of the present disclosure, the system may further include a first server including the ASR and the first NLU unit and a second server including the second NLU unit. The second server may be connected to the first server over a network.

According to an embodiment of the present disclosure, the network may include the Internet.

According to an embodiment of the present disclosure, a system may include at least one network interface, at least one processor operatively connected to the network interface, and at least one memory operatively connected to the processor. The memory may store a first NLU unit configured to interact with at least one client device and a second NLU unit configured to interact with at least one external server. The memory may further store instructions that, when executed, cause the processor to receive a status of a first client device configured to execute a plurality of application programs, receive first voice data associated with a user utterance provided from the first client device, process the first voice data with an ASR unit to generate first text data, provide the first text data via the first NLU unit to the second NLU unit, determine an intent of the user utterance based on the first text data by using the second NLU unit, and provide the determined intent via the second NLU unit to the first client device. The status may be associated with at least one of the application programs, and the user utterance may include a first request for performing a task using the first client device.

According to an embodiment of the present disclosure, the instructions may cause the processor, when the second NLU unit is not capable of determining an intent associated with the user utterance, to determine a sequence of states for the first client device to perform the task, based partly on the at least one of the application programs, and provide the sequence of states to the first client device.

According to an embodiment of the present disclosure, the instructions may cause the processor to determine whether the user utterance includes a name of at least one of the application programs, by using the first NLU unit, determine a domain by using the name of the at least one of the application programs when the user utterance includes the name of the at least one of the application programs, determine a sequence of states the first client device to perform the task based at least partly on the determined domain, determine a domain associated with the user utterance based on the first text data when the user utterance does not include the name of the at least one of the application programs, and determine a sequence of states of the first client device to perform the task, based on the first text data and the determined domain.

According to an embodiment of the present disclosure, the instructions may cause the processor to select the determined sequence and to provide the selected sequence to the first client device, when the user utterance does not include the name of the at least one of the application programs and the determined sequence is one of the certain sequences.

According to an embodiment of the present disclosure, the instructions may cause the processor to receive a status of the first client device and to determine whether to determine an intent associated with the user utterance, based at least partly on the status when the user utterance does not include the name of the at least one of the application programs and the sequence is one of the certain sequences.

According to an embodiment of the present disclosure, the instructions may cause the processor to receive a status of the first client device, and, when the user utterance does not include the name of the at least one of the application programs and the determined sequence is one of the selected sequences, determine an intent associated with the user utterance, based at least partly on the status, determine a second sequence of states for the first client device to perform the task, based at least partly on the intent, and provide the second sequence to the first client device.

According to an embodiment of the present disclosure, the instructions may cause the processor to determine an intent associated with the user utterance, based at least partly on the first text data when the user utterance does not include the name of the at least one of the application programs and the sequence is not one of the certain sequences.

According to an embodiment of the present disclosure, the instructions may cause the processor to receive a status of the first client device, and, when the user utterance does not include the name of the at least one of the application programs and the sequence is not one of the certain sequences, determine another intent associated with the user utterance, based at least partly on the status, determine a second sequence of states for the first client device to perform the task, based at least partly on the other intent, and select one of the determined sequence or the second sequence.

According to an embodiment of the present disclosure, the system may further include a first server including the ASR and the first NLU unit and a second server including the second NLU unit. The second server may be connected to the first server over a network.

According to an embodiment of the present disclosure, the network may include the Internet.

Figure 36:
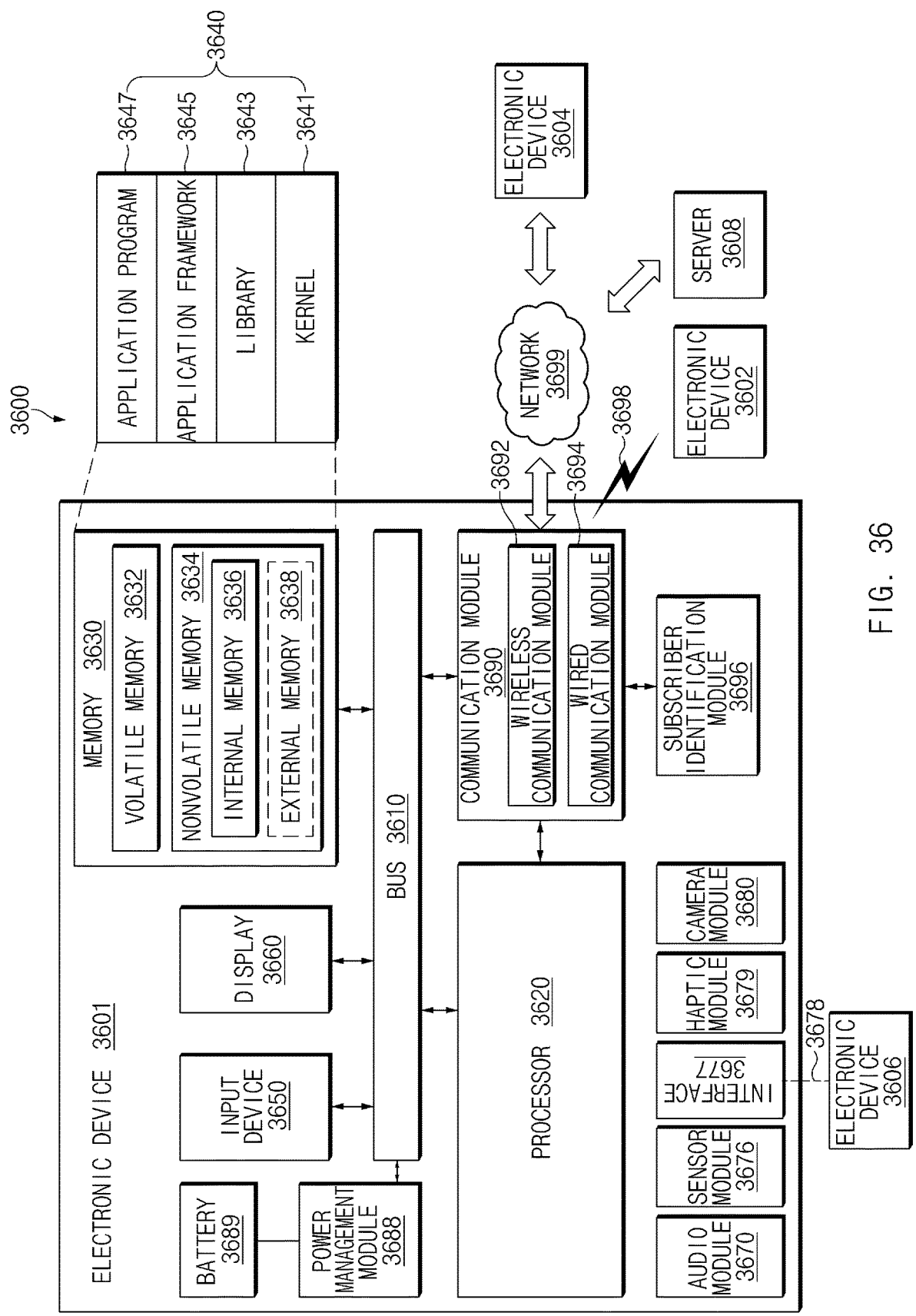
FIG. 36 is a block diagram of an electronic device in a network environment, according to an embodiment.

FIG. 36 is a block diagram of an electronic device 3601 in a network environment 3600, according to an embodiment. The electronic device 3601 may include various forms of devices. For example, the electronic device 3601 may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or moving picture experts group (MPEG-1 or MPEG-2) audio layer 3 (MP3) players), portable medical devices (e.g., heartbeat measuring devices, blood glucose monitoring devices, blood pressure measuring devices, and thermometers), cameras, or wearable devices. A wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). The electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In an embodiment, the electronic device 3601 may include at least one of navigation devices, a satellite navigation system (e.g., Global Navigation Satellite System (GNSS)), event data recorders (EDRs) (e.g., a black box for a car, a ship, or a plane), vehicle infotainment devices (e.g., a head-up display for a vehicle), industrial or home robots, drones, automated teller machines (ATMs), points of sales (POSs) devices, measuring instruments (e.g., water meters, electricity meters, or gas meters), or Internet of things (IoT) devices (e.g., light bulbs, sprinkler devices, fire alarms, thermostats, or street lamps). The electronic device 3601 is not be limited to the above-described devices, but may provide functions of a plurality of devices like smartphones which have measurement function of personal biometric information (e.g., a heart rate or a blood glucose level). In the present disclosure, the term "user" may refer to a person who uses an electronic device or may refer to a device (e.g., an artificial intelligence electronic device) that uses the electronic device.

Referring to FIG. 36, under a network environment 3600, the electronic device 3601 (e.g., the user terminal 100 of FIG. 1) may communicate with an electronic device 3602 through local wireless communication 3698 or may communicate with an electronic device 3604 or a server 3608 through a network 3699. The electronic device 3601 may communicate with the electronic device 3604 through the server 3608.

According to an embodiment, the electronic device 3601 may include a bus 3610, a processor 3620 (e.g., the processor 150), a memory 3630, an input device 3650 (e.g., a micro-phone or a mouse), a display device 3660, an audio module 3670, a sensor module 3676, an interface 3677, a haptic module 3679, a camera module 3680, a power management module 3688, a battery 3689, a communication module 3690, and a subscriber identification module 3696. The electronic device 3601 may omit at least one component (e.g., the display device 3660 or the camera module 3680) of the above-described elements or may further include other element(s).

The bus 3610 may interconnect the above-described elements 3620 to 3690 and may include a circuit for conveying signals (e.g., a control message or data) between the above-described elements.

The processor 3620 may include one or more of a central processing unit (CPU), an application processor (AP), a graphics processing unit (GPU), an image signal processor (ISP) of a camera or a communication processor (CP). According to an embodiment, the processor 3620 may be implemented with a system on chip (SoC) or a system in package (SiP). For example, the processor 3620 may drive an OS or an application program to control at least one of another element (e.g., hardware or software element) of the electronic device 3601 connected to the processor 3620 and may process and compute various data. The processor 3620 may load a command or data, which is received from at least one of other elements (e.g., the communication module 3690), into a volatile memory 3632 to process the command or data and may store the result data in a nonvolatile memory 3634.

The memory 3630 may include, for example, the volatile memory 3632 or the nonvolatile memory 3634. The volatile memory 3632 may include, for example, a random access memory (RAM) (e.g., a dynamic RAM (DRAM), a static RAM (SRAM), or a synchronous DRAM (SDRAM)). The nonvolatile memory 3634 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 3634 may be configured in the form of an internal memory 3636 or an external memory 3638 which is available through connection only if necessary, according to the connection with the electronic device 3601. The external memory 3638 may further include a flash drive such as a compact flash (CF), a secure digital (SD) memory card, a micro secure digital (Micro-SD) memory card, a mini secure digital (Mini-SD) memory card, an extreme digital (xD) memory card, a multimedia card (MMC), or a memory stick. The external memory 3638 may be operatively or physically connected with the electronic device 3601 in a wired manner (e.g., a cable or a universal serial bus (USB)) or a wireless (e.g., Bluetooth) manner.

For example, the memory 3630 may store, for example, at least one different software element, such as a command or data associated with the program 3640, of the electronic device 3601. The program 3640 may include, for example, a kernel 3641, a library 3643, an application framework 3645 or an application program (or application) 3647.

The input device 3650 may include a microphone, a mouse, or a keyboard. According to an embodiment, the keyboard may include a keyboard physically connected or a virtual keyboard displayed through the display device 3660.

The display device 3660 may include a display, a hologram device or a projector, and a control circuit to control a relevant device. The display may include, far example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include touch circuitry, which is able to detect a user's input such as a gesture input, a proximity input, or a hovering input or a pressure sensor (or a force sensor) which is able to measure the intensity of the pressure of a touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 3601.

The audio module 3670 may convert, for example, a sound to an electrical signal or an electrical signal to a sound. According to an embodiment, the audio module 3670 may acquire sound through the input device 3650 (e.g., a microphone) or may output sound through an output device (e.g., a speaker or a receiver) included in the electronic device 3601, the electronic device 3602 (e.g., a wireless speaker or a wireless headphone) or an electronic device 3606 (e.g., a wired speaker or a wired headphone) connected with the electronic device 3601

The sensor module 3676 may measure or detect, for example, an internal operating state (e.g., a power or a temperature) of the electronic device 3601 or an external environment state (e.g., an altitude, a humidity, or a brightness) to generate an electrical signal or a data value corresponding to the information of the measured state or the detected state. The sensor module 3676 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 3676 may further include a control circuit for controlling at least one or more sensors included therein. According to an embodiment, the electronic device 3601 may control the sensor module 3676 by using the processor 3620 or a processor (e.g., a sensor hub) separate from the processor 3620. In a case where a separate processor (e.g., a sensor hub) is used while the processor 3620 is in a sleep state, the separate processor may operate without awakening the processor 3620 to control at least a portion of the operation or the state of the sensor module 3676.

According to an embodiment, the interface 3677 may include a high definition multimedia interface (HDMI), a USB, an optical interface, a recommended standard 232 (RS-232), a D-subminiature (D-sub) connector, a mobile high-definition link (MHL) interface, an SD card/MMC interface, or an audio interface. A connector 3678 may physically connect the electronic device 3601 and the electronic device 3606. The connector 3678 may include, for example, a USB connector, an SD card/MMC connector, or an audio connector (e.g., a headphone connector).

The haptic module 3679 may convert an electrical signal into mechanical stimulation (e.g., a vibration or a motion) or into electrical stimulation. For example, the haptic module 3679 may apply tactile or kinesthetic stimulation to a user. The haptic module 3679 may include, for example, a motor, a piezoelectric element, or an electric stimulator.

The camera module 3680 may capture, for example, a still image and a moving picture. According to an embodiment, the camera module 3680 may include at least one lens (e.g., a wide-angle lens and a telephoto lens, or a front lens and a rear lens), an image sensor, an image signal processor, or a flash (e.g., a light emitting diode or a xenon lamp).

The power management module 3688, which is to manage the power of the electronic device 3601, may constitute at least a portion of a power management integrated circuit (PMIC).

The battery 3689 may include a primary cell, a secondary cell, or a fuel cell and may be recharged by an external power source to supply power to at least one element of the electronic device 3601.

The communication module 3690 may establish a communication channel between the electronic device 3601 and the first external electronic device 3602, the second external electronic device 3604, or the server 3608. The communication module 3690 may support wired communication or wireless communication through the established communication channel. According to an embodiment, the communication module 3690 may include a wireless communication module 3692 or a wired communication module 3694. The communication module 3690 may communicate with the external device through a first network 3698 (e.g. a wireless local area network such as Bluetooth or an Infrared Data Association (IrDA) standard) or a second network 3699 (e.g., a wireless wide area network such as a cellular network) through a relevant module among the wireless communication module 3692 or the wired communication module 3694.

The wireless communication module 3692 may support, for example, cellular communication, local wireless communication, GNSS communication. The cellular communication may include, for example, long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a GPS, a global navigation satellite system (Glonass), Beidou navigation satellite system (Beidou), the European global satellite-based navigation system (Galileo), or the like. In the present disclosure, "GPS" and "GNSS" may be used interchangeably.

According to an embodiment, when the wireless communication module 3692 supports cellar communication, the wireless communication module 3692 may, for example, identify or authenticate the electronic device 3601 within a communication network using the subscriber identification module (e.g., a SIM card) 3696. The wireless communication module 3692 may include a CP separate from the processor 3620 (e.g., an AP). In this case, the CP may perform at least a portion of functions associated with at least one of elements 3610 to 3696 of the electronic device 3601 in substitute for the processor 3620 when the processor 3620 is in an inactive (or sleep) state, and together with the processor 3620 when the processor 3620 is in an active state. The wireless communication module 3692 may include a plurality of communication modules, each supporting only a relevant communication scheme among cellular communication, local wireless communication, or a GNSS communication.

The wired communication module 3694 may include, for example, a local area network (LAN) service, a power line communication, or a plain old telephone service (POTS).

For example, the first network 3698 may employ, for example, Wi-Fi direct or Bluetooth for transmitting or receiving commands or data through wireless direct connection between the electronic device 3601 and the first external electronic device 3602. The second network 3699 may include a telecommunication network (e.g., a computer network such as a LAN or a wide area network (WAN), the Internet or a telephone network) for transmitting or receiving commands or data between the electronic device 3601 and the second electronic device 3604.

According to an embodiment, the commands or the data may be transmitted or received between the electronic device 3601 and the second external electronic device 3604 through the server 3608 connected with the second network 3699. Each of the first and second external electronic devices 3602 and 3604 may be a device of which the type is different from or the same as that of the electronic device 3601. All or a part of operations that the electronic device 3601 will perform may be executed by the electronic devices 3602 and 3604 or the server 3608. In a case where the electronic device 3601 executes any function or service automatically or in response to a request, the electronic device 3601 may not perform the function or the service internally, but may alternatively or additionally transmit requests for at least a part of a function associated with the electronic device 3601 to the electronic device 3602 or 3604 or the server 3608. The electronic device 3602 or 3604 or the server 3608 may execute the requested function or additional function and may transmit the execution result to the electronic device 3601. The electronic device 3601 may provide the requested function or service using the received result or may additionally process the received result to provide the requested function or service. For example, cloud computing, distributed computing, or client-server computing may be used.

Various embodiments of the present disclosure and terms used herein are not intended to limit the present disclosure to certain embodiments, and it should be understood that the embodiments and the terms include modification, equivalent, and/or alternative on the corresponding embodiments described herein. With regard to the description of the accompanying drawings, similar elements may be marked by similar reference numerals. The terms of a singular form may include plural forms unless otherwise specified. In the present disclosure, the expressions "A or B", "at least one of A and/or B", "A, B, or C", or "at least one of A, B, and/or C", and the like may include any and all combinations of one or more of the associated listed items. Expressions such as "first," "second," and the like, may express their elements regardless of their priority or importance and may be used to distinguish one element from another element but is not limited to these components. When an (e.g., a first) element is referred to as being "(operatively or communicatively) coupled with/to" or "connected to" another (e.g., a second) element, the element may be directly coupled with/to or connected to the other element or an intervening element (e.g., a third element) may be present.

According to the situation, the expression "adapted to or configured to" used herein may be used interchangeably with, for example, the expressions "suitable for", "having the capacity to", "changed to", "made to", "capable of" or "designed to" in hardware or software. The expression "a device configured to" may indicate that the device is "capable of" operating together with another device or other components. For example, the expression "processor configured to (or set to) perform A, B, and C" may indicate a dedicated processor (e.g., an embedded processor) for performing corresponding operations or a general purpose processor (e.g., a CPU or an AP) which performs corresponding operations by executing one or more software programs which are stored in a memory device (e.g., the memory 3630).

The term "module" used herein may indicate a unit, which is implemented with hardware, software, or firmware, and may be used interchangeably with the terms "logic", "logical block", "component", "circuit", and the like. The term "module" may indicate a minimum unit of an integrated component or a part thereof or may indicate a minimum unit for performing one or more functions or a part thereof. The term "module" may be implemented mechanically or electronically and may include, for example, an application-specific integrated circuit (ASIC), a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a non-transitory computer-readable storage medium (e.g., the memory 3630) in the form of a program module. The instruction, when executed by a processor (e.g., the processor 3620), may cause the processor to perform a function corresponding to the instruction. The non-transitory computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), an embedded memory, and the like. The one or more instructions may contain code generated by a compiler or code executable by an interpreter.

Each element (e.g., a module or a program module) according to various embodiments may be composed of a single entity or a plurality of entities, a part of the above-described sub-elements may be omitted, or other sub-elements may be further included. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and detail may be made therein without departing from the scope of the present disclosure as defined by the appended claims and their equivalents.

What is claimed is:

1. A system for processing a user utterance, comprising:
   at least one network interface;
   at least one processor operatively connected to the at least one network interface; and
   at least one memory operatively connected to the at the at least one processor,
   wherein the at least one memory stores a plurality of specified sequences of states of at least one external electronic device, wherein each of the specified sequences is associated with a respective one of domains,
   wherein the at least one memory further stores instructions that, when executed, cause the at least one processor to:
   receive first data associated with the user utterance provided via a first of the at least one external electronic device, wherein the user utterance includes a request for performing a task using the first of the at least one external device, wherein the first of the at least one external device is configured to execute a plurality of application programs;
   when the user utterance includes a name of at least one of the plurality of application programs, determine a domain, using the name of the at least one of the plurality of application programs,
   when the user utterance does not include the name of the at least one of the plurality of application programs, determine a domain associated with the user utterance, based on the first data; and
   determine a first sequence of states for the first of the at least one external device to sequentially perform the task according to the first sequence of states, based at least partly on the determined domain; and
   provide the first sequence of states to the first of the at least one external device.

2. The system of claim 1, wherein the instructions further cause the at least one processor to:
   when the user utterance includes the name of the at least one of the plurality of application programs, and when a confidence level of the first sequence exceeds a specified value,
   provide the first sequence to the first of the at least one external electronic device.

3. The system of claim 1, wherein the instructions further cause the at least one processor to:
   when the user utterance does not include the name of the at least one of the plurality of application programs, and when the first sequence is one of the specified sequences,
   provide the first sequence to the first of the at least one external electronic device.

4. The system of claim 1, wherein the instructions further cause the at least one processor to:
   receive a status of the first of the at least one external device, and
   when the user utterance does not include the name of the at least one of the plurality of application programs, and when the first sequence is one of the specified sequences,
   determine whether to determine an intent associated with the user utterance, based at least partly on the status.

5. The system of claim 4, wherein the instructions further cause the at least one processor to:

receive a status of an application program being executed in the first of the at least one external electronic device, and when the first of the at least one external electronic device executes the application program, determine the intent based at least partly on a domain associated with the application program being executed and the first data, determine a second sequence based on the determined intent, and provide the second sequence to the first of the at least one external electronic device instead of the first sequence.

6. The system of claim 4, wherein the instructions further cause the at least one processor to:

receive a status of an application program being executed in the first of the at least one external electronic device;

when the first of the at least one external electronic device does not execute the application program, provide the first sequence to the first of the at least one external electronic device.

7. The system of claim 1, wherein the instructions further cause the at least one processor to:

receive a status of the first of the at least one external device, and when the user utterance does not include the name of the at least one of the plurality of application programs, and when the first sequence is one of the selected sequences, determine an intent associated with the user utterance, based at least partly on the status, determine a second sequence of states for the first of the at least one external device to perform the task, based at least partly on the intent, and provide the second sequence to the first of the at least one external device.

8. The system of claim 1, wherein the instructions further cause the at least one processor to:

when the user utterance does not include the name of the at least one of the plurality of application programs, and when the sequence is not one of the specified sequences, determine an intent associated with the user utterance, based at least partly on the first data.

9. The system of claim 8, wherein the instructions further cause the at least one processor to:

receive a status of the first of the at least one external device, and when the user utterance does not include the name of the at least one of the plurality of application programs, and when the first sequence is not one of the specified sequences, determine another intent associated with the user utterance, based at least partly on the status, determine a second sequence of states for the first of the at least one external device to perform the task, based at least partly on the other intent, and select one of the first sequence or the second sequence.

10. The system of claim 1, wherein the instructions further cause the at least one processor to:

when the user utterance does not include the name of the at least one of the plurality of application programs, and when the first sequence is not one of the specified sequences, determine an intent based at least partly on the determined domain and the first data, determine a third sequence of states of the first of the at least one external electronic device based at least partly on the determined intent, and provide the third sequence to the first of the at least one external electronic device instead of the first sequence.

11. The system of claim 10, wherein the instructions further cause the at least one processor to:

receive a status of the first of the at least one external device, and when the user utterance does not include the name of the at least one of the plurality of application programs, and when the first sequence is not one of the specified sequences, determine whether to determine another intent of the user utterance, which is associated with the user utterance, based at least partly on the status.

12. The system of claim 11, wherein the instructions further cause the at least one processor to:

receive a status of an application program being executed in the first of the at least one external electronic device, and when the first of the at least one external electronic device executes at least one application program of the plurality of application programs, determine the other intent based at least partly on a domain associated with the at least one of the plurality of application program being executed and the first data, determine a second sequence based on the other intent, and provide the second sequence to the first of the at least one external electronic device instead of the first sequence or the third sequence.

13. The system of claim 11, wherein the instructions further cause the at least one processor to:

receive a status of an application program being executed in the first of the at least one external electronic device, and when the first of the at least one external electronic device does not execute at least one application program of the plurality of application programs, provide the first sequence to the first of the at least one external electronic device.

14. A system for processing a user utterance, comprising:
at least one network interface;
at least one processor operatively connected to the at least one network interface; and
at least one memory operatively connected to the at least one processor,
wherein the at least one memory stores instructions that, when executed, cause the at least one processor to:

receive a status of a first of the at least one external electronic device, wherein the first of the at least one external device is configured to execute a plurality of application programs, and wherein the status is associated with at least one of the plurality of application programs, receive first data associated with a user utterance provided via the first of the at least one external electronic device, wherein the user utterance includes a request for performing a task using the first of the at least one external device, determine an intent associated with the user utterance, based at least partly on the first data and the status, determine a sequence of states for the first of the at least one external device to sequentially perform the task according to the first sequence of states, based partly on the at least one of the plurality of application programs, and provide the determined sequence of states to the first of the at least one external device.

15. The system of claim 14, wherein the instructions further cause the at least one processor to:

determine a domain associated with the user utterance when a confidence level of the determined sequence does not exceed a value.

16. The system of claim 14, wherein the instructions further cause the at least one processor to:

receive a status of an application program being executed in the first of the at least one external electronic device, and when the first of the at least one external electronic device executes an application program, determine an intent of the user utterance based on the first data and a domain associated with the application program being executed.

* * * * *